United States Patent
Jackson

(10) Patent No.: US 7,685,140 B2
(45) Date of Patent: Mar. 23, 2010

(54) DYNAMIC INFORMATION SYSTEMS

(75) Inventor: James Ernest Jackson, Wamboin (AU)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 11/668,535

(22) Filed: Jan. 30, 2007

(65) Prior Publication Data

US 2008/0181516 A1    Jul. 31, 2008

(51) Int. Cl.
G06F 7/00    (2006.01)
(52) U.S. Cl. .................................. 707/100; 707/102
(58) Field of Classification Search ............... 707/8–10, 707/100, 101, 102, 200, 103 R
See application file for complete search history.

(56) References Cited

U.S. PATENT DOCUMENTS

| | | | |
|---|---|---|---|
| 5,467,268 A | 11/1995 | Sisley et al. | |
| 5,590,269 A | 12/1996 | Kruse et al. | |
| 5,623,404 A | 4/1997 | Collins et al. | |
| 6,216,098 B1 | 4/2001 | Clancey et al. | |
| 6,263,335 B1 * | 7/2001 | Paik et al. .................. | 707/5 |
| 7,328,216 B2 * | 2/2008 | Hofmann et al. ............ | 707/100 |
| 2002/0138624 A1 | 9/2002 | Esenther | |
| 2003/0018646 A1 * | 1/2003 | Ohta et al. .................. | 707/100 |
| 2003/0208459 A1 | 11/2003 | Shea et al. | |
| 2004/0158455 A1 | 8/2004 | Spivack et al. | |
| 2005/0075914 A1 | 4/2005 | Bayne | |
| 2005/0256735 A1 | 11/2005 | Bayne | |
| 2008/0177756 A1 * | 7/2008 | Kosche et al. ............... | 707/100 |

FOREIGN PATENT DOCUMENTS

JP    2002312375 A    10/2002

OTHER PUBLICATIONS

Akhras, F.N., Melnikoff, S.S.S., "Towards Dynamic Generation of Knowledge-Based Environments for Software Process Assistance", Proceedings. IEEE Fourth International Conference on Software Engineering and Knowledge Engineering, 1992, pp. 79-86.

(Continued)

*Primary Examiner*—Wilson Lee
(74) *Attorney, Agent, or Firm*—Ronald Kaschak; Hoffman Warnick LLC

(57) ABSTRACT

This invention discloses the concept of a dynamic metasystem managing a dynamic system, achieved through the use of, and an environment (i.e., tools and ontologies) supporting dynamic artifacts. A system for generating a dynamic information system comprises a persistent dynamic repository of data and an integration metasystem. The repository forms an asymmetric navigational database, and the database includes an ontology model. The ontology model has an abstract model framework that supports creation and use of multi-dimensional and asymmetric abstract models of data, and views which define the content and form of presentation of that data using a computer. The integration metasystem includes components that describe components of shared infrastructure and services of an enterprise architecture, and a dynamic information system software tool generating artifacts representing information and views that define the presentation of data. The artifacts are provided to the ontology model, and have interfaces to the abstract model framework that permit creation, reading and modification of the contents of the asymmetric navigational database.

8 Claims, 48 Drawing Sheets

OTHER PUBLICATIONS

Aksit, M.; Marcelloni, F.; Tekinerdogan, B.; van den Berg, K.; van den Broek, P., "Active Software Artifacts", Object-Oriented Technology, ECOOP'97 Workshop Reader. ECOOP'97 Workshops Proceedings, 1998, pp. 307-310.

Settimi, R. (School of Computer Science, Telecommunications, & Information Systems, DePaul Univ., Chicago, IL, USA); Cleland-Huang, J.; Ben Khadra, O; Mody, J.; Lukasik, W.; DePalma, C., "Supporting Software Evoloution Through Dynamically Retrieving Traces to UML Artifacts", Proceedings. IEEE 7th International Workshop on Principles of Software Evolution, 2004, pp. 49-54.

Novak et al., "Uncovering and Utilization of Tacit Knowledge in Heterogeneous Expert Communities", i-com Zeitschrift fur Interaktive and Kooperative Medien, n3, 2003, pp. 18-26, Oldenbourg (Abstract only).

Kutler et al., "Space Technology Knowledge Capture", A Collection of Technical papers—1st Space Exploration Conference: Continuing the Voyage of Discovery, v2, 2005, pp. 826-834, American Institute of Aeronautics and Astronautics Inc., Reston, VA (Abstract only).

Woo et al., "Dynamic Knowledge Map: Resuing Experts' Tacit knowledge in the AEC Industry", Automation in Construction, v 13, n2, 2004, pp. 203-207, Elsevier (Abstract only).

Chea et al., "Healthcare Knowledge Acquisition: An Ontology-Based Approach Using the Extensible Markup Language (XML)", medical Infobahn for Europe proceedings of MIE2000 and GMDS2000, 2000, pp. 827-831 (Abstract only).

Hashmi et al., "An Intelligent Agent-Based Knowledge Broker for Enterprise-Wide Healthcare Knowledge Procurement", Proceedings of 15th IEEE Symposium on Computer-Based Medical Systems (CBMS 2002), 2002, pp. 173-178, IEEE Computer. Soc.

Numata et al., "Knowledge Discovery and Sharing in an Information System", ASEE Annual Conference and xposition, Conference Proceedings, 2005, pp. 713-716, IEEE.

Taleb-Bendiab et al., "Model-based Self-Managing Systems Engineering", 2005, Proceedings of the 16th International Workshop on Database and Expert Systems Applications (DEXA '05), IEEE Computer Society.

Bayne, Jay S., "A Software Architecture for Control of Value Production in Federated Systems", 2003, pp. 1-6, SCI2003.

The Object Management Group (OMG)/Unified Modeling Language (UML) Resource Page, pulled Feb. 28, 2007 from web site: http://www.omg.org/uml.

Wiener, "Cybernetics: Or Control and Communication in the Animal and Machine," pp. 10-11, 1948 and 1961, Copyright by the Massachusetts Institute of Technology, New York.

Stafford Beer, "Designing Freedom," 1995, pp. 42-45 and 78-79, Publisher John Wiley & Sons.

Stafford Beer, "Platform for Change," 1995, pp. 71 and 105-107, Publisher John Wiley & Sons.

Stafford Beer, "The Heart of Enterprise," 1995, pp. 236-237, 252-253, 262-263 and 318-319, Publisher John Wiley & Sons.

Stafford Beer, "Brain of the Firm," 1995, pp. 130-131, 156-157 and 162-165, Publisher John Wiley & Sons.

Walter A. Shewhart, "Statistical Method from the Viewpoint of Quality Control," 1986, pp. 110-111 and 114-115, Dover Publications.

PCT Notification of Transmittal of the International Search Report and the Written Opinion of the International Searching Authority, PCT/EP2008/050344, Feb. 5, 2008.

SUM-IM, "Economic Dispatch by Ant Colony Search Algorithm", Dec. 1-3, 2004, pp. 416-421, Proceedings of the 2004 IEEE, Conference on Cybermetrics and Intelligent Systems, Singapore.

Farkas et al., "Anonymity and Accountability in Self-Organizing Electronic Communities", Nov. 2002, pp. 81-90, WPES '02, Washington, DC.

* cited by examiner

DYNAMIC INFORMATION SYSTEMS

CROSS-REFERENCE TO RELATED INVENTIONS

This invention is related to U.S. patent application Ser. No. 11/668,564 entitled "METHOD, SYSTEM, AND PROGRAM PRODUCT FOR THE CREATION AND USE OF A UNIFIED DYNAMIC INFORMATION SYSTEM", and U.S. patent application Ser. No. 11/668,162 entitled "METHOD, SYSTEM, AND PROGRAM PRODUCT FOR DISCOVERING RELEVANT INFORMATION IN A DYNAMIC INFORMATION SYSTEM", both filed on even date herewith, assigned to the same assignee, and hereby incorporated herein by reference in their entirety.

FIELD OF THE INVENTION

The field of the invention is the generation and deployment of dynamic information systems.

BACKGROUND OF THE INVENTION

Referring firstly to the hierarchy 10 shown in FIG. 1, a "system" 12 is an organized assembly of components and the relationships between these components. The components of a system may include other systems, and so the term "system" also encompasses the notion of a system of systems.

An "information system" 14 is a type of system, whether automated or manual, consisting of people, tools, methods, and information organized to collect, validate, process, transmit, and disseminate data that represent information.

An "enterprise" is a company, business, organization, or other purposeful endeavor. Here, the word is extended to include projects, and joint ventures involving multiple enterprises.

One type of information system is an "enterprise resource planning system" 16 (ERP system). ERP systems 16 are designed to serve an enterprise by integrating the management of some type of resource. Examples are financial management systems 18 (managing financial resources), human resources management systems 20 (managing people within the enterprise), supply chain management systems 22 (managing goods and services suppliers as a resource) and customer relationship management systems 24 (managing customers as a resource).

"Integration" refers to the bringing together of a plurality of things. Here, it refers to the bringing together of a plurality of system components. It is the most important component of the architecture of systems. The bringing together of things gives rise to a need for a plurality of components that are shared, and so do not belong exclusively to any one of the integrated systems. Integration components include, but are not limited to, interfaces, standards, frameworks, patterns, methods, processes, hardware, system software, communications networks, and management of systems.

Typically, an enterprise will have multiple information systems 14, including multiple ERP systems 16. These systems do not exist in isolation. They share resources, such as computer and communications resources. They share data, such as payroll data that is linked to data about people in the human resources system and data about money in the financial system. They also share people and processes involved in the management of shared services and facilities. All of this sharing requires integration. This gives rise to the idea that there is an implicit enterprise-wide system that manages the integration of both deployed information systems and their supporting deployed metasystems.

The current approach to the management of systems relies primarily on the use of the static artifacts that collectively represent a metasystem. Because the artifacts are static, the metasystems that manage them are here termed "static metasystems". Further, because the current approach to the management of systems does not distinguish integration systems, integration is handled in a piecemeal manner, driven by projects that are generally funded to deliver a specific business outcome.

A "project" is a time-, scope- and budget-constrained activity undertaken by an enterprise to achieve some business purpose. Unless directed through enterprise-level architecture, it would be rare for a project to divert resources from delivery to its precise scope constraint so as to make its delivered artifacts more amenable to integration.

In current practice, coordination between static metasystems and the systems they manage is poor, being implicit or incidental. Coordination between integration systems and their corresponding deployed information systems is also poor.

A static metasystem contains static artifacts that are used primarily to specify and describe some aspect of the management of a system at a point in time. However, in a static metasystem, with the narrow exception of some artifacts such as diagrams drawn to the Unified Modified Language (UML) standard published by the Object Management Group Consortium (www.omg.org), and their supporting tools that may generate computer code, the artifacts are not dynamically inter-linked. That is to say, the relationship between artifacts is established tacitly—by convention.

The generic flow of current approaches is illustrated in FIG. 7A, which represents an abstraction of a structure 700 used in the production of a static deployed information system 707. A static integration metasystem 704 defines enterprise level standards, methods, processes and possibly architecture for the enterprise as a whole, in the form of static artifacts. The static integration metasystem 704 also establishes processes for audit or intervention and also coordination or regulations. The static integration metasystem 704 includes multiple tools which produce static artifacts, and are poorly integrated. The static integration metasystem 704 uses a static integration repository 701 that contains static artifacts.

At the deployed level, the static integration metasystem 704 and static integration repository 701 are used in the establishment of a static deployed information system 707. For example, the static integration metasystem 704 establishes standards, which in turn are meant to be adhered to at lower levels in the enterprise, using static deployed metasystems 705, to build systems for delivery to internal or external or nominal clients. The static deployed metasystem 705 may also operate static deployed information systems 707 for clients 703, and should follow integration standards supplied from the static integration metasystem 704. The static deployed metasystem 705 includes multiple known tools which are in general designed to produce static artifacts. They are also in general not integrated beyond the capability to support simple cut and paste. The static deployed metasystem 705 is used to produce a static deployed repository 702, which includes static artifacts for static deployed information systems 707. Compliance with policies and standards is effected through means such as process discipline, supported by audit and procurement processes.

The static integration system 706 is a shared environment that provides services to one or more deployed information systems 707. It contains shared known infrastructure including, but not limited to, shared servers; communications networks; and services such as management of the shared infrastructure; and component services that are exposed for use by one or more static deployed information systems 707. The static integration system is managed by the static integration metasystem 704.

A "client" 703 is a person representing the enterprise who understands the business need for the deployed information system. A "nominal client" is a representative of a presumed set of clients, as may occur in an entrepreneurial endeavor to produce a system for licensing to the public. Here, the term "client" is taken to include a nominal client.

A client 703 defines requirements for a deployed information system, which are recorded in the static deployed repository 702, and used to manage the static deployed information system 707. The resulting static deployed information system 707 is used by the client 703, or by purchasers of licenses for a system built for sale to the public, but typically contains few tools. To the extent that metasystem tools are packaged with the static deployed information system 707, these tools are static and not integrated.

In the military context, systems are categorized as mission systems and support systems. Mission systems are analogous to static deployed information systems 707. Support systems are analogous to static deployed metasystems 705.

The abstract current practice process representation in FIG. 7A is made more concrete in FIG. 7B, using the example of a static financial management system 714. A known instantiation of such a system is SAP™ from SAP AG, Waldorf, Germany (www.sap.com). FIG. 7B has the same structure as FIG. 7A, but replaces the abstract names in FIG. 7A with names that may be used in an instantiation.

FIG. 7B includes a financial management system 714, being an instance of a static deployed information system 707, and an enterprise environment, being an instance of a static integration system 706. It also includes an enterprise support system 711 that is an instance of a static integration system 704, and an enterprise repository 708 that is an instance of a static integration repository 701. In current practice, the enterprise support system 711 and the enterprise repository 708 are unlikely to be realized as cohesive or enduring units, but exist rather as composites of elements distributed throughout the enterprise.

FIG. 7B also depicts a financial management support system 712, being an instance of a static deployed metasystem 705 and a financial management repository 709 being an instance of a static deployed repository 702. In current practice, a financial management support system may be realized from time to time, embodied in projects that implement or upgrade a financial management system 714. In current practice, a financial management repository 709 is unlikely to be realized as a cohesive unit.

The current approach suffers the deficiencies that it does not formally recognize the existence of metasystems on the one hand; or the hierarchy of integration and deployed information systems on the other. The result is that metasystems are not managed as systems, and can become incoherent and largely unmanaged collections of static artifacts. Integration between systems occurs through poorly coordinated interfaces, usually point to point interfaces between pairs of systems.

The described approach results in a situation where metasystem artifacts are routinely inconsistent with each other, and are also inconsistent with the static deployed information system 707 that they were meant to manage. Manual or partly-automated techniques such as desk-checking, version control, and static configuration management represent attempts to alleviate the problem, but they depend upon conscientious conformance to a human process. The relationships of components within the metasystem are frequently either tacit or obscure, such as where relationships are explained in multiple large static textual documents or static diagrams. It is usually a requirement for quality assurance to check the fact that selected components of a metasystem have been produced so as to conform to a requirement of a project for delivery against a contracted set of artifacts. However, it is seldom the case that quality assurance extends to checking the detail of whether the metasystem is complete, accurate or sufficient. Routinely, even artifacts at different meta-levels in the same domain, e.g. logical and physical architectures, are connected to each other only tacitly—by convention.

The construction of static systems results in a situation where change is treated inappropriately as a departure from normal operation. Change is more correctly viewed as the continuous state of information systems. After the static deployed information system 707 has commenced productive operation, changes will occur constantly in business, technology or other environments, and many of these changes will necessitate change to the system. Environmental change may affect the static integration system 706, and lead to cascading change requirements in multiple static deployed information systems.

Environmental change will often require that the existing static deployed information system 707 should be reviewed to determine whether it remains the appropriate solution for current circumstances. In a static system, such review requires the client 703 or the metasystem user 505 to go to the static deployed repository 702 and the static integration repository 701 in order to understand the detail of the static deployed information system 707, and its use of the static integration system 706. Static repositories will contain numerous artifacts, built at different times for different purposes, and usually physically stored across multiple locations. The review must assess the current situation in the environment, and also the new environment, especially business and technology environments. The review must then identify business and technology options for adaptation to any change and compare these options for perceived effectiveness. After comparing the effectiveness of different options, the review must select the most appropriate option for response to the change.

If the selected option is not to maintain the status quo, a change to the solution is required and the organization must design a new solution and a transition to the new solution. The new business and/or technology solutions must then be built, and change management invoked to deploy the new information system. These redesign and change management tasks would be performed by different people using diverse tools, and would require use of static artifacts that describe different aspects of the static deployed information system 707, with no promise of consistency or accuracy. The results of the work would be captured in a similar array of artifacts, with similar qualitative properties.

Given a static integration system, there is a high probability that multiple projects, or multiple people within any one project, would undertake similar work, leading to unnecessary duplications, overlaps and inconsistent usage of information. There is also a strong probability that there will be gaps, where some change requirements are not recognized as belonging to any project, and so are not addressed by any. The net effect is the changed systems will require workarounds such as manual processes for reconciliation of data. This gives rise to ongoing operational issues around integration. This is a common situation in enterprises, even in ERP systems and core business systems. Gaps, overlaps and workarounds draw the attention of management auditors.

Current tools, methods, and practice are specialized towards this static view of both metasystems and systems, and are generally limited in scope to either technology or human processes.

A partial departure from the static view of the world is the UML standard (http://www.omg.org/technology/documents/modeling_spec_catalog.htm#UML), which addresses both process and parts of technology. However, the UML standard is not designed to be part of a dynamic system, or a dynamic metasystem. The same is true of current high-end Enterprise Architecture systems such as the PTech Enterprise Framework™ from Plains Technology Inc, of Fargo N. Dak., and the Popkin System Architect™ available from Telelogic North America Inc, of Irvine, Calif. These tools, whilst comprehensive within a static scope, are not intended for dynamic use throughout the life of a system, nor for deployment to day-to-day administrators and managers.

The Visio™ tool supplied by Microsoft (www.microsoft.com) provides for the inclusion of some logic behind graphical objects, and can generate database definition statements and emit some computer code from a UML diagram. However, Visio's primary focus is upon the creation of two-dimensional diagrams, and the tool does not support management of a dynamic system.

There are several published frameworks for enterprise architecture (e.g. John Zachman's Framework for Information Systems Architecture (www.zifa.com), the Open Group's Architecture Framework (TOGAF, www.opengroup.org/togaf/) and the C4ISR architecture framework of the US Department of Defense www.fas.org/irp/program/core/c4isr.htm) which define views of the data to be included in artifacts. In addition, many organizations define their own frameworks, which may be derivations of one or more of the published frameworks.

The frameworks define content, and establish rules for connection between artifacts. However, the frameworks take a static view of artifacts. The consequence of reliance on static practices and work-products is unnecessarily high costs, delays and risks that are incurred in workarounds throughout the life of a static system. These costs and risks arise where manual audit becomes necessary to validate artifacts, and where edit or replacement become necessary for them to be reliably usable. The consequences of changing a system based on false premises may include leaving the changed system in a non-functional state.

A deployed dynamic information system, method for making a change to an information system formed as a deployed information system and a deployed metasystem, a persistent dynamic repository, and a dynamic information system software tools also are disclosed. Other aspects are disclosed.

SUMMARY OF THE INVENTION

Fundamentally, this invention discloses the concept of a dynamic metasystem managing a dynamic system, achieved through the use of, and an environment (i.e., tools and ontologies) supporting dynamic artifacts.

A system for generating a dynamic information system comprises a persistent dynamic repository of data and an integration metasystem. The repository forms an asymmetric navigational database, and the database includes an ontology model. The ontology model has an abstract model framework that supports creation and use of multi-dimensional and asymmetric abstract models of data, and views which define the content and form of presentation of that data using a computer. The integration metasystem includes components that describe components of shared infrastructure and services of an enterprise architecture, and a dynamic information system software tool generating artifacts representing information and views that define the presentation of data. The artifacts are provided to the ontology model, and have interfaces to the abstract model framework that permit creation, reading and modification of the contents of the asymmetric navigational database.

DETAILED DESCRIPTION OF THE INVENTION

Introducing Metasystems

Systems and their integration are a fundamental resource of most enterprises. It follows that a system for the management of this resource can itself be viewed as a type of ERP system 16, one that manages as a resource the plurality of information systems deployed by the enterprise. This gives rise to a new view of systems. A system that manages the systems resource is described as a metasystem. The metasystem embeds data representing information that describes the system.

Figure 3:
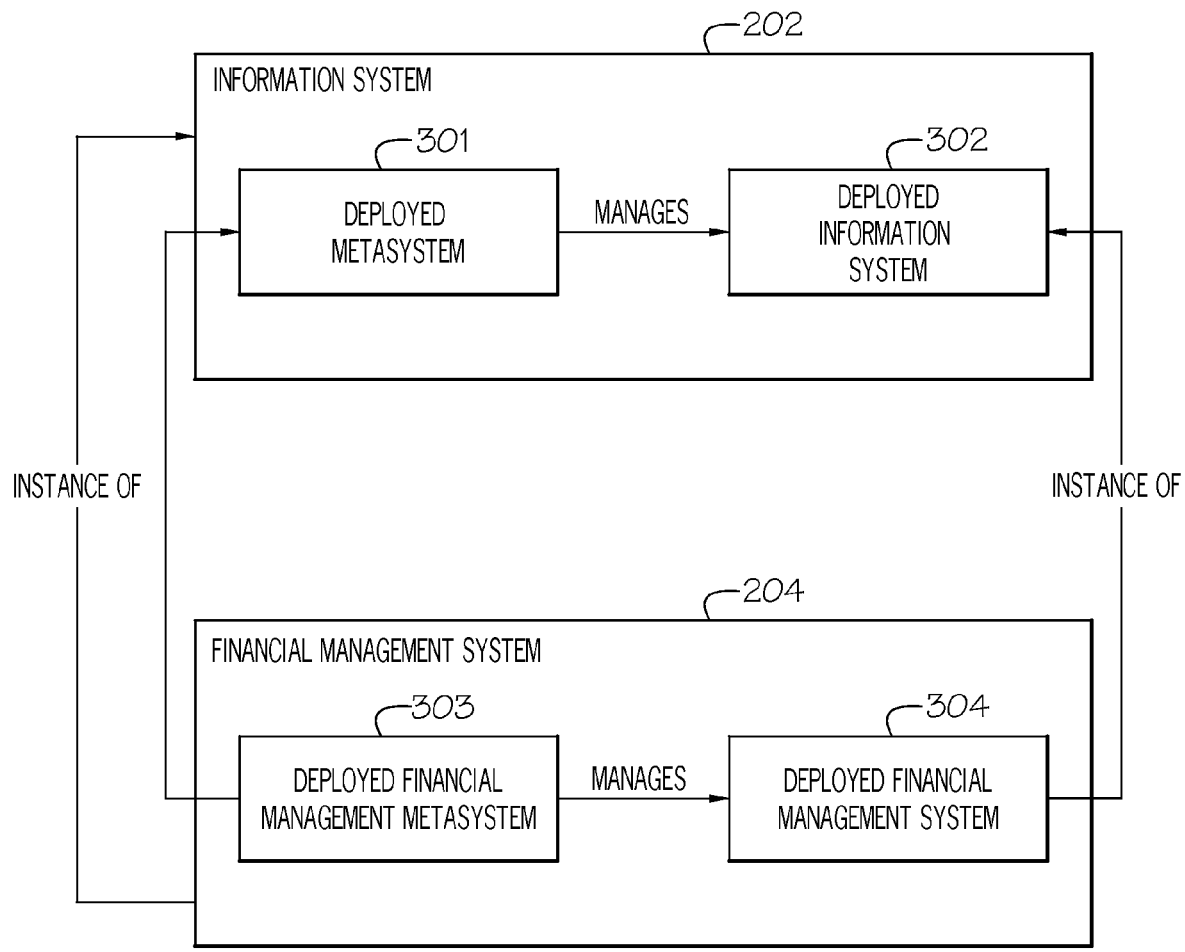
FIG. 3 is a schematic block diagram showing components of an information system and a concrete example being a financial management system.

An information system that reaps business value, by directly supporting the attainment of some business purpose of the enterprise is termed a "deployed information system" 302, as shown in FIG. 3. An example is a deployed financial management system 304. An information system that supports management of a deployed information system is termed a "deployed metasystem" 301. An example is a deployed financial management metasystem 303. Here, the information system 202 is defined as comprising two component systems, namely the deployed information system 302, and the deployed metasystem 301 which manages the deployed information system 302. In an example, a financial management system 204 is an instance of an information system 202. It has two components, being a deployed financial management system 304, which is an instance of a deployed information system 302, and a deployed financial management metasystem 303, which is an instance of a deployed metasystem 301. The deployed financial management metasystem 303 manages the deployed financial management system 304.

Figure 4:
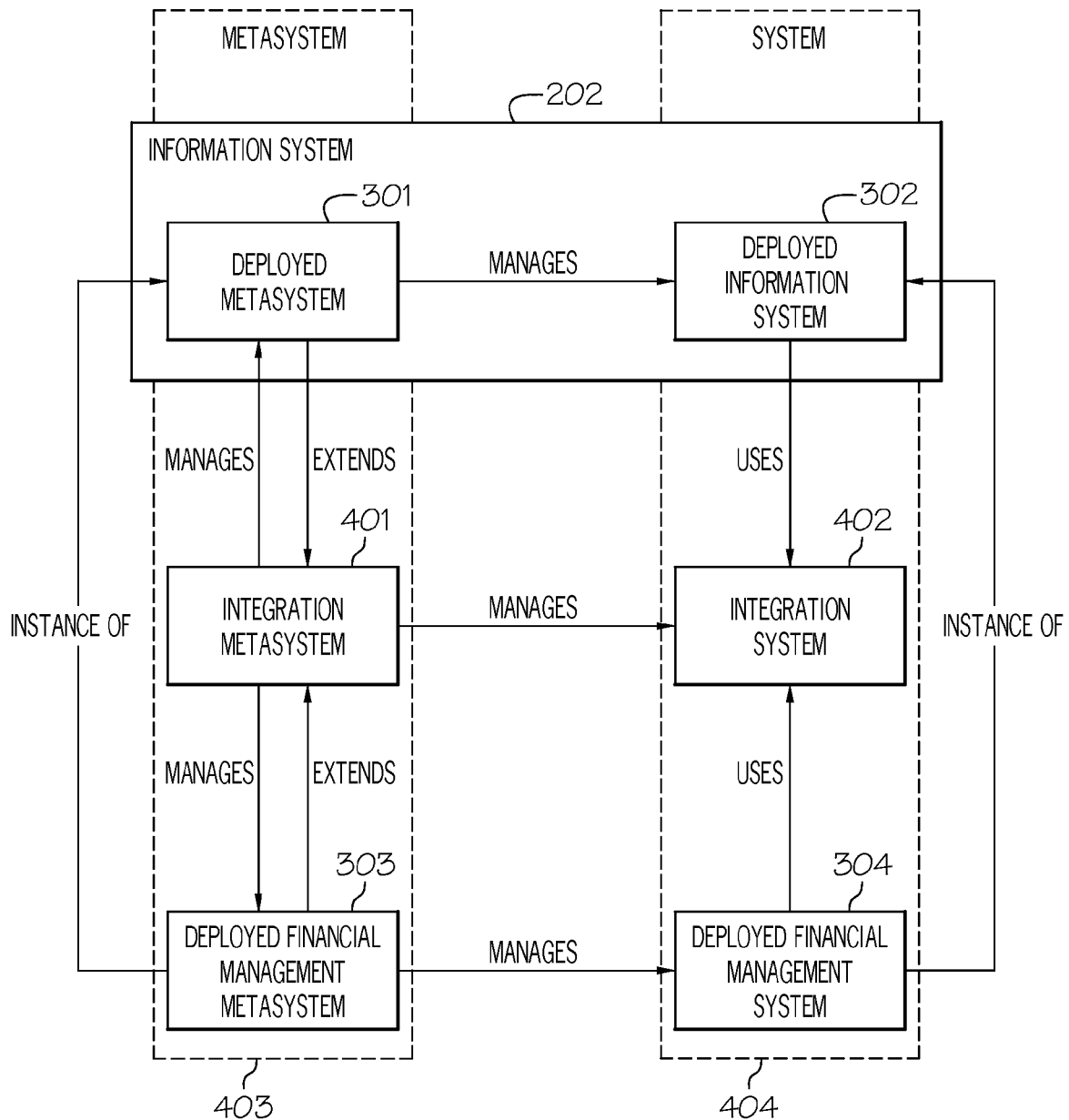
FIG. 4 is a schematic block diagram that extends FIG. 3 to introduce the integration metasystem and the integration system.

An information system that contains the shared components needed for integration of deployed information systems is termed an "integration system" 402, as shown in FIG. 4. An information system that manages an integration system is termed an "integration metasystem" 401.

FIG. 4 also highlights the main relationships between the integration and deployed components. The integration system 402 is used by the deployed information system 302, and hence by an instance of a deployed financial management system 304, for access to shared integration components such as hardware, communications services, and shared management services. The deployed metasystem 301, and hence an instance of a deployed metasystem 301 such as a deployed financial management metasystem 303, extend the integration metasystem 401, and are managed by the integration metasystem 401.

Here, "to extend" means to inherit shared components such as tools and methods, and to modify or localize them as necessary to suit specific requirements of the deployed metasystem 301, and hence instances of a deployed metasystem s301 such as a deployed financial management system 303.

Here, the term "system" 404 refers to both a deployed information system 302, including instances such as a deployed financial management system 304, and an integration system 402.

Here, the term "metasystem" 403 refers to both a deployed metasystem 301, including instances such as a deployed financial management metasystem 303, and an "integration metasystem" 401.

The terms "management of a system" or "to manage a system" refer to the multiple processes, tasks and activities that are necessary to ensure that the system being managed should function satisfactorily, including but not limited to methods, processes, tasks and activities related to governance, description, architecture, design, explanation, teaching, acquisition, construction, configuration, deployment, operation, monitoring, reporting, maintenance, service delivery and service support, and coordination of the managed system.

Visible elements of metasystems include, but are not limited to, tools, methods, information and people.

In the context of a metasystem, tools include but are not limited to hardware, system software, communications infrastructure, and application software that support aspects of management of a system.

In the context of a metasystem, methods include but are not limited to processes, procedures, techniques, and management and operational structures.

In the context of a metasystem, information is represented in artifacts including but not limited to frameworks, patterns, standards, training material and other intellectual capital.

The term "artifacts" is used to refer to the devices that contain data and present that data as information, including but not limited to documents maintained by common office technology such as word processors, drawing tools, and spreadsheet tools; database management software; and specialized known tools such as modeling, project management, or requirements definition and tracking software programs. Artifacts may be static, or dynamic.

Figure 5A:
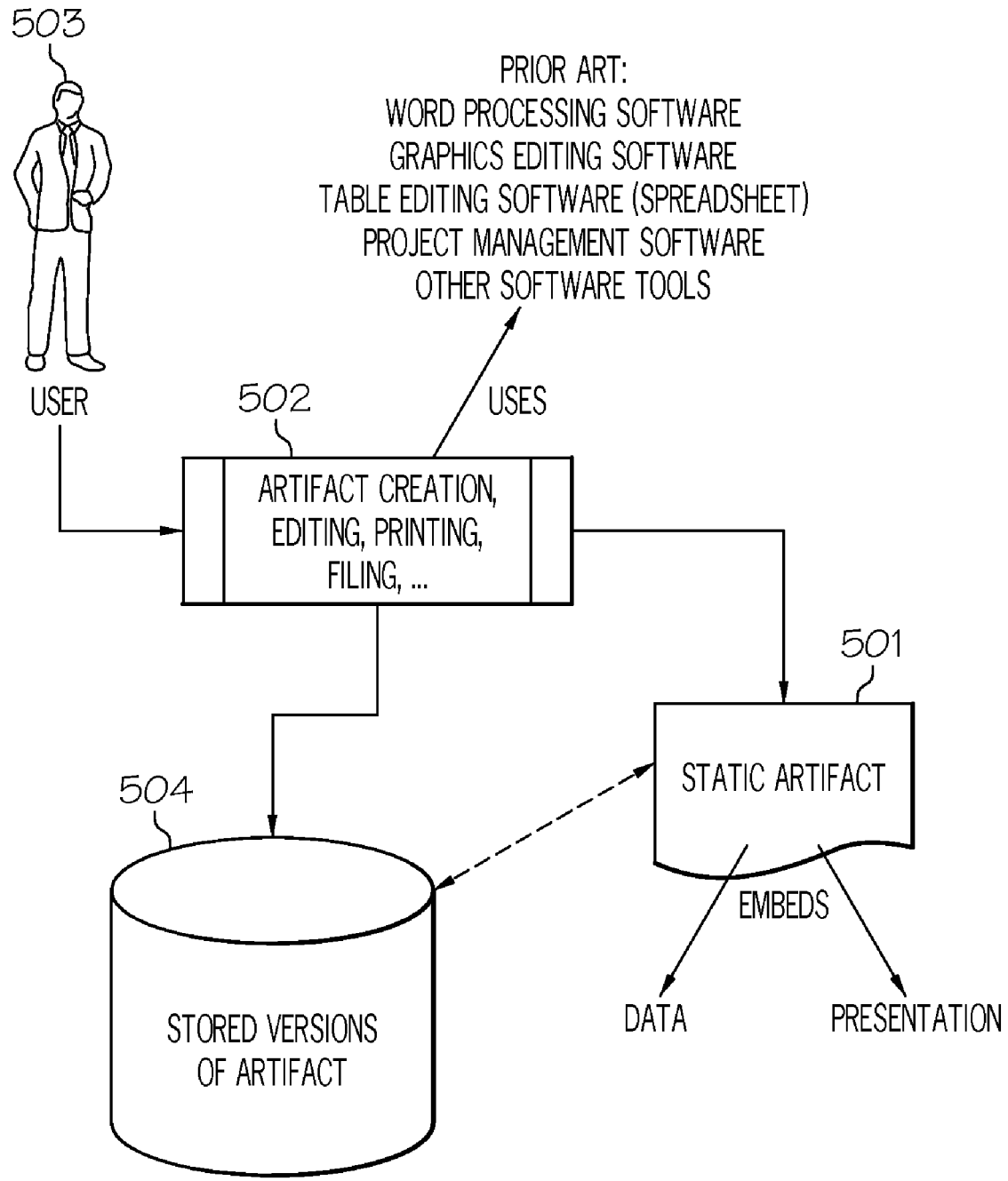
FIG. 5A is a schematic block diagram depicting a static artifact and its maintenance process.

A "static artifact" is an artifact 501, as shown in FIG. 5A, that normally exists as a standalone completed piece of work as the direct product of a data entry process 502 undertaken by one or more human users 503, such as a document produced using known computer software tools, for example word processors, graphics editors, table editors, or project management or scheduling software. Such artifacts move from version to version through a human process of update and re-dissemination. Static artifacts may exist only in hard copy form 501, but are usually constructed with a known software tool 502, and stored as document images on electronic storage devices 504. These artifacts are not normally updated automatically in response to changes in other artifacts that contain related data.

In the context of a metasystem, people participate in many roles, including but not limited to those concerned with governance, resource management, analysis, architecture, design, development, testing, training, infrastructure operation and management, performance operation and management, and security. These roles are here termed "metasystem roles".

Figure 5B:
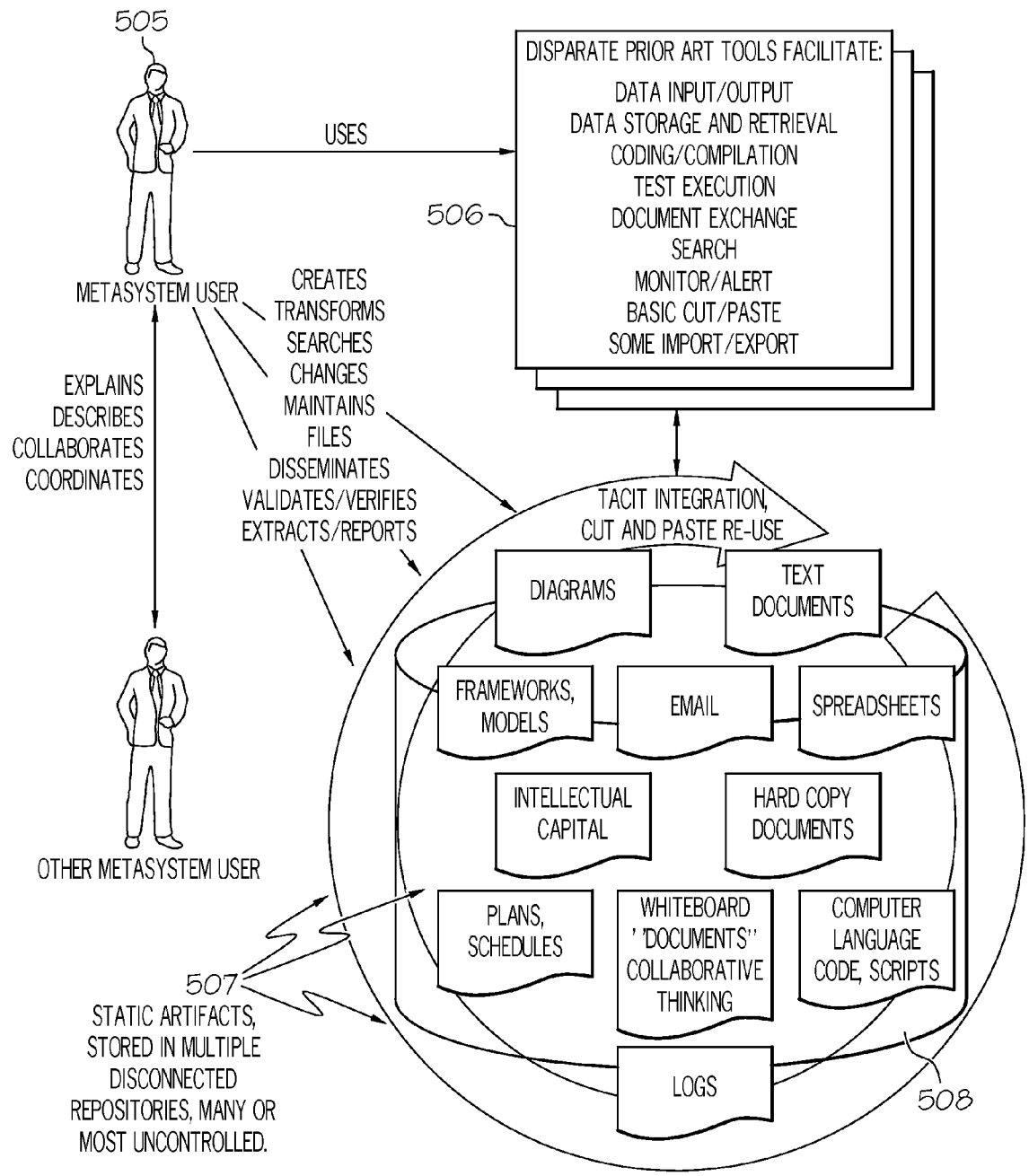
FIG. 5B is a schematic block diagram depicting a high level process for the use and maintenance of static artifacts.

"Metasystem users" 505, shown in FIG. 5B, are human users undertaking system management tasks, or performing metasystem roles. The process for undertaking metasystem tasks in a static system includes use of disparate known tools 506, working with static artifacts 507 that may be stored as document imaged on electronic storage devices 508.

Metasystem users 505 use a plurality of known computer software tools 506 in order to create static artifacts 507. Metasystem users 506 also use these known computer software tools 506 for purposes including but not limited to transforming static artifacts 507 into different forms and formats; searching the content of static artifacts 507, applying changes to static artifacts 507; maintaining static artifacts 507 over time to accommodate change and to synchronize the content of a plurality of static artifacts 507 over time; filing electronic document images in a structured filing system; disseminating copies of the static artifacts 507 to other metasystem users 505; validating and verifying the content of static artifacts 507; and extracting parts of static artifacts 507 or reporting in aspects of the content of static artifacts 507 in support of disparate metasystem roles.

Metasystem users 505 also use known computer software tools 506 to assist in communication with other metasystem users 505 for purposes including but not limited to explaining and describing the subject matter described in static artifacts 507; collaborating on the performance of metasystem roles; and coordination of the performance of metasystem roles.

Static artifacts 507 include but are not limited to text documents; spreadsheet documents; diagrams; plans and schedules; computer language code and scripts; architectural frameworks; architectural models; general intellectual capital including examples of other work; logs generated as a by-product of the operation of computer software; and electronic mail. Static artifacts may also include documents that are available to metasystem users 505 in non-electronic media including hard copy such as books or monographs; and in media such as handwritten notes or annotations to hard copy documents, or on whiteboards. Static artifacts 507 may also include audio or video recordings, and images such as photographs.

Known computer software tools 506 assist many of the tasks of metasystem users by facilitating the entry of data into an electronic form, and subsequent output of that data through use of a plurality of mechanisms including but not limited to printing to hard copy; playback of audio or video recordings, display of data on a screen or through an assistive technology such as a tactile device.

Static artifacts 507 stored in electronic form are usually stored in multiple types of electronic repository 508, including but not limited to local storage on computers belonging to or assigned to individual metasystem users 505; shared repositories accessible to a plurality of metasystem users 505; controlled backup copies of shared repositories; backup copies of local repositories; and extracted examples of static artifacts in a corporate repository for re-use by metasystem users 505 in the broader corporate or public context.

Because static artifacts usually reflect data created in standalone construction, there can be no guarantee that any one artifact presents information that is ever fully consistent with that presented in any other such artifact. Consistency and accuracy depend entirely upon the skill, knowledge and discipline of the individual human operators.

Static artifacts relating to information systems are constrained to two-dimensional views, because they are, or are a representation of, text or graphics printed on paper, which is a two-dimensional medium. Because of this, any model of a reality that exists in multiple dimensions must be presented in multiple artifacts, or in multiple places in a single artifact. Further, because a static artifact is the container of both data and presentation, both the accuracy and consistency of underlying data presented in multiple views depend upon the discipline and skill of the user in replicating data from one view to another. The two-dimensional constraint exerts a powerful influence upon the design and use of elements fundamental to the management of systems, such as processes, methods, architectures, structures, and thinking itself.

The situation is somewhat different in engineering systems, for example where scaled-down physical models, as of a ship, can be designed in rendered three-dimensional views using tools such as computer-aided design (CAD) software, then built in three dimensions, and used to test some physical performance characteristics. It can also be different in some parts of information systems where simulations or prototypes (scaled-down models) can be built to test operation of system components under a range of specified conditions. These specialized artifacts (models, simulations, or prototypes) are not part of the normal scope of management of information systems.

The use of static artifacts within a metasystem gives rise to another serious weakness in that these artifacts represent the whole information system at a set of points in time, namely the times when the artifacts were produced. That information system becomes difficult to change unless all of the static artifacts are continuously and accurately maintained over time. If there is a discrepancy between the information presented by any two static documents, then the correct information must be ascertained by inspection of the actual components of the end-system, such as by reading and interpreting computer code and configuration files, and physical examination of hardware components. This is a difficult and time-consuming process, and impairs the ability of the enterprise to manage change.

The integration of data presented as information in static artifacts is often tacit. Mechanisms such as explicit cross-referencing between static documents is typically at the document level, such as a where a document contains a list of related documents. Whilst the use of standards for documentation is a useful integration tool, its employment depends on discipline in the metasystem user 607 community, as shown in FIG. 6B.

Figure 6A:
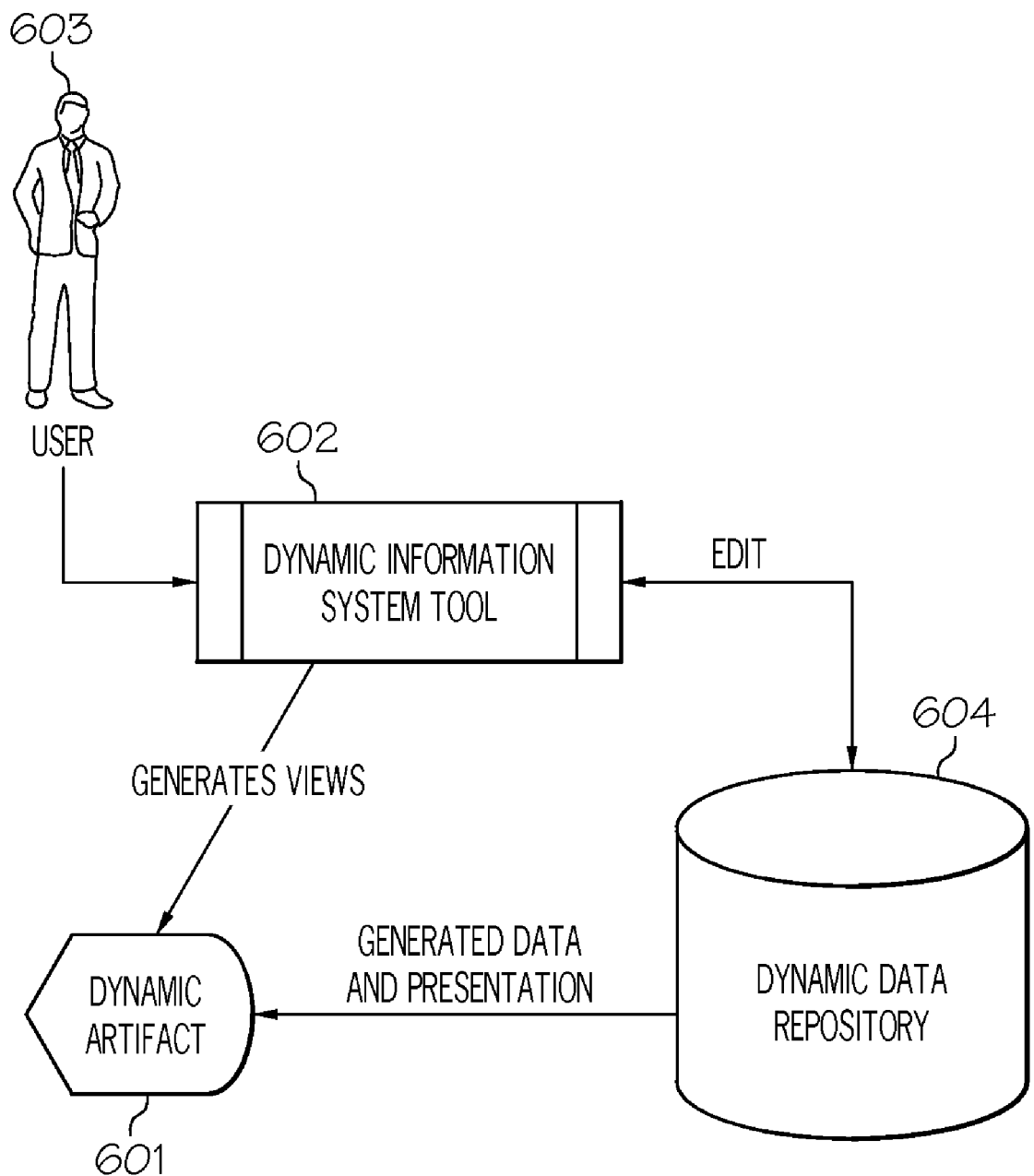
FIG. 6A is a schematic block diagram depicting a dynamic artifact and its maintenance process.
Figure 6B:
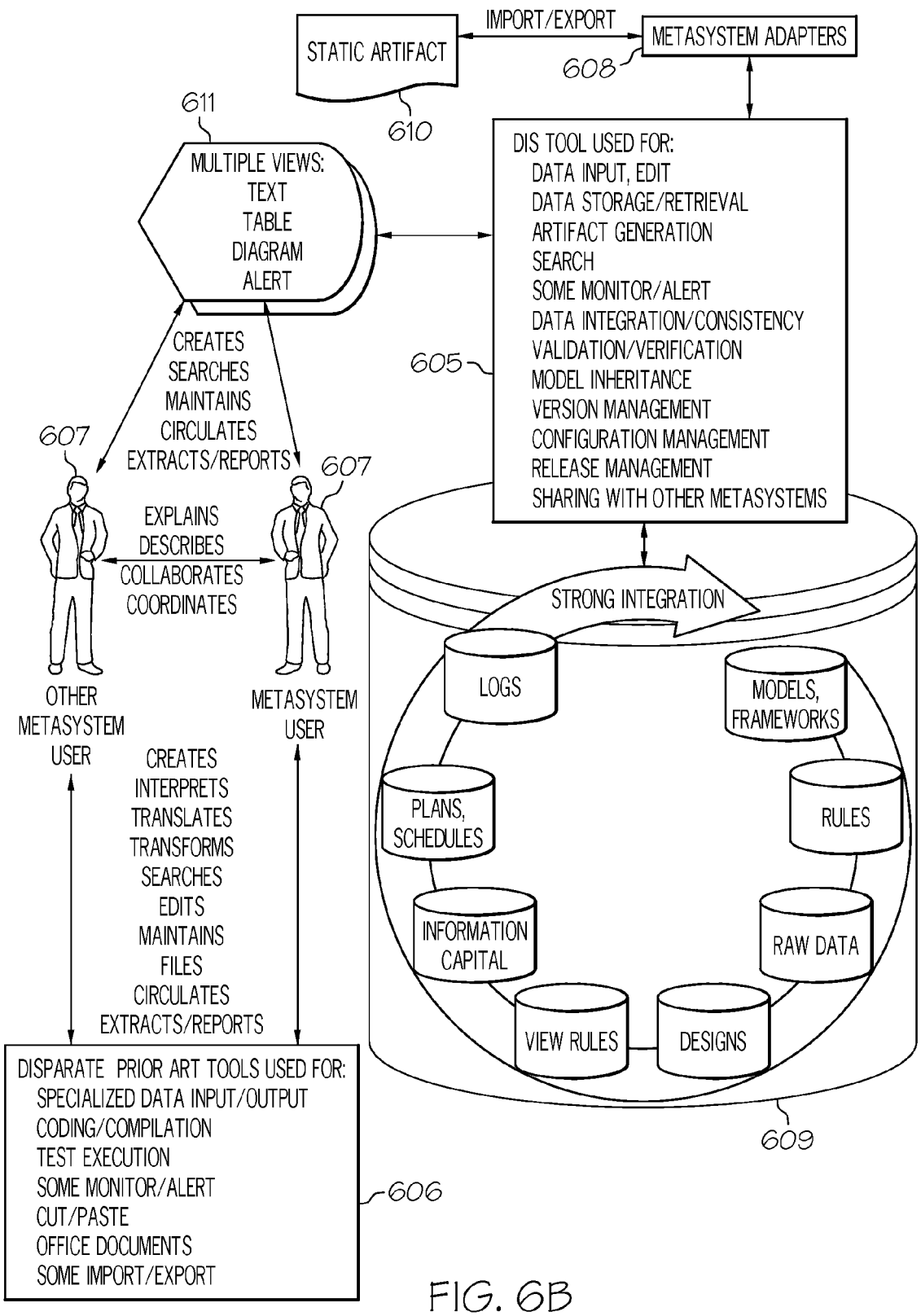
FIG. 6B is a schematic block diagram depicting a high level process for the use and maintenance of dynamic artifacts.

As shown in FIG. 6A, a "dynamic artifact" 601 is a transient artifact that is normally generated by a computer program tool 602 either on request by a user 603, or as the outcome of some system event, and that reflects the then current state of a common set of data 604 in the metasystem. The data and the presentation rules are each created by users 603 using the tool 602. An example is an Internet web page produced by a system that populates the page with data extracted from a database. A common such example is a catalog that is part of an on-line store. A catalog produced as a static artifact would typically be printed and distributed periodically, for example weekly or monthly, and could not present an accurate picture of stock levels. However, a catalog generated as a dynamic artifact in an Internet web page could present a picture of stock levels that was accurate within a period of a few minutes, since sales affecting stock levels are updated continuously.

The term "metasystem data" is used to refer to the data, stored in a dynamic data repository 604 that describes a system and its components, and also the data that describes rules for presentation of that data within dynamic artifacts.

A "dynamic metasystem" is a metasystem that is built to store in a repository both data that represents information and, distinctly and separately, data that describes the presentation of that information. Presentation of data in the form of text, diagrams, forms, or tables is the result of a view generation process, which obtains the necessary presentation description from the repository at the time of viewing. The artifacts are therefore dynamic artifacts. A "static metasystem" is a metasystem that is not a dynamic metasystem.

A "dynamic information system" is a system that is managed through a dynamic metasystem. A "static information system" is an information system that is not a dynamic information system.

The term "dynamic artifact" refers to the generated metasystem data as assembled by a computer program within a generated view and presented to the metasystem user in a transient and active view 601. This artifact may be presented through use of a plurality of mechanisms including but not limited to display of data on a screen or through an assistive technology such as a tactile device; or playback of audio or video recordings, or generated audio or video.

Generated dynamic views 601 may also be reproduced as static artifacts by printing to hard copy, or by being saved as electronic "soft-copy documents" being images of the generated dynamic artifact that exist on computer storage media, and may be viewed or printed. Any hard-copy or soft-copy reproduction of a dynamic artifact is not itself a dynamic artifact, but rather a versioned and time-bound image of reality at a point in past time—a static artifact.

A dynamic artifact may also be saved to computer storage media as a specification for the re-generation of the artifact. By viewing this artifact through a suitable tool 602, the metasystem user obtains a current version of the artifact—a dynamic artifact 601.

Whereas a static artifact combines both the data and the presentation of information into a single document, a dynamic artifact 601 is generated from the data that describes a system and its components, and the data that describes rules for presentation of that data. This permits presentation of the same set of data can be through a plurality of views. When a view is generated by the system, it presents information that represents the current state of data as edited by all metasystem users 603, and not just that edited by the user requesting generation of the view.

FIG. 6B illustrates the process for metasystem users 607 undertaking system management tasks in a dynamic system using a dynamic information system tool "DIS tool" 605, working with a dynamic data repository 609 that contains the data and rules necessary to generate dynamic artifacts.

The dynamic process of FIG. 6B differs from the static process of FIG. 5B in several respects:

- The DIS tool 605 is the primary tool for metasystem users 607 to undertake data input and edit; to manage metadata retrieval and search; to request generation of transient and active views of dynamic artifacts; and to request printing or saving of images of these dynamic artifacts in the form of static artifacts in hard copy or electronic form;
- The DIS tool 605 presents metadata as dynamic artifacts through multiple views 611 for edit and presentation;
- The DIS tool 605 manages data storage and retrieval within a multi-layered data repository 609, and links metadata into an inheritance framework;
- The DIS tool 605 undertakes automatic validation and verification of the data created by or modified by users as it is entered into the system, and alerts the user to any issues detected;
- The DIS tool 605 directly supports version management, configuration management, and release management, such support being configured by rules into corresponding processes for version management, configuration management and release management;
- Through an inheritance structure between data repositories 609, the DIS tool supports the sharing of metadata between linked instances of dynamic systems.

Metasystem users 607 use the DIS tool 605 for purposes including but not limited to creation, searching, maintenance, circulating, extracting and reporting of metadata.

Metasystem users 607 may also use known static tools 606 to undertake some specialized tasks such as specialized data input and output, as of computer language code; compilation and execution of computer code; and creation and editing of common office documents.

Using a metasystem adapter 608, metasystem users 610 may also import into or export from the data repository static artifacts 610 in the formats produced by some known tools 606.

Here, "importing" of static artifacts refers to a process whereby the contents of a static artifact in electronic form are read by the DIS tool 605 and these contents are further processed by the tool, with assistance from a human user, to organize their meaning in such a way that the DIS tool 605 can use the data extracted from the static artifact as a basis for subsequent management of dynamic artifacts.

Here, "exporting" of static artifacts refers to a process of using the DIS tool 605 to render dynamic artifacts in an electronic form that may be subsequently be further processed by a human user using known tools 606.

In relation to static artifacts, metasystem users will create, interpret, translate, transform, search, edit, maintain, file, circulate, extract and report on these artifacts in the ways that are supported by the relevant known tools.

Metasystem users 607 also use both the DIS tool 605 and known computer software tools 606 to assist in communication with other metasystem users 607 for purposes including but not limited to explaining and describing the subject matter described in dynamic artifacts 611; collaborating on the performance of metasystem roles; and coordination of the performance of metasystem roles.

Dynamic artifacts 611 that may be managed through the DIS tool 605 and the dynamic data repository 609 include but are not limited to frameworks, patterns, standards, training material, rules, designs, plans, schedules, and other intellectual capital.

Overview of the Dynamic System Process

Figure 2:
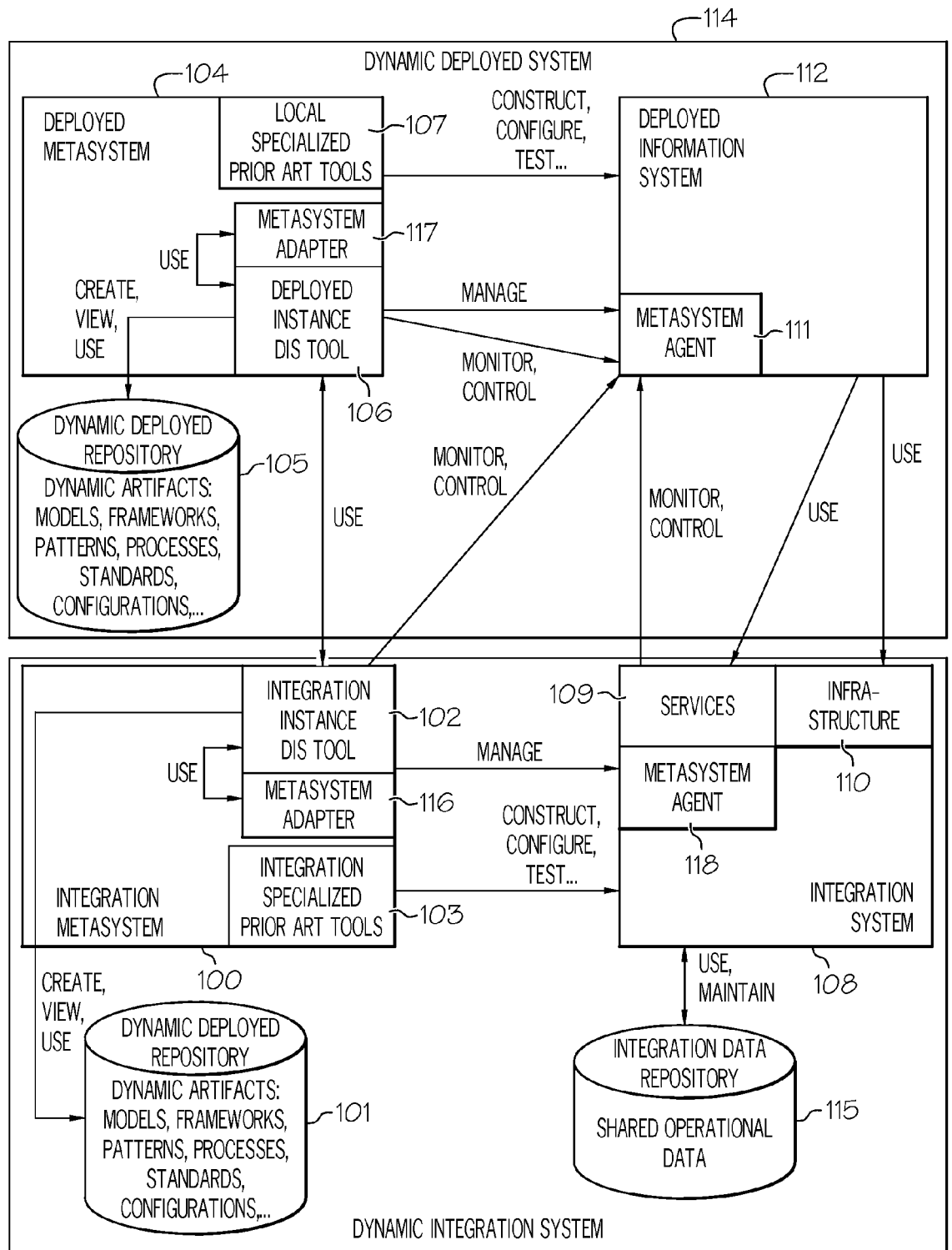
FIG. 2 is a schematic block diagram showing the interactions between an integration metasystem, an integration system, a deployed metasystem and a deployed information system.

As seen in FIG. 2, an integration metasystem 100, a dynamic integration repository 101, and an integration system 108 together constitute a dynamic information system 113. A dynamic integration system 113 is used for integration of one or more dynamic deployed systems 114, and generation of deployed metasystems 104.

In FIG. 2, a dynamic deployed system 114 is made up of a deployed information system 112, a deployed metasystem 104 and a dynamic deployed repository 105. The Dynamic systems 113, 114 each embed self-referential system metadata, in their respective repositories 101, 105; expose the system metadata through a metasystem to metasystem users; and provide a practical means for maintaining consistency of the system metadata with the reality of the respective instantiated systems.

All system metadata of a dynamic information system are explicitly and actively inter-linked. The system metadata itself may be based on any of the available enterprise architecture frameworks or an organization's internally-developed framework.

The Dynamic systems 113, 114 each maintain persistent versioned system metadata objects in a repository 101, 105 at a canonical level. The system metadata includes rules for generation of dynamic artifacts. This means that data is reduced to the simplest and most significant form possible without loss of generality for all relevant levels of abstractions.

A dynamic integration system 113 constructs within its dynamic integration repository 101 views of versioned system metadata for the integration of a plurality of dynamic deployed systems 114. The Dynamic system, 113, 114 each include a Dynamic Integration System (DIS) tool 102, 106 that supports multiple views of the system metadata in their respective repositories 101 and 105, for a plurality of classes of users.

A dynamic integration system 113 produces the deployed metasystem 104 for all dynamic deployed systems 114.

The deployed metasystem 104 produces the deployed information system 112.

Figure 7A:
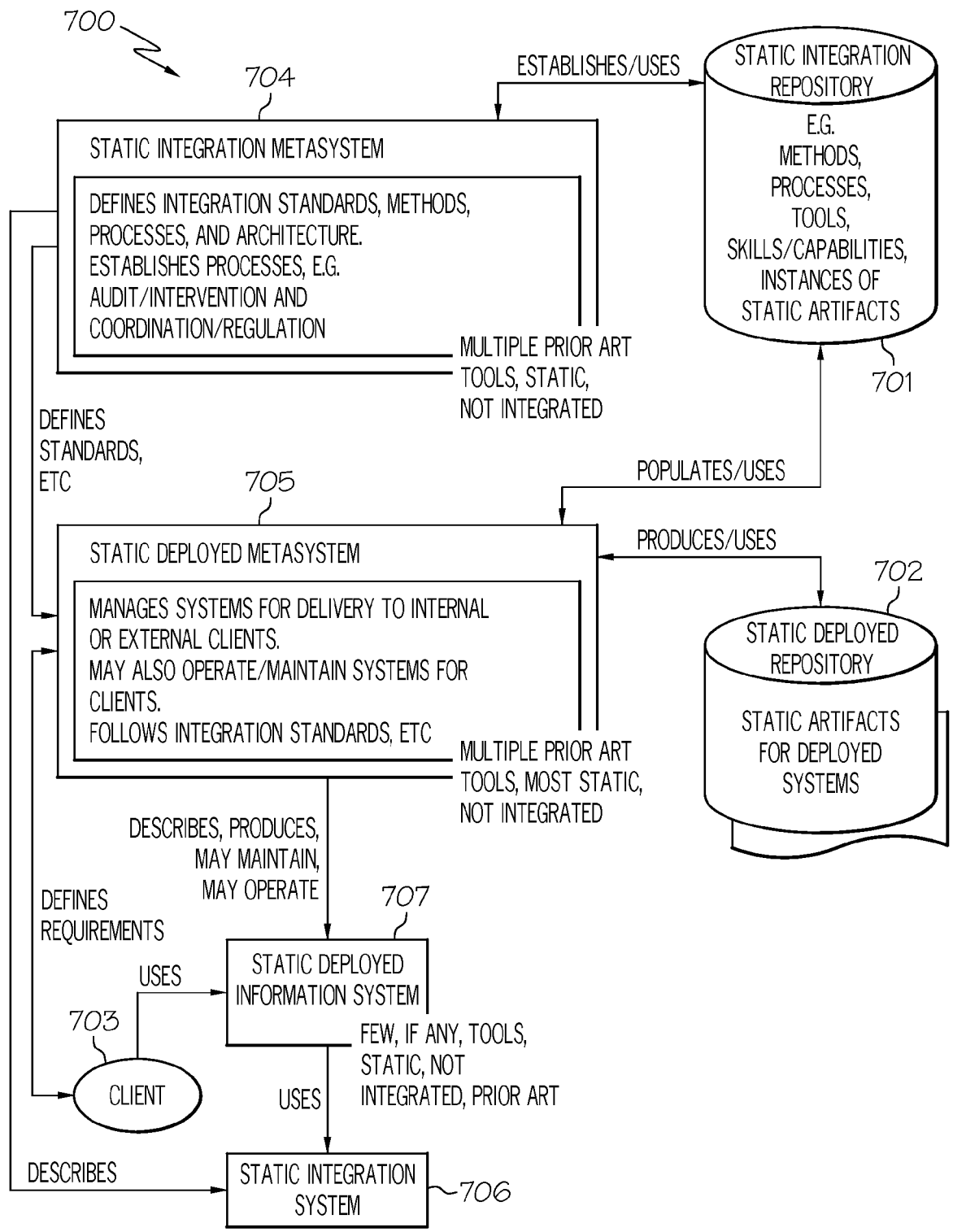
FIG. 7A is a schematic block diagram depicting a known process for management of static metasystems and systems, being both deployed and integration systems.
Figure 7B:
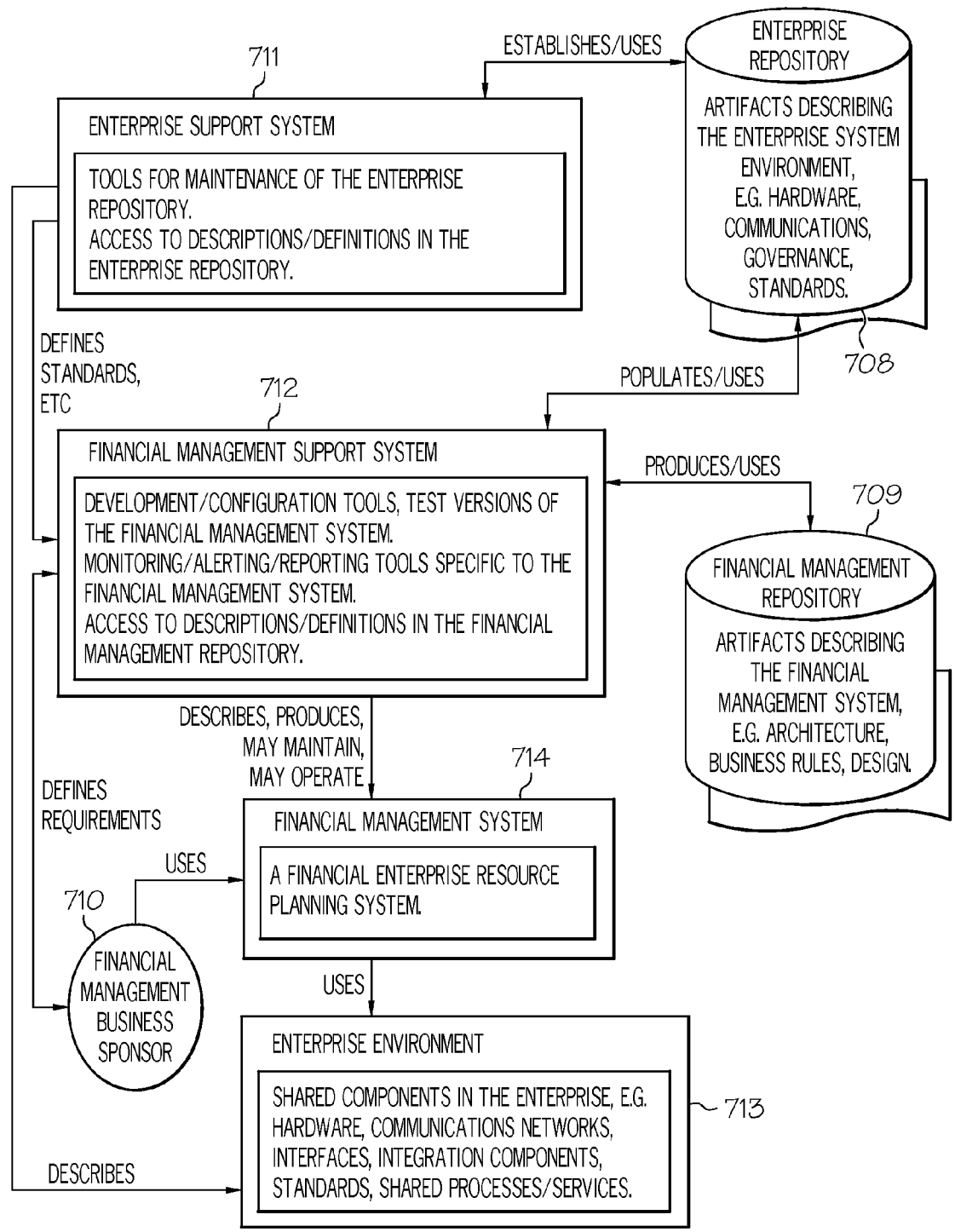
FIG. 7B is a schematic block diagram that extends FIG. 7A to incorporate as an example a known financial management information system.
Figure 8A:
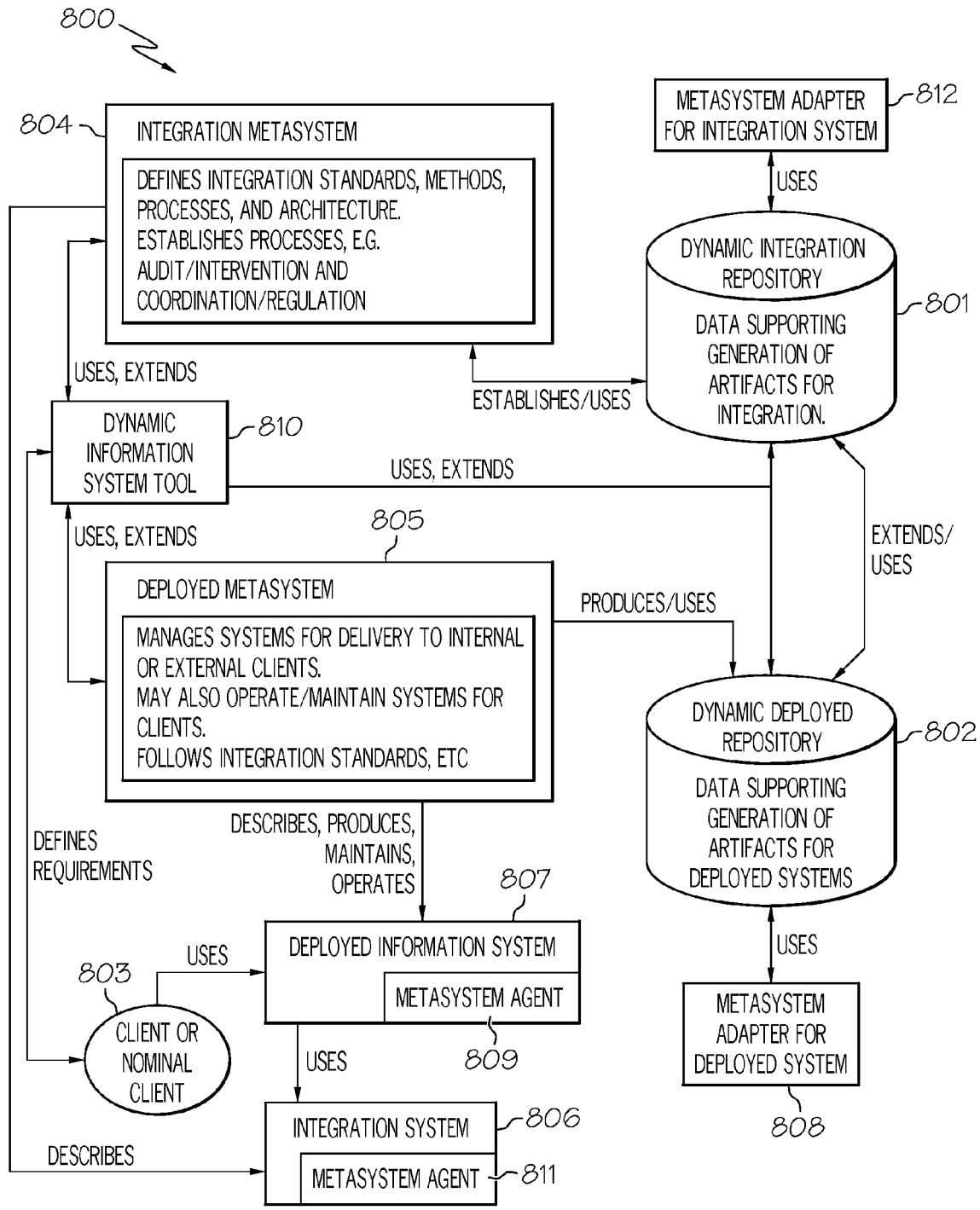
FIG. 8A is a schematic block diagram that depicts a process using dynamic metasystems and systems, and a dynamic information system tool.

The dynamic system components of FIG. 2 are re-drawn in FIG. 8A, in a structure parallel with that of FIG. 7A, to highlight the differences between a static system process and a dynamic system process. The key differences arise from the use of the DIS tool 810 as part of both the integration metasystem 804 and the deployed metasystem 805; the use of a dynamic integration repository 801 and a dynamic deployed repository 802; and the use of metasystem agents 809, 811 in the deployed information system 807 and the integration system 806; and metasystem adapters 808, 812.

The DIS tool 810 is used to present views to the client 803 or metasystem user 505, through which they may create, edit and/or view dynamic artifacts in the dynamic repositories 801, 802.

The dynamic repositories 801, 802 contain data supporting the generation of dynamic artifacts. This data comprises the metadata that describes views of information, and the data that represents the information to be used in populating those views. Collectively, in this context, these data are referred to as "metasystem data".

The metasystem adapters 808, 812 provide interfaces that may be used with some known tools so that static artifacts produced by these known tools can be imported into and/or exported from the DIS tool 810, and hence the dynamic repositories 810, 802.

Figure 8B:
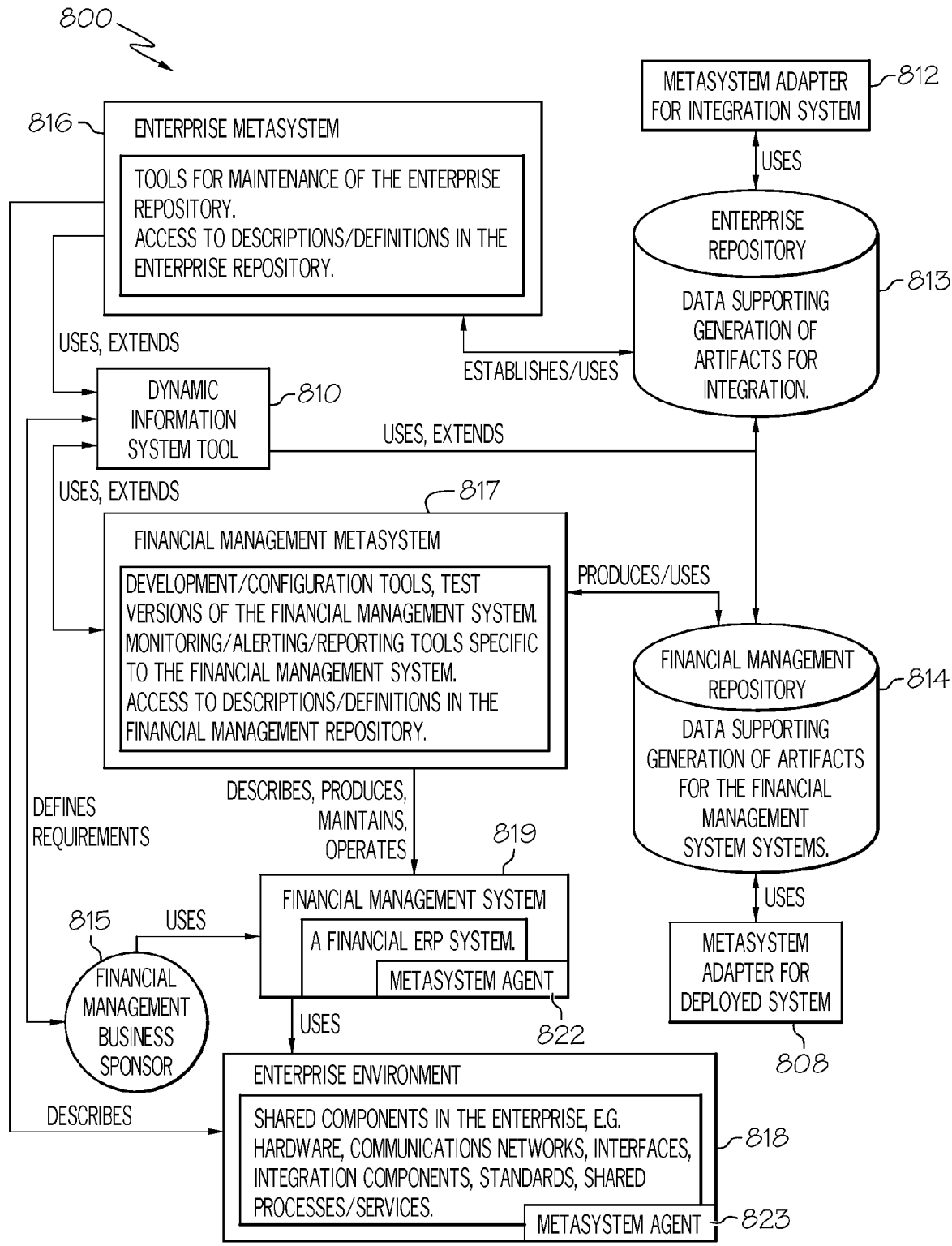
FIG. 8B is a schematic block diagram that extends FIG. 8A to incorporate as an example a financial management system.

FIG. 8B replicates the structure of FIG. 8A to show an example using a Dynamic Financial Management Metasystem 817 and System 819.

Figure 8C:
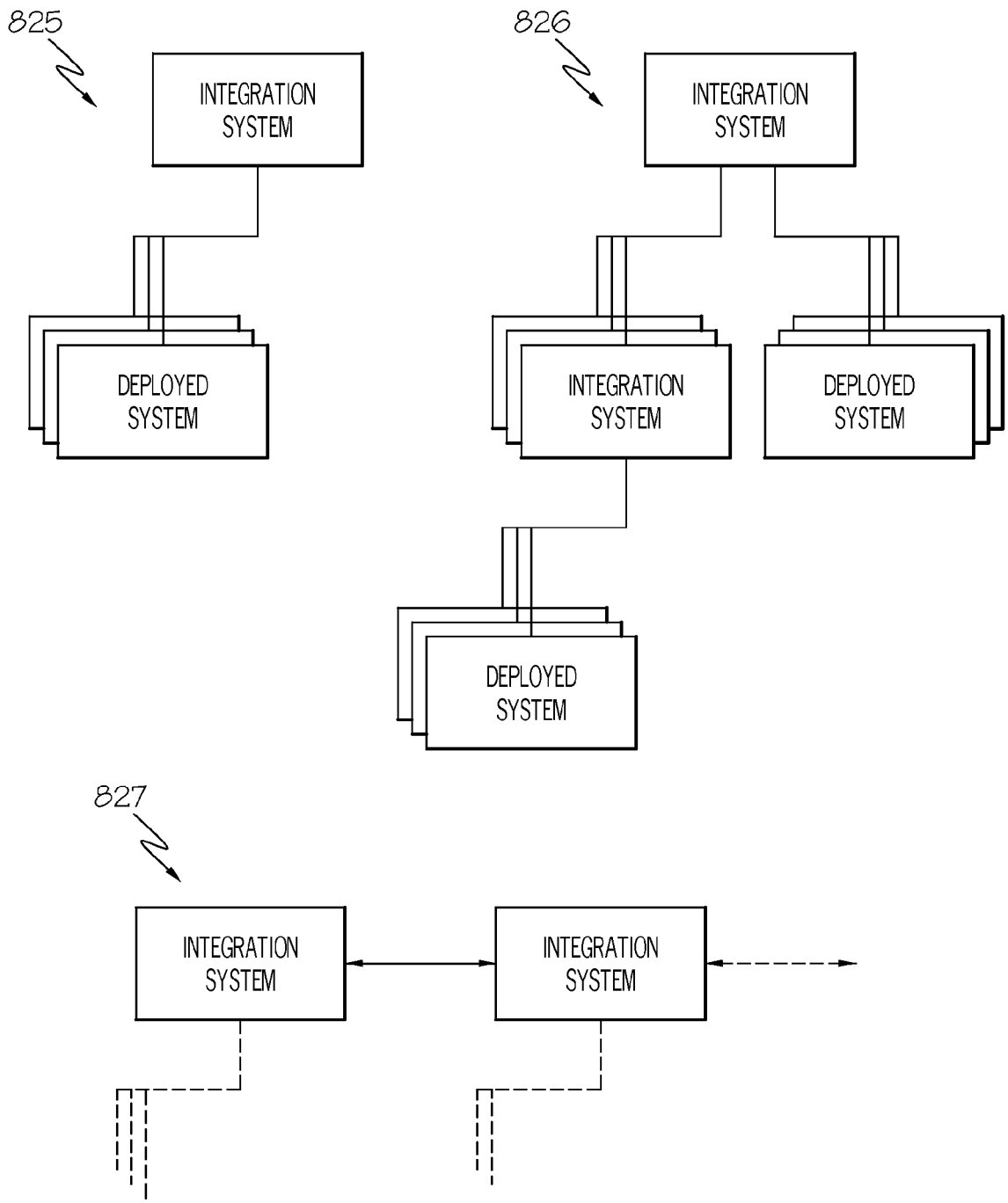
FIG. 8C is a schematic block diagram that depicts examples of options for configuration of dynamic systems.

The structures in FIG. 2, FIG. 8A and FIG. 8B show dynamic systems in a topology model where there is only one integration system, and a plurality of deployed systems. In FIG. 8C this is represented as a simple hierarchical topology model 825. However, large enterprises may choose to organize their business in many ways, such as by geography, by function, or by product line. The topology model of dynamic systems is not limited to a simple hierarchical model. Many other topology models may be used, including but not limited to a multi-hierarchical topology model using multiple levels of integration systems 826, and parallel hierarchies or multi-hierarchies 827.

The Dynamic Repository

Figure 1:
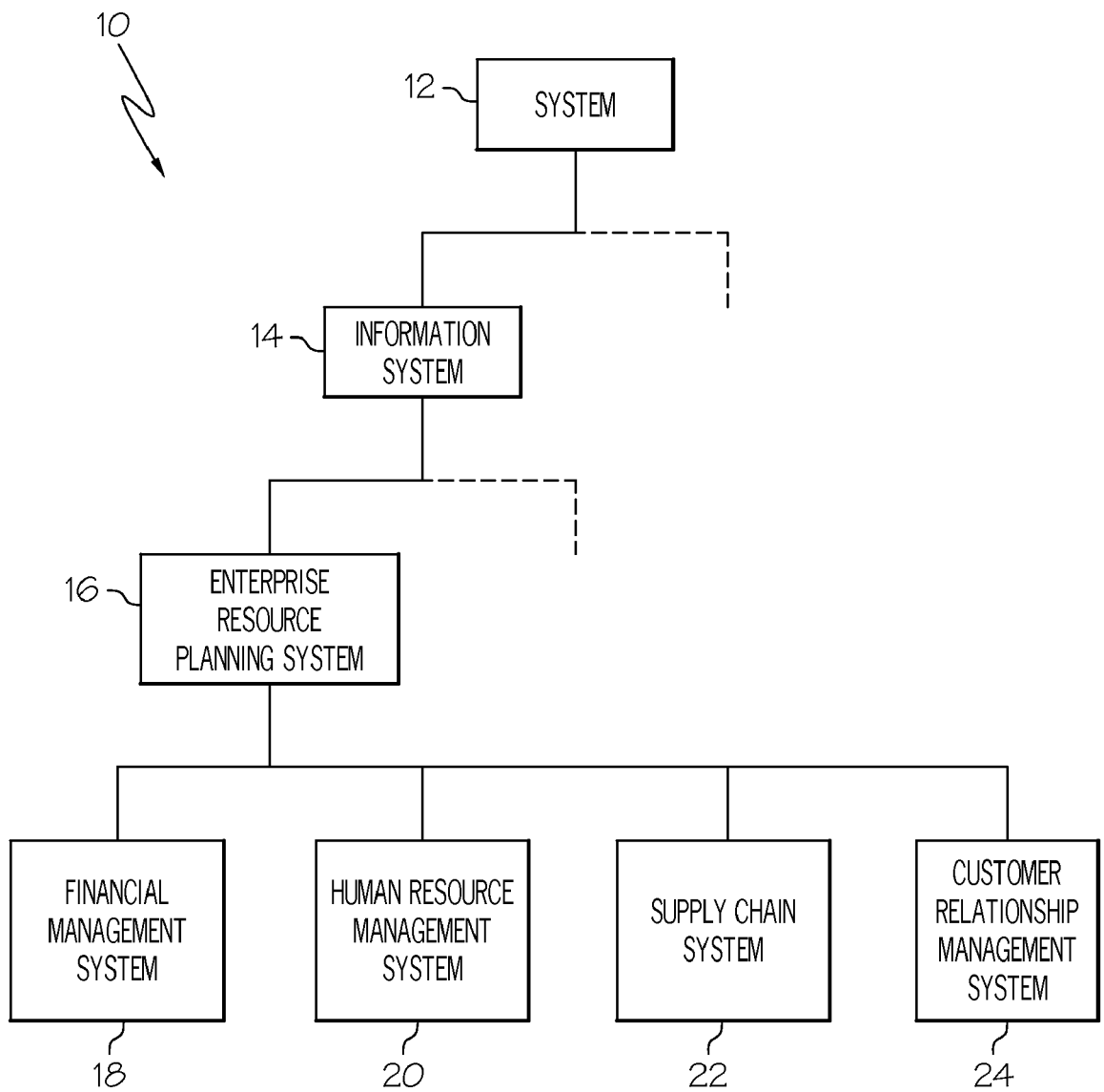
FIG. 1 is a schematic block diagram showing a hierarchy of system types.
Figure 26:
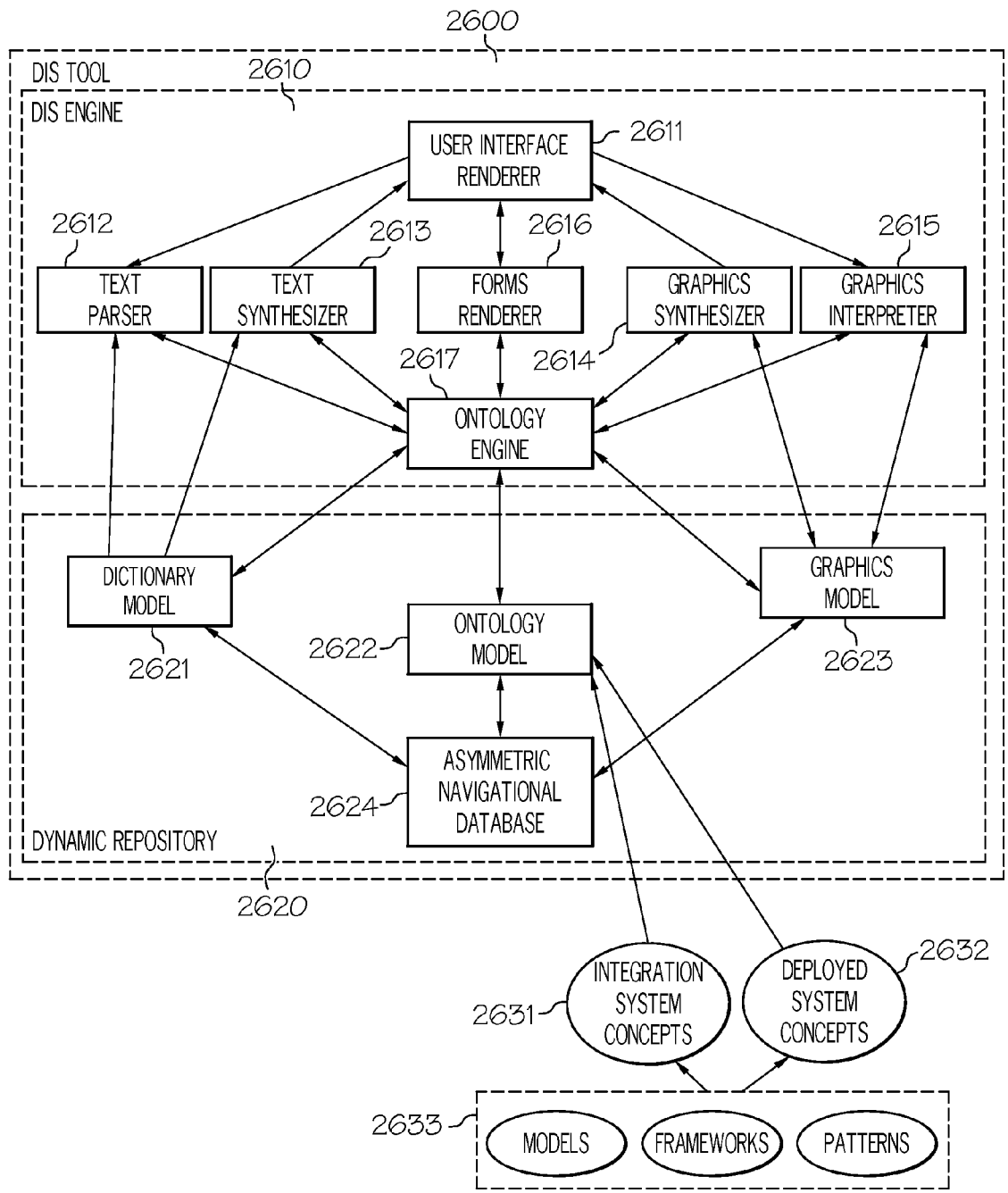
FIG. 26 is a schematic illustration showing the logical components of a Dynamic Information System tool.

A description of the dynamic repository (Dig., 101 and 105 in FIG. 1; 801 and 802 in FIG. 8A; 813 and 814 in FIG. 8B) will be given with reference to FIG. 26. FIG. 26 shows a DIS tool 2600 having a DIS Engine 2610 and a Dynamic Repository 2620.

Here, "ontology" is meant in the sense defined in Wikipedia (http://en.wikipedia.org/wiki/Wiktionary) as "a data model that represents a domain and is used to reason about the objects in that domain and the relations between them".

Here, a "concept" is understood to have the meaning defined in Wikipedia (http://en.wikipedia.org/wiki/Concept) "A concept is an abstract idea or a mental symbol, typically associated with a corresponding representation in language or symbology, that denotes all of the objects in a given category or class of entities, interactions, phenomena, or relationships between them " and "Concepts are bearers of meaning . . ."

Here, an "ontology model" refers to a model of the conceptual or semantic elements that are used by an ontology engine 2617. A simple example is a concept that can be instantiated in a population of objects that have the property "is a member of the species called humans". We could also refer to instantiations of this concept as "people". Were we to look at one of the instantiations of this concept, we may find identifying properties such as "has name", "has address" or "has social security number". However, we may also find an instantiation with the property "murdered John Doe", and "has fingerprint" followed by a graphic. Although described here in text, concepts may also be identified by graphic symbols, such as an icon representing a routing device—commonly used in systems architecture.

Any relationship between a concept and one or more other concepts is called a fact—analogous to a sentence or a paragraph in natural language.

Figure 9A:
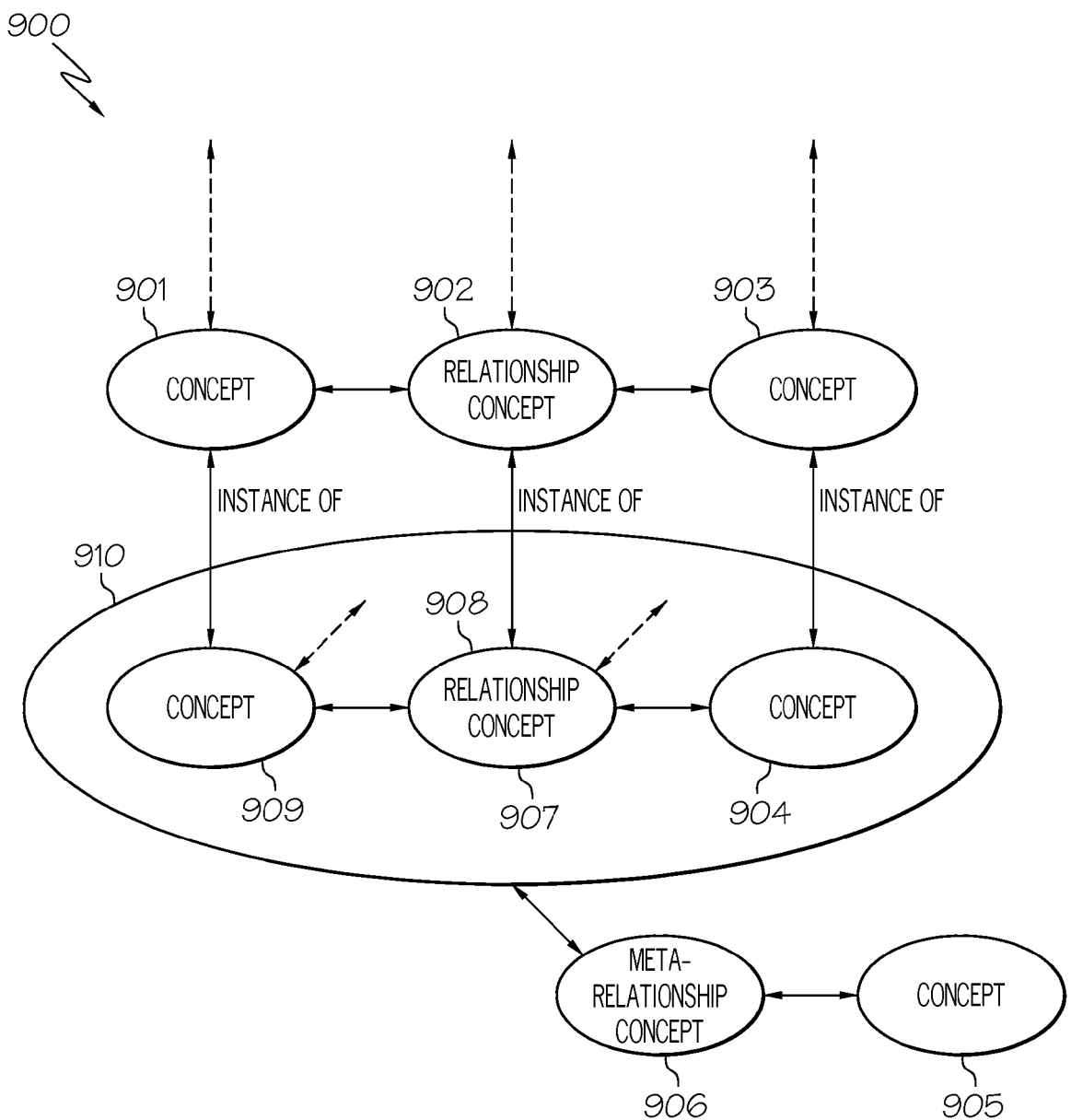
FIG. 9A is a schematic illustration of elements of an abstract ontology model.

Referring also to FIG. 9A, there is shown an abstract example of part of a shared ontology model 900 as represented in an asymmetric "navigational database". Wikipedia defines a navigational database as databases that incorporate "both the network model and hierarchical model of database interfaces. Navigational techniques use 'pointers' and 'paths' to navigate among data records. This is in contrast to the relational model (implemented in relational databases), which strives to use 'declarative' or logic programming techniques in which you ask the system for what you want instead of how to navigate to it."

The navigational database 2624 contains lexical object types (LOTs) and non-lexical object types (NOLOTs), and the relationships between them. Each of these LOTs and NOLOTs represents a concept. NOLOTs represent concepts that are described by their participation in relationships with other NOLOTs and/or LOTs. LOTs represent externally visible concepts, such as text, numbers and graphical elements. In the model of FIG. 9A, the concepts 901, 903, 904, 905, 909 are each represented in a NOLOT in the navigational database. The LOT/NOLOT terminology comes from the known discipline of Object Role Modeling, ORM. A "relationship concept", or "relationship" 902, 906, 908 is a concept that represents a type of association that links a group of one or more concepts. A relationship concept is part of the ontology model here disclosed—it is not part of the terminology of ORM, which formalizes a subtly different concept with the term "predicate". In FIG. 9A, the relationships are shown as extending respective concepts or relationship concepts. The meta-relationship concept 906 has a relationship with the group 1010 formed by the concepts, 904, 908 and the relationship concept 908. The dotted lines in FIG. 9A merely indicate ellipsis; e.g. the concept at 903 may be related to other concepts not shown in the figure.

Figure 9B:
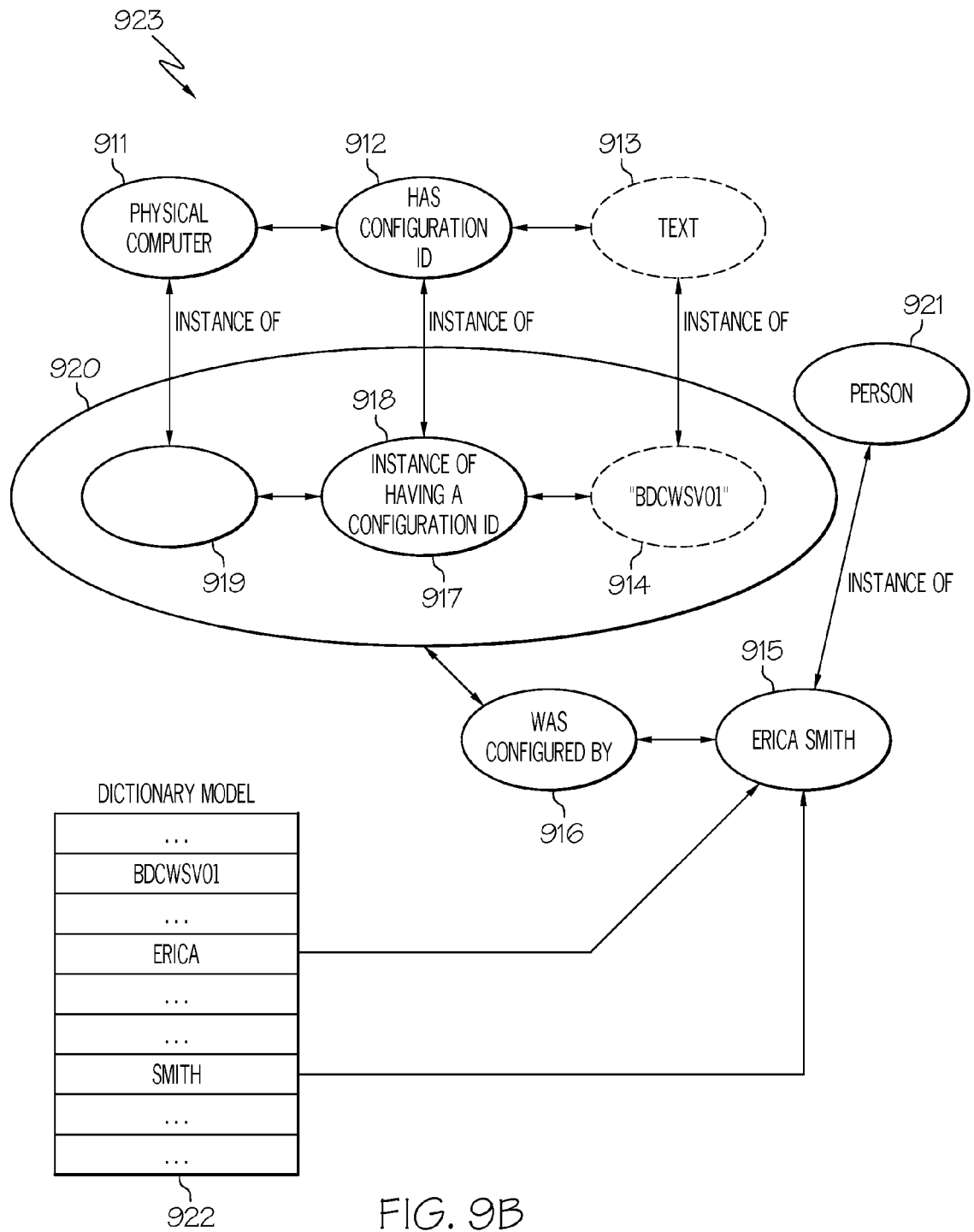
FIG. 9B extends FIG. 9A to include a concrete example of elements in an ontology model.

FIG. 9B shows an example ontology model 923, where the respective concepts and relationship concepts are embodied. The "physical computer" 911 extends the concept 901, and refers to the notion of an abstract physical computer. The concept 919 represents an instance of a physical computer. The concept 914 is an instance of the concept of text, and the value of this instance is "BDCWSV01". The relationship concept "has configuration ID" 912 defines an abstract relationship, which is instantiated in the association concept 917. Through a dictionary model 922, the text string "Erica Smith" identifies the concept 915. The concepts "Erica" and "Smith" are both represented in LOTs. The relationship concept "was configured by" 916 extends the meta-relationship concept 906.

This example includes a simple example of inference, where concept 917 derives properties from concept 912. The inference relationship is not limited to a simple hierarchical tree. Instead, a concept may inherit from two or more parent concepts, which in turn derive from a network of concepts, thereby building polymorphic inferences.

The dictionary model 2621, 922 and the graphics model 2623 embed all instances of LOTs, for use by both parsers 2612, 2615, 2616 and synthesizers 2613, 2614, 2616.

Underlying the ontology model 2622, and hence the ontology engine 2617, is an asymmetric navigational database 2624. Known relational database technology is designed around a symmetrical tabular format, to handle data structures that contain large numbers of rows organized into a relatively small number of columns. That is, they are optimized for situations where a common set of properties is known for each object represented in a row. Known object-oriented database technology is designed around the persistence of objects created in the execution of computer code, and is therefore bound to the structures defined in that code. The navigational database 2624 implements an asymmetric structure. This means that it is designed with the assumption that every individual data object can have a different set of properties. It is therefore suitable for use in situations where an individual concept may be described in one or many paragraphs, be they textual or diagrammatic, and when a concept may need to be viewed from multiple perspectives.

In a preferred embodiment, the dictionary model 2621 and the graphics model 2623 are populated with a base set of lexical and graphical concepts common in the information systems domain, including information communications and technology, and business processes. Linking graphic elements and structures through the graphics model 2623 to the ontology engine 2617 facilitates the capability to manipulate and present a common concept in multiple forms, including text, tabular and graphical forms, depending on the needs of a user. It also supports the ability to link and view the same concept at conceptual, logical and physical levels.

Here, a "dictionary model" 2621, 922 contains words (lemmas), including compound words (composed of fragment lemmas), and their grammatical and lexical properties. It identifies members of the subset of concepts in the ontology model 2622 that have textual names.

The DIS Ontology Model

FIGS. 10 through 19 illustrate elements of a preferred embodiment of a base ontology model 2622 that is used by the ontology engine 2617 in the recommended embodiments for a dynamic information system. They describe concepts at a level of abstraction above that of implemented frameworks, of which instances are the Zachman framework and the C4ISR framework.

The term "meta-level" is used here as a relative term for any concept, where a concept at one meta-level is described generally in terms of concepts at a higher meta-level. Here, "meta-levels" are described with a prefix of the form "Mx", where M denotes "meta-level", and "x" stands for a hexadecimal number in the range 1 to f. Thus, concepts labeled with a name prefixed by Me are at the hexadecimal $e^{th}$ (decimal $15^{th}$) meta-level. The meta-level prefixes are pronounced as "em-one", "em-two", and so on, and punctuated accordingly.

The usage of meta-levels with a dynamic information system is implementation-dependent. The recommended implementation is to reserve the Mf level for use by the DIS tool 2600, in situations such as update or upgrade of the tool itself, and to reserve the levels Mc, Md and Me for integration purposes, and specifically for concepts that will be available for use or extension at lower levels. The ontology model examples in FIGS. 10 through 19 are all at levels Me and Mf.

In a recommended embodiment, the physical naming convention for a dynamic repository 2620 uses the meta-level as the name of a file system directory containing an instance of the asymmetric navigational database 2624.

In a recommended embodiment, a dynamic repository 2620 will include distinct and discrete instantiations of persistent storage, including but not limited to persistent storage of control data that describes properties of an individual repository and its user context; working data that provides scratchpad areas for a user's draft work; working data that provides a scratchpad area for use by the DIS tool; and the main body of data included in the dictionary model 2621, the graphics model 2623, and the ontology model 2622.

Figure 10:
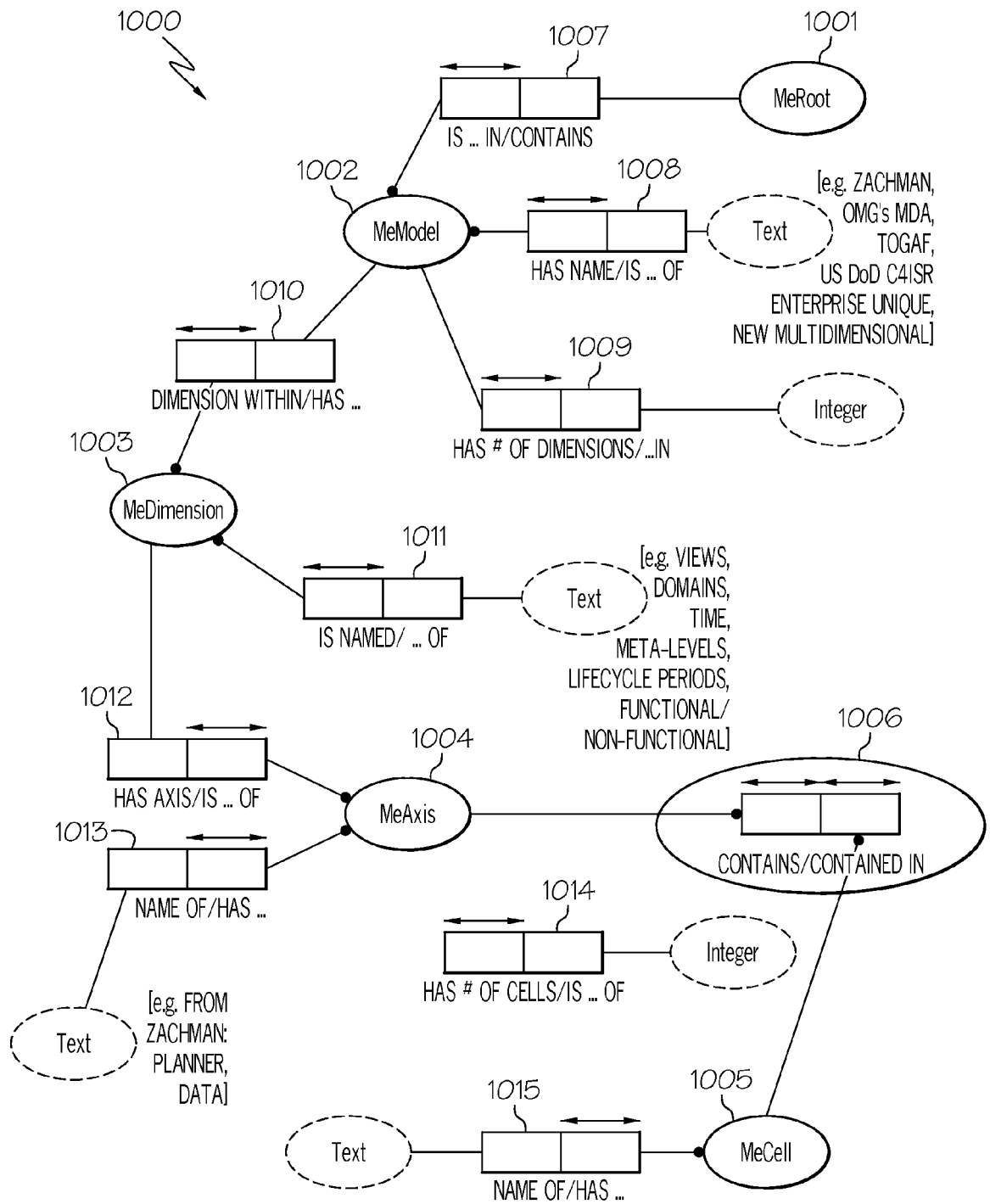
FIG. 10 is a schematic diagram of an ontology model that illustrates the multi-dimensional and asymmetric nature of a dynamic information system.

In FIG. 10 the concept MeRoot 1001 ("em-e-root") represents an abstraction of all information system models that may be of use to the enterprise. These models are themselves abstractions, being descriptions of structures that may be used to organize artifacts that describe an information system. Through the "contains" relationship 1007, the MeRoot concept 1001 may be a container for one or more models.

An individual model is represented by the MeModel concept 1002, which is identified by a textual name. Subject to appropriate licensing arrangements, which are the responsibility of the enterprise using the DIS tool 2600, these may include known two-dimensional models such as the Zachman framework, or the US Department of Defense C4ISR model. However, the MeModel 1002 structure also permits the enterprise to construct its own models that may be known two-dimensional models, or new models that take advantage of the capability of the DIS tool 2600 to represent an arbitrary number of dimensions.

An MeModel concept 1002 is linked through a "has dimension" relationship to an arbitrary number of MeDimension concepts 1003. The "has number of dimensions" relationship 1009 is shown to explicate the notion that there can be multiple dimensions, but does not imply that the number of dimensions in an individual MeModel 1002 has to be predefined or fixed.

Each MeDimension 1003 within an MeModel 1002 contains one or more MeAxis concepts 1004, through the "has axis" relationship 1012. Finally, each MeAxis contains one or more MeCell concepts 1005, through the relationship "contains" 1006.

Figure 11:
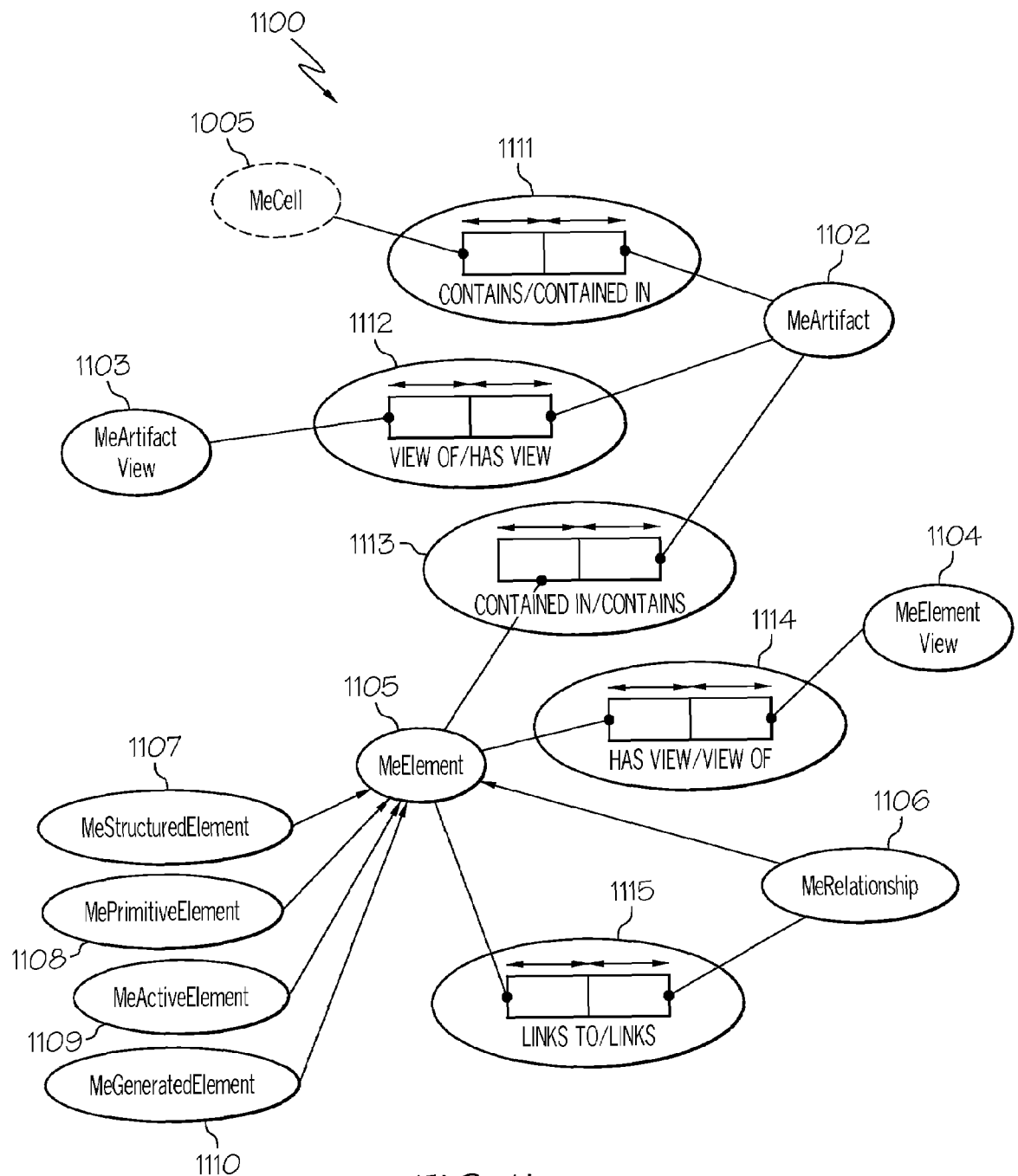
FIG. 11 is a schematic diagram of an ontology model that illustrates an abstract structure for dynamic views, used to generate dynamic artifacts.

As an example, the Zachman framework (The Zachman Framework for Enterprise Architecture, http://www.zifa.com/) contains two dimensions—horizontal and vertical. The horizontal dimension contains six axes—scope, business model, system model, technology model, detailed representations, and functioning enterprise. The vertical dimension contains six axes—data, function, network, people, time, and motivation. Within these six horizontal and six vertical axes there are 36 (thirty-six) cells. At this level, the Zachman framework is an example of a regular structure, i.e. it is represented in a matrix of fixed dimensions. The DIS tool 2600 supports irregular and dynamic structures.

Where FIG. 10 describes a structure for the organization of concepts, FIG. 11 describes a different structure for the projection of arbitrarily multi-dimensional data into two-dimensional views.

An MeCell 1005 contains one or more MeArtifact concepts 1102, through a "contains" relationship 1111. An MeArtifact 1102 represents a structure of the underlying data that is required to be assembled for presentation in a view. Through a "has view" relationship 1212 it is linked to an MeArtifactView concept 1103, which represents the form and format of a two-dimensional projection of data from the multi-dimensional data. The MeArtifactView 1103 and the MeArtifact 1102 together, and can be thought of as the specification for a document that looks much the same as a traditional static artifact, including but not limited to, a textual or composite document, a diagram, or a table. A static artifact combines data and presentation into the one object. By contrast, the paired MeArtifact 1102 and MeArtifactView 1103 support the presentation of common base data into multiple forms.

MeArtifact concepts 1102 are associated with one or more MeElement concepts 1105 through a "contains" relationship 1113. These include several element sub-types (explained further in FIGS. 14 to 17), and combinations of MeElement concepts through "links" 1115 via MeRelationship concepts 1106 that describe further properties of relationships between MeElements.

Each MeElement 1105 may also be associated through a "has view" relationship 1114 to an MeElementView concept 1104, that describes the form and format of a two-dimensional projection of the data contained in that MeElement 1105.

Figure 12:
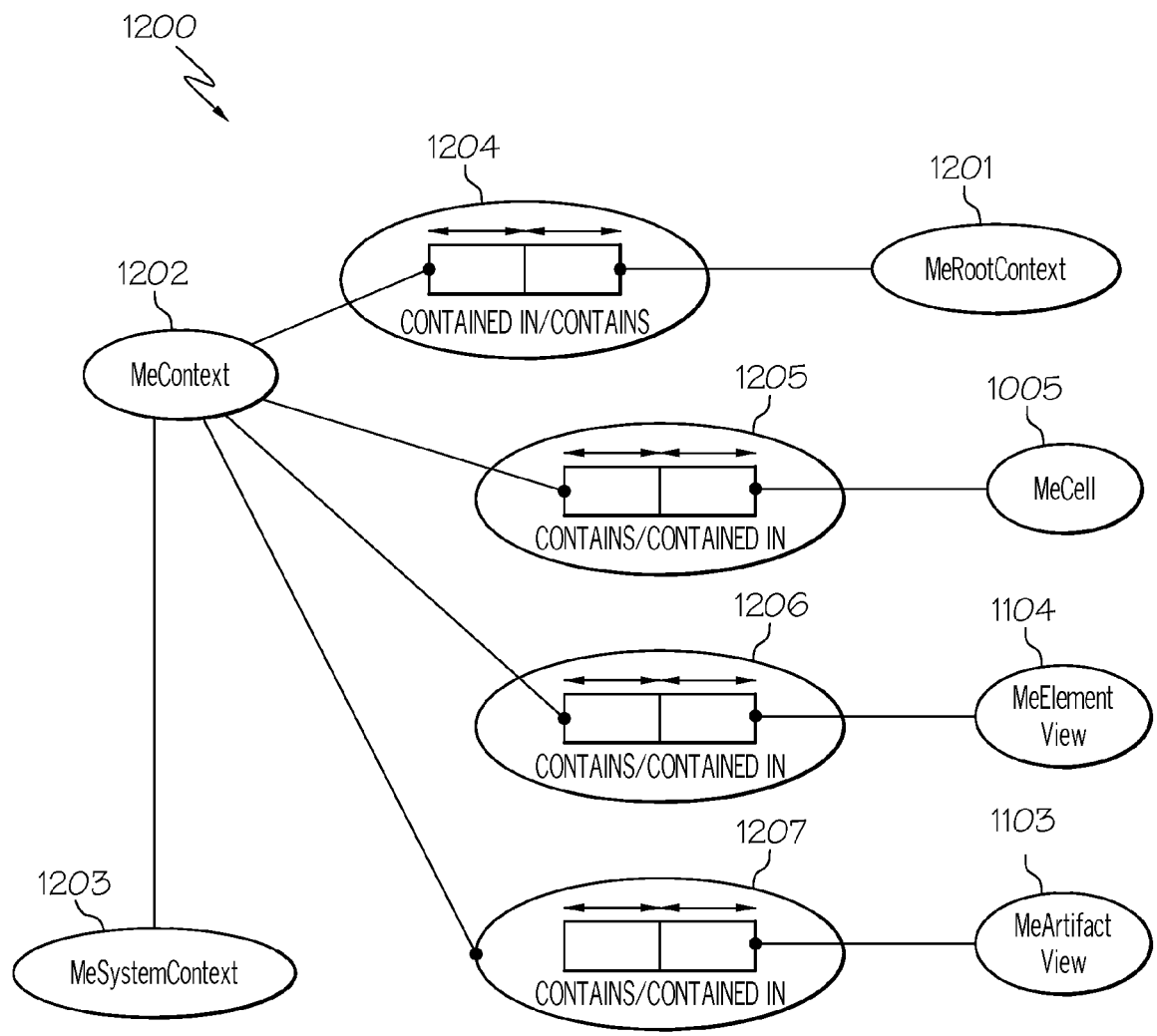
FIG. 12 is a schematic diagram of an ontology model that illustrates a structure used for assembling dynamic data and artifacts into a context, such as for a specific project or process.

In FIG. 12, an MeRootContext concept 1201 is identified. This is a known entry point into a dynamic metasystem repository's asymmetric navigational database 2624, analogous to the root a common file system. From here, it is possible to navigate through a plurality of MeContext concepts 1202 via a "contains" relationship 1204. MeContext concepts 1202 are analogous to disk and directory components of a common file system, or more generally to uniform resource locators (URLs) that permit access to resources over a network. FIG. 12 includes examples of some types of concepts that may be associated with an MeContext 1202, namely MeCell concepts 1005, MeElementView concepts 1104 and MeArtifactView concepts 1103. As with all concepts, an MeContext concept may be sub-typed into more specific concepts, and an MeSystemContext concept 1203 is provided as an example. In this example, an MeSystemContext concept 1203 may be used to provide a common entry point for data and artifacts related to a specific dynamic system.

Figure 13:
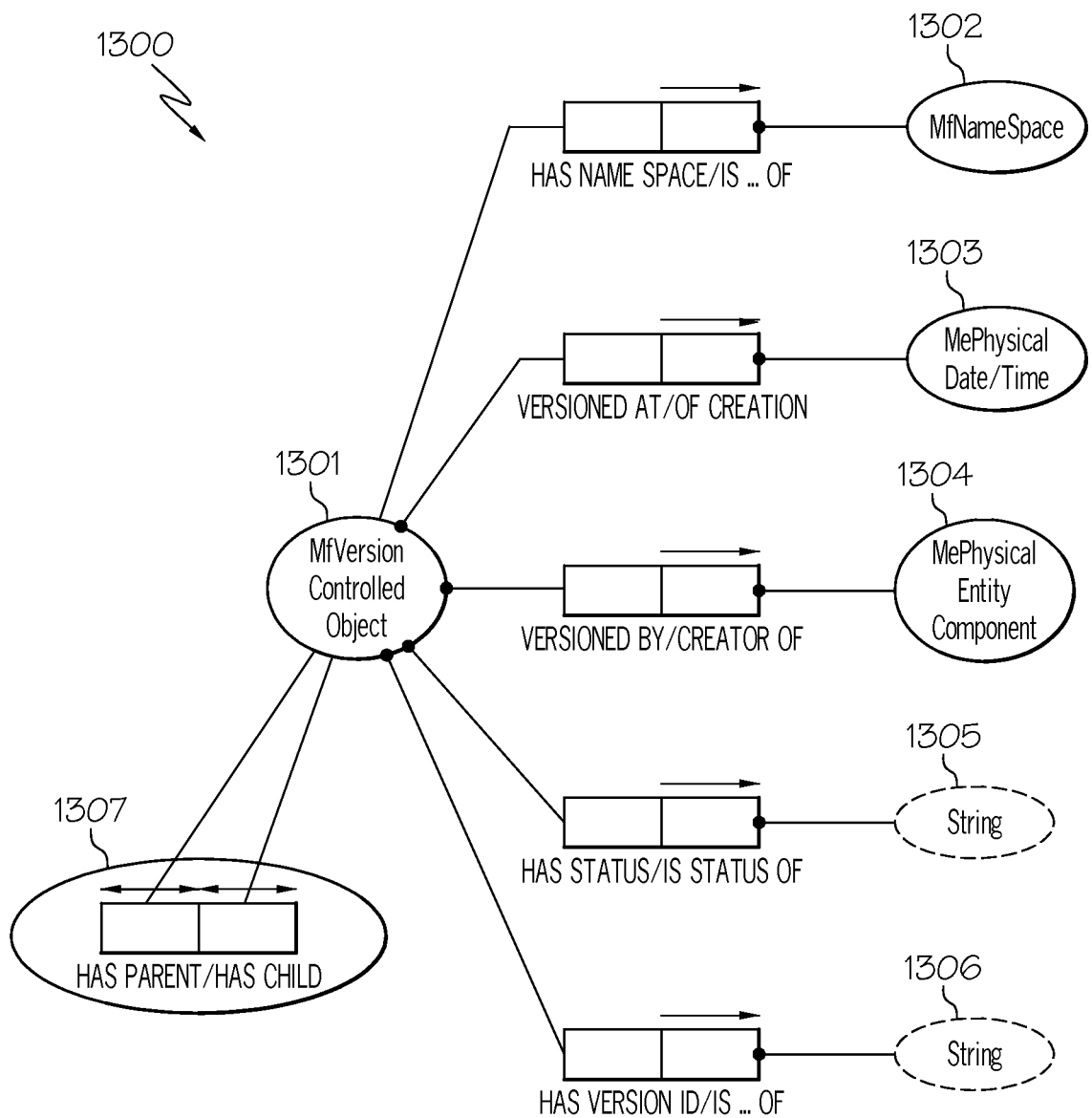
FIG. 13 is a schematic diagram of an ontology model that illustrates a structure used for applying version control to dynamic data.

FIG. 13 introduces an MfVersionControlledObject concept 1301, at meta-level Mf. This concept is at the highest meta-level, because all other concepts may derive from it. It is crucial to the management of change in a dynamic information system. The MfVersionControlledObject 1301 is shown with examples of concepts that are typically important for version control, including a "version identifier" 1306, the "status" 1305 of a version, the "creator" 1304 of the version, the "timestamp" 1303 of the version, and a "namespace" 1302 for the version that distinguishes the version uniquely across different instantiations of the DIS tool 2600.

Figure 14:
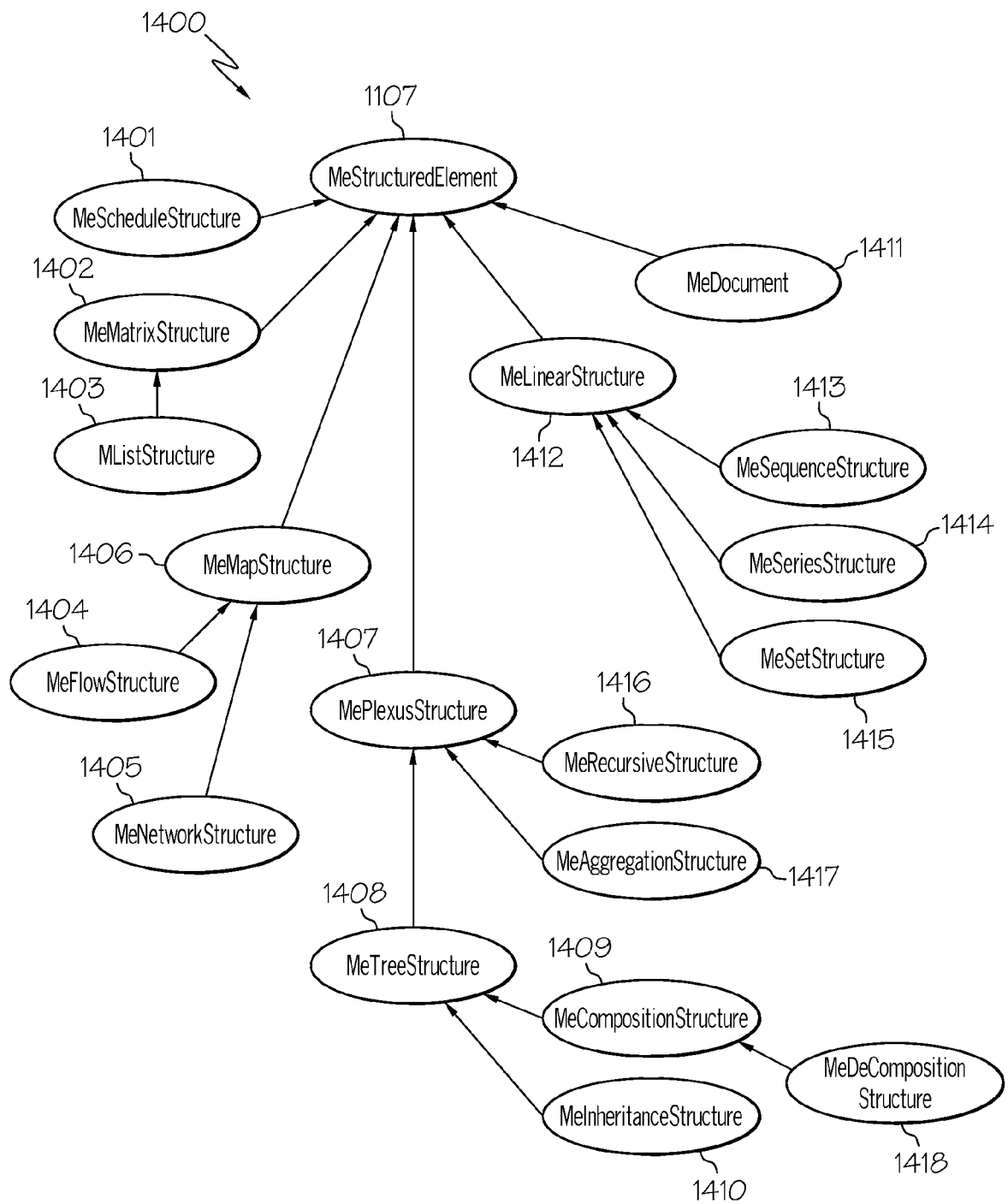
FIG. 14 is a schematic diagram of an ontology model that illustrates a structure of view components used to assemble information into a dynamic artifact.

FIG. 14 extends the MeStructuredElement concept 1107, which itself is a sub-type of the MeElement concept 1105. The sub-type examples shown include a variety of common elements for representing structural relationships for data, such as graphical tree structures (MeTreeStructure 1408), matrix structures (MeMatrixStructure 1402), and linear structures (MeLinearStructure 1412). These are not intended to be an exhaustive list of structures.

Figure 15:
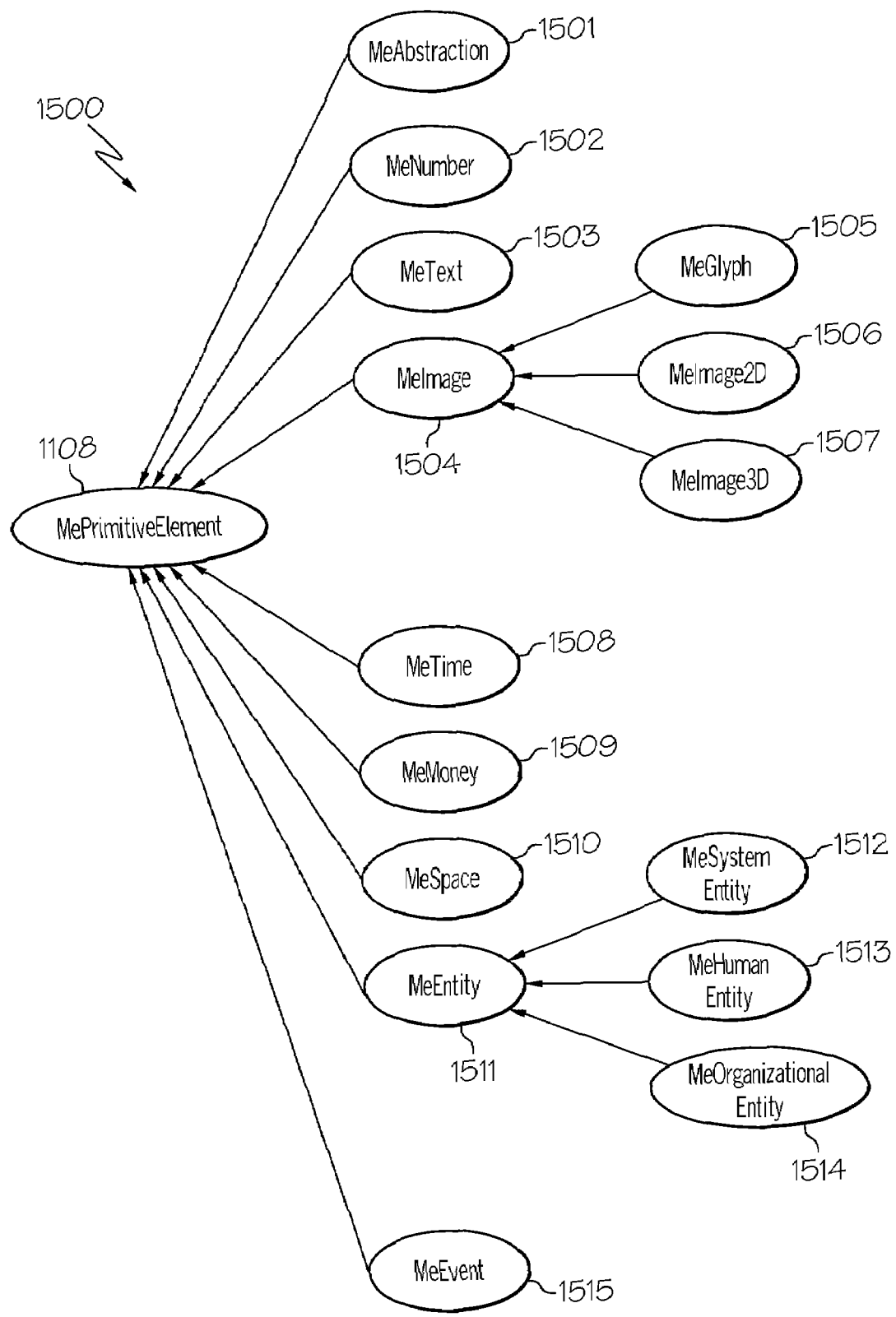
FIG. 15 is a schematic diagram of an ontology model that illustrates a structure of view components used to assemble information into a dynamic artifact.

FIG. 15 extends the MePrimitiveElement concept 1108, a sub-type of the MeElement concept 1105. Its purpose is to categorize a range of concept primitives that are commonly found in information systems. "Primitive" does not necessarily equate with "simple", since the primitives include people (MeHumanEntity 1513), spatial elements (MeSpace 1510) and time (MeTime 1508). Generally, MePrimitiveElement concepts 1108 are concepts that are supported by explicit computer language code within the DIS tool 2600.

Figure 16:
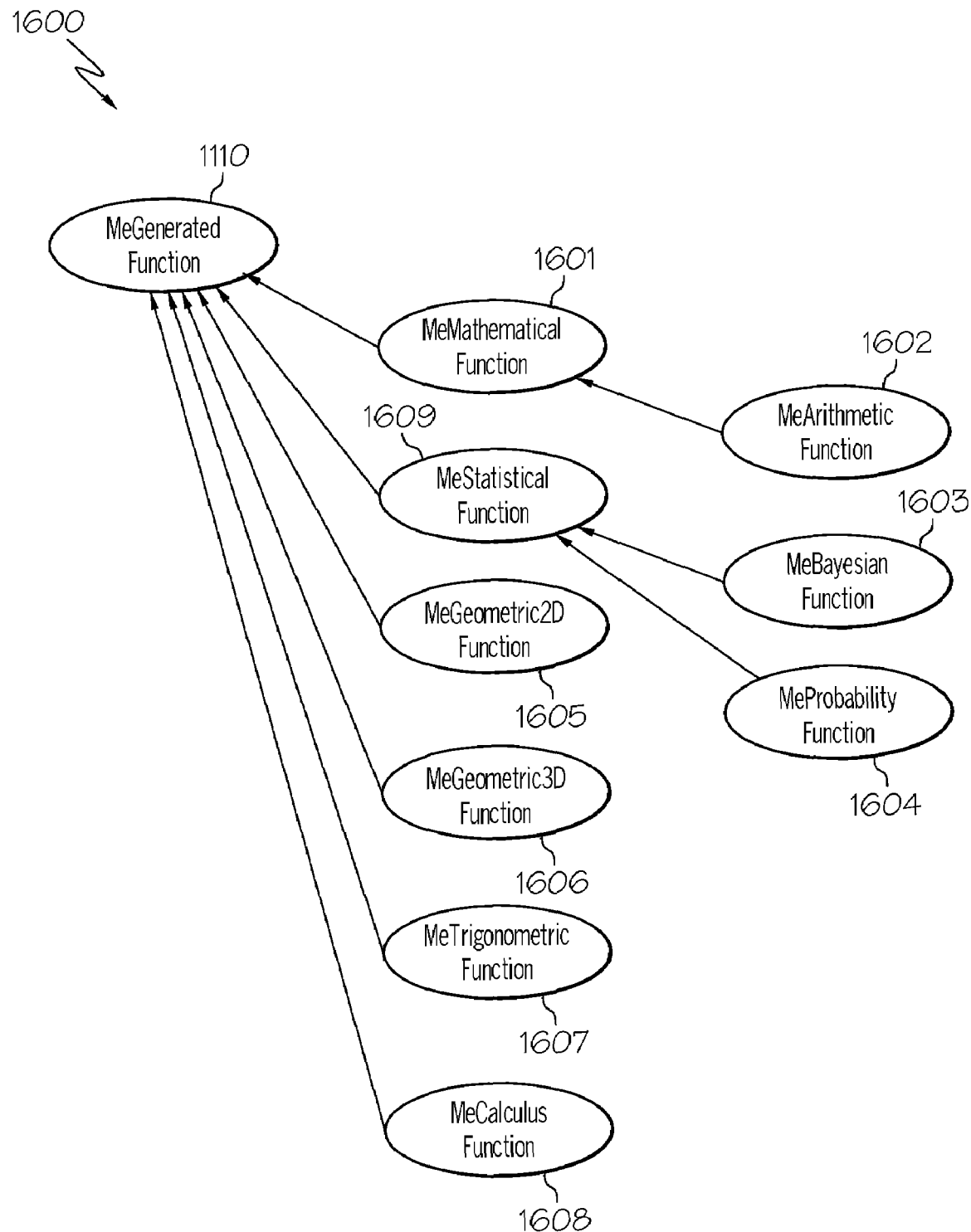
FIG. 16 is a schematic diagram of an ontology model that illustrates a structure of view components used to assemble information into a dynamic artifact.

FIG. 16 extends the MeGeneratedElement concept 1110, a sub-type of the MeElement concept 1105. The MeGeneratedElement concept is used to categorize concepts that are instantiated as the result of execution of a computer software algorithm, as shown in the indicative examples 1601 through 1608.

Figure 17:
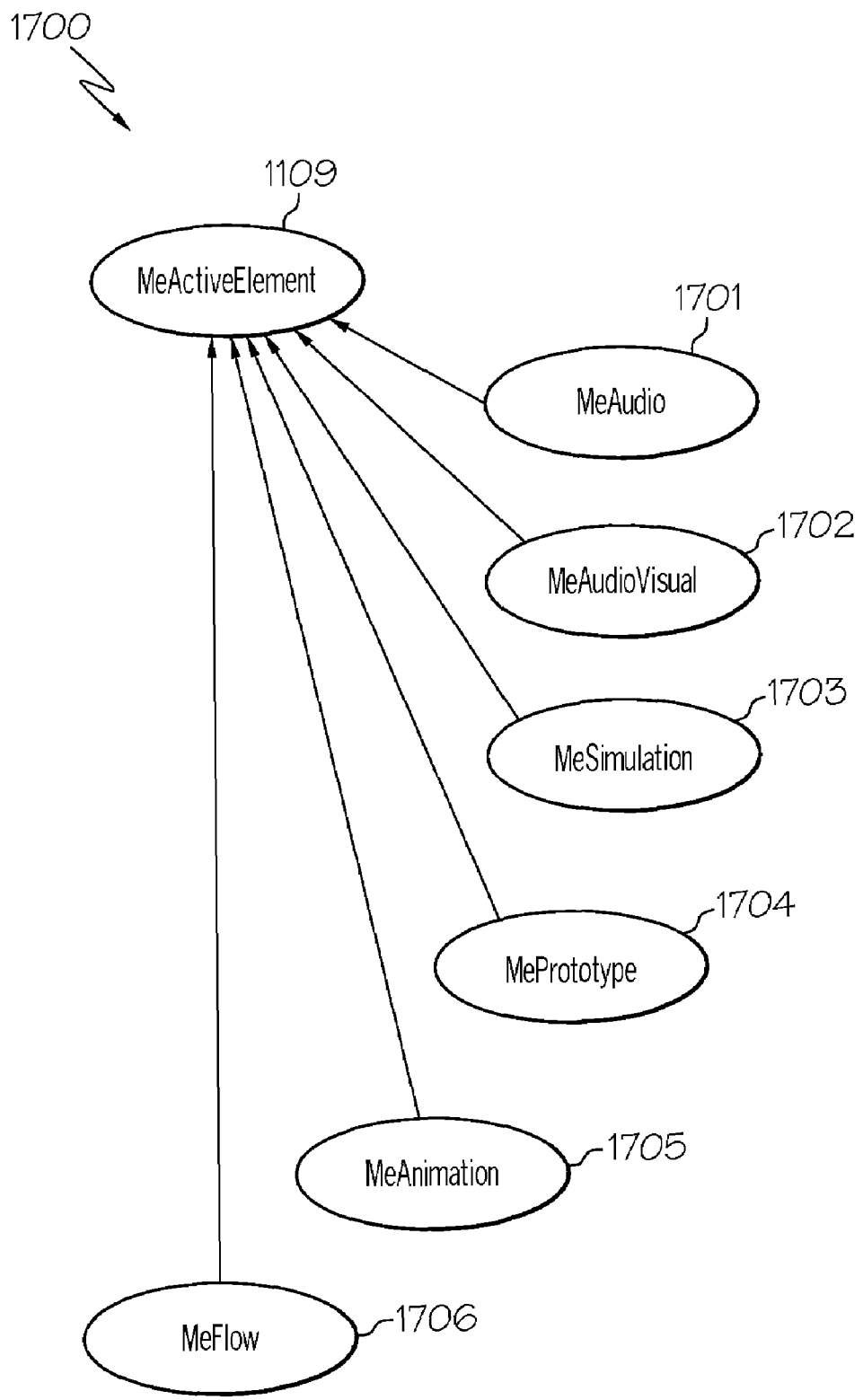
FIG. 17 is a schematic diagram of an ontology model that illustrates a structure of view components used to assemble information into a dynamic artifact.

FIG. 17 extends the MeActiveElement concept 1109, a sub-type of the MeElement concept 1105. The MeActiveElement concept is used to categorize concepts that are instantiated as the result of execution of a computer software algorithm, in forms other than those that can be represented on a hard-copy document, as shown in the indicative examples 1701 through 1706. These include, but are not limited to, the forms identified in the examples 1701 through 1706.

MeAudio concepts 1701 represent views generated through use of a known speech synthesizer, using textual data synthesized from the text synthesizer 2613.

MeAudioVisual concepts 1702 represent views generated through use of views generated by the text synthesizer 2613, the graphics synthesizer 2614, and the forms renderer 2616, and other MeActiveElement concepts—MeAnimation 1705, MePrototype 1704, MeSimulation 1703, and MeAudio 1702.

An MeSimulation concept 1703 is a container for simulations of some aspect of the performance of a physical model whose components and properties are defined by a user within a dynamic repository 101, 105.

An MePrototype concept 1704 is a container for active prototypes of some aspect of part of an information system whose components and properties are defined by a user within a dynamic repository 101, 105.

An MeAnimation concept is a repository for rules that describe the characteristics of the animation required for other MeActiveElement concepts. In particular, these rules invoke DIS tool 2600 computer software functions for the assembly of subtypes of MeElementView concepts 1104 into a structure of views to be presented in timed sequence.

Figure 18:
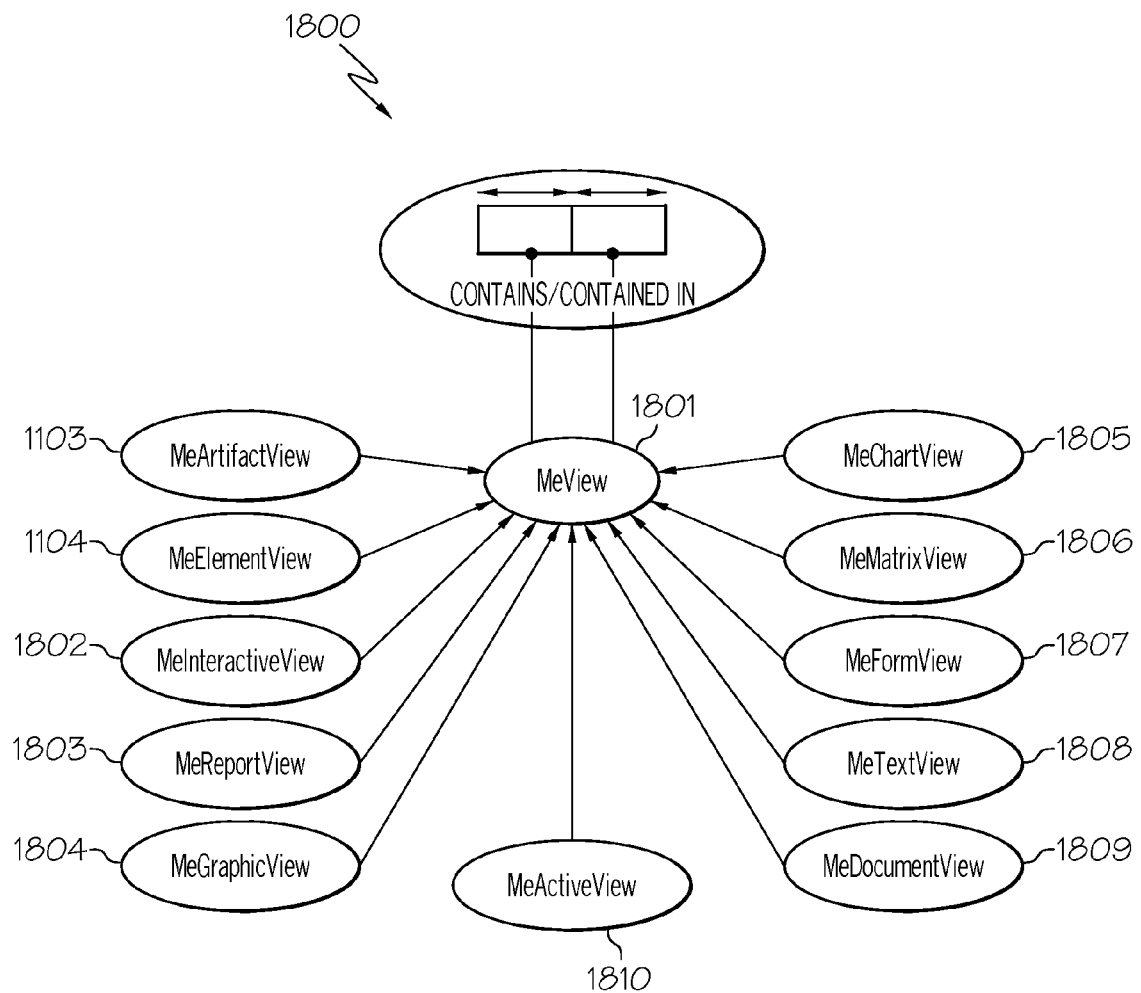
FIG. 18 is a schematic diagram of an ontology model that illustrates a structure of view components used to assemble information into a dynamic artifact.

FIG. 18 presents examples of the concepts that underlie the user interface renderer 2611 of the DIS tool 2600. The MeView concept 1801 is a container for assembly of one or more view components, such as into a computer software-defined window.

Figure 19:
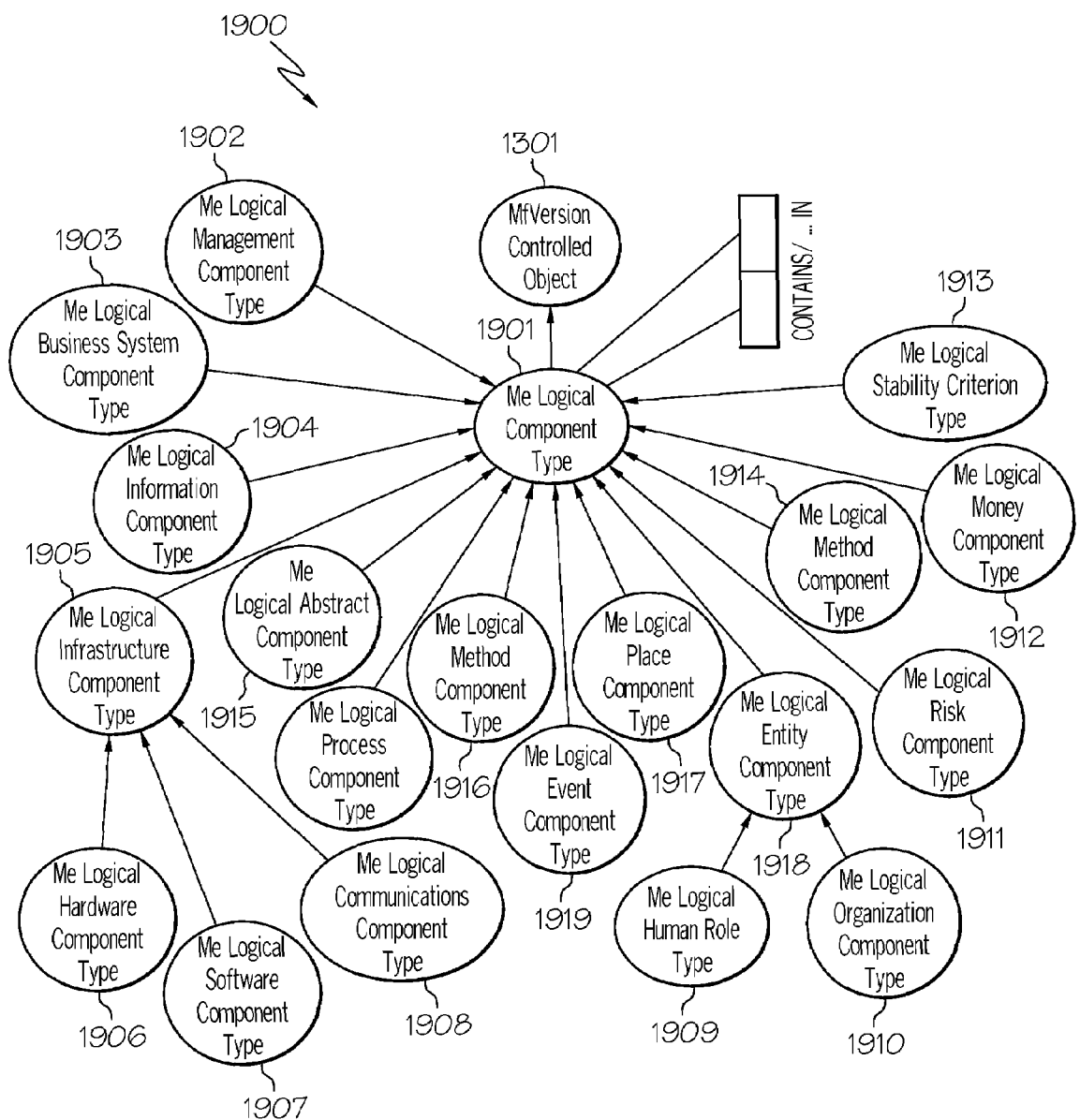
FIG. 19 is a schematic diagram of an ontology model that illustrates a structure of dynamic data components that may be used to categorize metasystem data.

FIG. 19 presents examples of concepts at the logical level, and so shows part of the progression of the ontology model 2622 from abstract concepts as shown in FIGS. 10 and 11, down through logical concepts here, and thence to physical concepts.

The concepts in the ontology model 2622 have corresponding executable classes within the software that implement behaviors associated with these objects. All concepts are persistent in the asymmetric navigational database 2624. All concepts are versioned, and are related to a configuration management structure. All concepts exist within an event handling structure, which enables continuous maintenance, reporting and alerting of consistency and integrity status. The event handling structure includes responses to user events (such as adding or changing data) and also to system events for example, error conditions, system change and external interactions.

The ontology model 2622 may include the most abstract representations of architectural components, including conceptual and logical types and sub-types of organizations, processes, people, principles, information, stability criteria, events, alerts, technologies and interfaces. It also includes representations at a lower level of abstraction of architectural and design components, including physical types and sub-types of organizations, processes, people, principles, information, events, technology components and interfaces. It includes representations of design components, including specific organizations, processes, people, principles, information, events, technology components and interfaces. Further, it may include representation of physical components, including individual people/positions, machines, communications links and documents. It includes mappings between and across metadata levels.

The Dictionary Model

FIGS. 20 to 25 present examples of a preferred embodiment of a dictionary model 2621 at a logical and physical level. These figures represent a model derived from the known Princeton WordNet model (http://wordnet.princeton.edu/). Use of the WordNet model is recommended because it is supported by a comprehensive dictionary of English nouns, verbs, adjectives and adverbs in electronic form.

Figure 20:
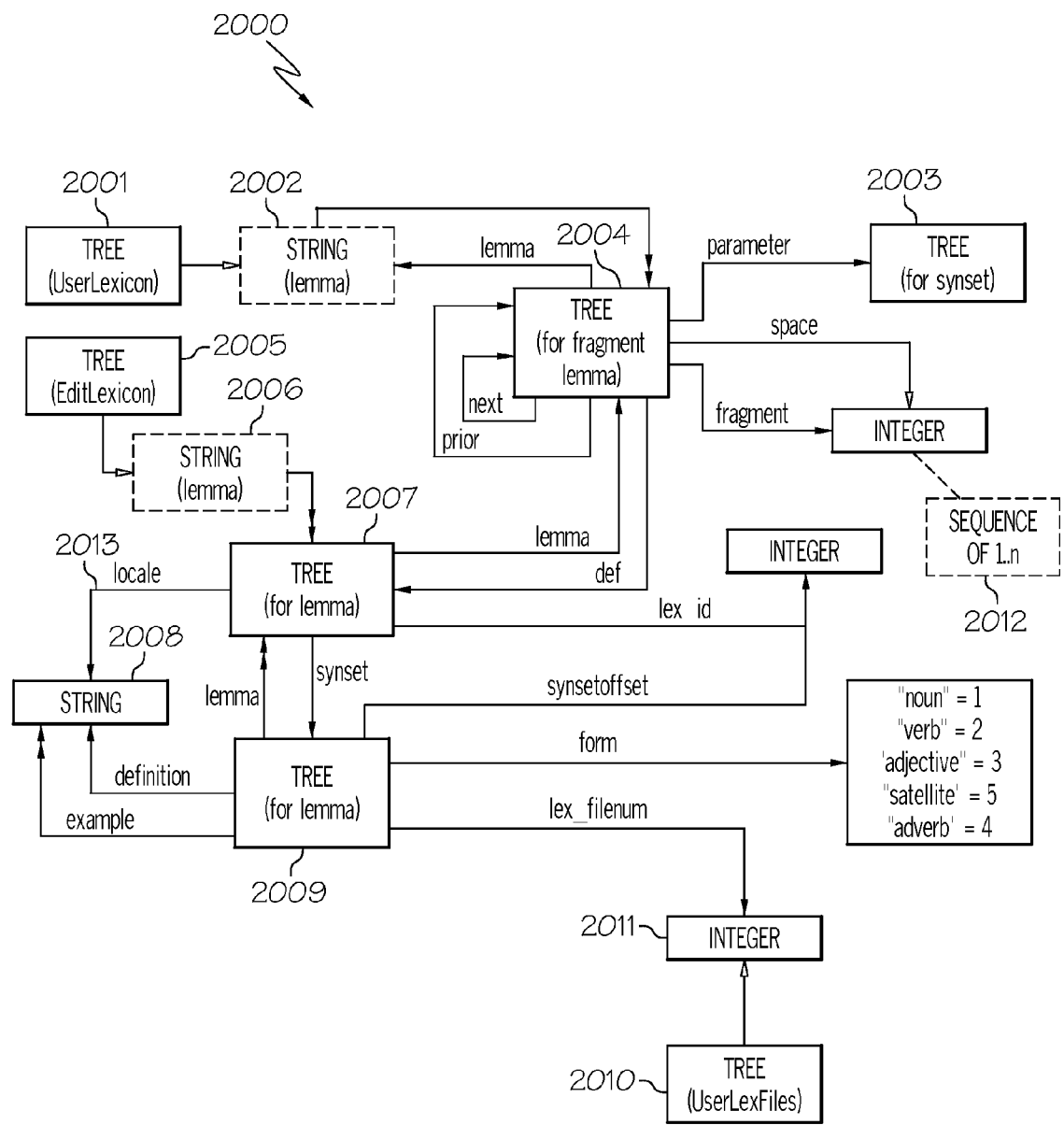
FIG. 20 is a schematic diagram based on a known high level data structure for a dictionary (Princeton University's WordNet structure) with extensions to support text parsing.

FIG. 20 describes a data structure that can be used to represent the Princeton WordNet model, especially the lemma 2007 and synset 2009 structures. This is the basic structure used by the DIS tool 2600.

In one embodiment, the DIS dictionary model 2621 extends the Princeton WordNet model through inclusion of two indices, namely the User Lexicon 2001, the Edit Lexicon 2005, a structure for assembling fragment lemmas 2004, and an explicit locale definition 2013. The Edit Lexicon 2005 is derived directly from the Princeton WordNet structure and database, and contains complete lemmas such as "United Kingdom". This allows users to traverse the dictionary in alphabetical order. The User Lexicon 2001 contains lemma fragments, such as "United" and "Kingdom", which simplifies the work of the text parser 2612 especially for the identification of tokens in a text stream. The assembly of fragment lemmas into complete lemmas is handled using the structure in 2004. This structure also supports the synthesis of phrases that contain variable elements, such as pro-verbs (e.g. "to do", "to have"), pro-adjectives ("one's"). This type of synthesis uses a synset as a parameter 2003.

The explicit locale 2013 allows the DIS tool to parse and synthesize text in multiple locales, e.g. using "organization" in the US, and "organisation" in Australia. Explicit knowledge of locales is necessary for synthesis of text if the DIS tool 2600 is to generate correctly spelt results for the locale, but not so for parsing where alternative spellings may be accepted.

Figure 21:
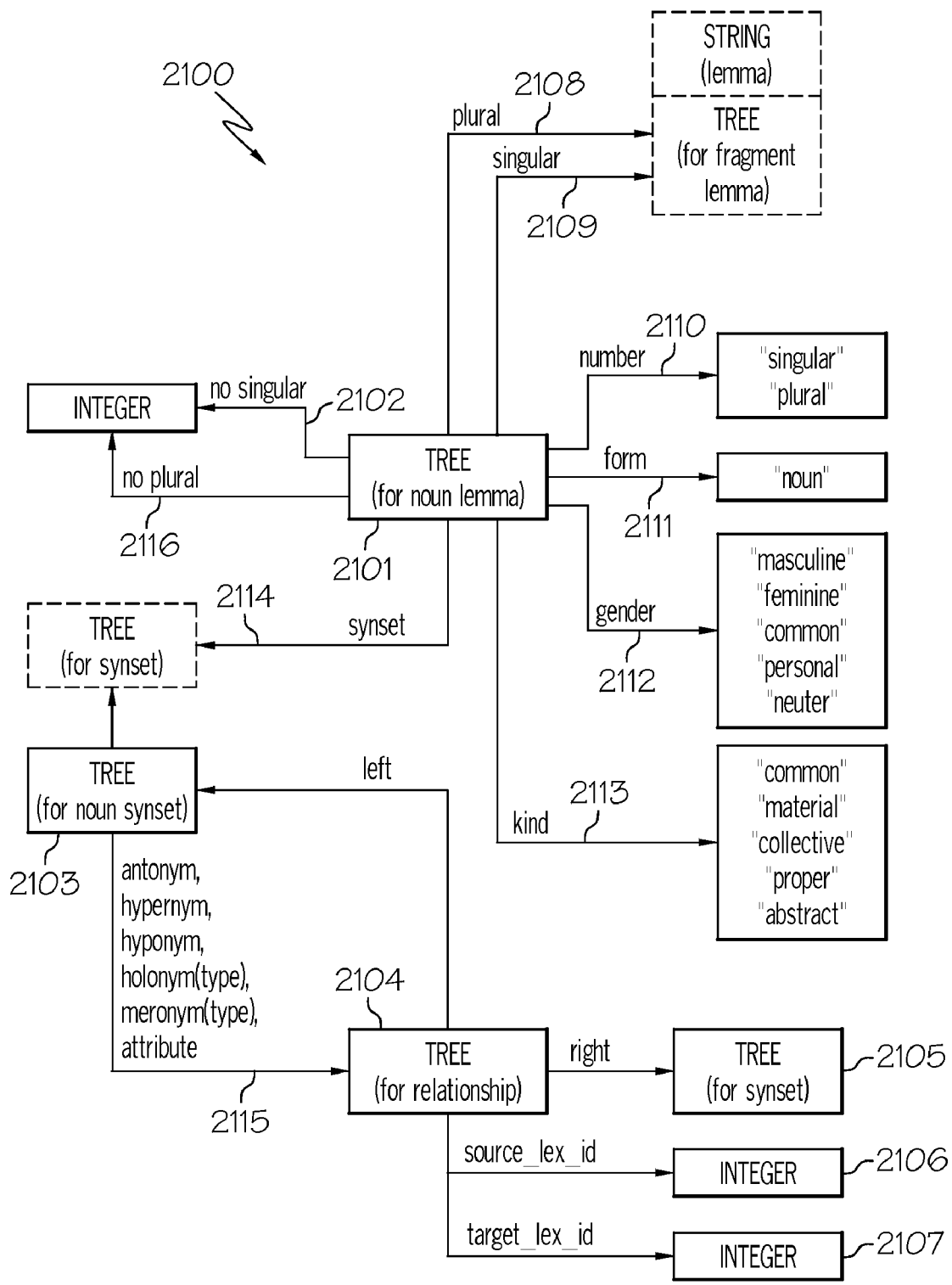
FIG. 21 is a schematic diagram based on a known high level data structure for representation of nouns in a dictionary (Princeton University's WordNet structure) with extensions to support text parsing.

FIG. 21 describes the recommended structure for representation of nouns. It is consistent with the Princeton WordNet model in its use of lemmas 2101 and synsets 2103, and handling of relationships 2115, 2104, 2105, 2106, 2107, and the grammatical form of a word 2111. It extends the Princeton WordNet model in its handling of grammatical number 2101, gender 2112, and kind 2113; in its use of explicit singular 2108 and plural 2109 forms, and in its handling of nouns with no singular 2102 (e.g. "trousers") or no plural 2116 (e.g. "iron" as a material).

Figure 22:
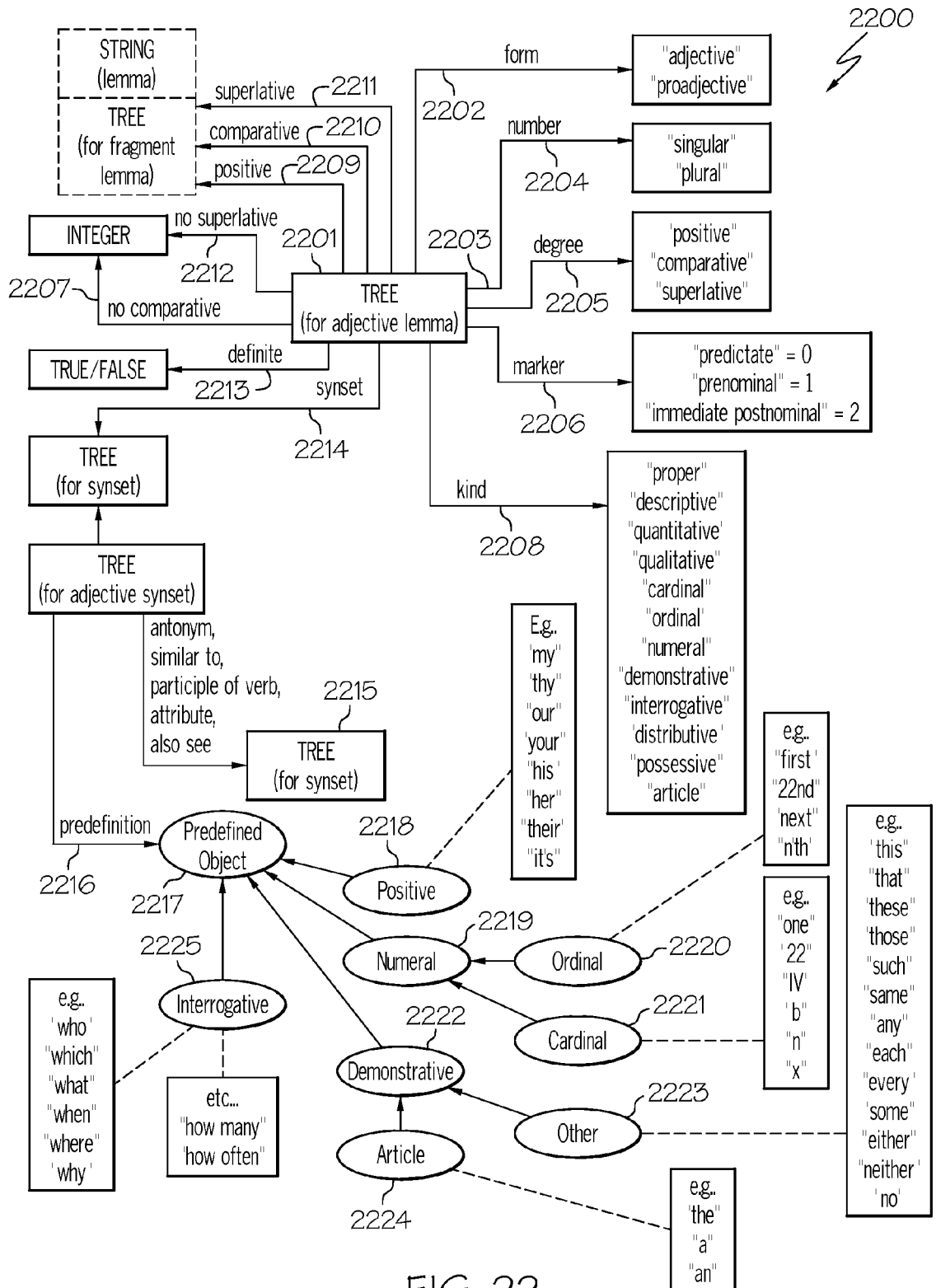
FIG. 22 is a schematic diagram based on a known high level data structure for representation of adjectives in a dictionary (Princeton University's WordNet structure) with extensions to support text parsing.

FIG. 22 describes the recommended structure for representation of adjectives. This is again consistent with the basic Princeton WordNet model, but extends it through inclusion of additional grammatical tags 2204, 2205 and 2208; the marking of adjectives with no comparative 2207 or superlative 2212 forms (e.g. of "extinct"); and the explicit handling of positive, comparative and superlative forms.

The recommended structure for adjectives includes use of explicit computer software code to handle parsing (in the text parser 2612) and synthesis (in the text synthesizer 2613) of a number of special classes of adjectives, identified in 2217, 2219, 2220, 2221, 2222, 2223, 2224 and 2225.

Figure 23:
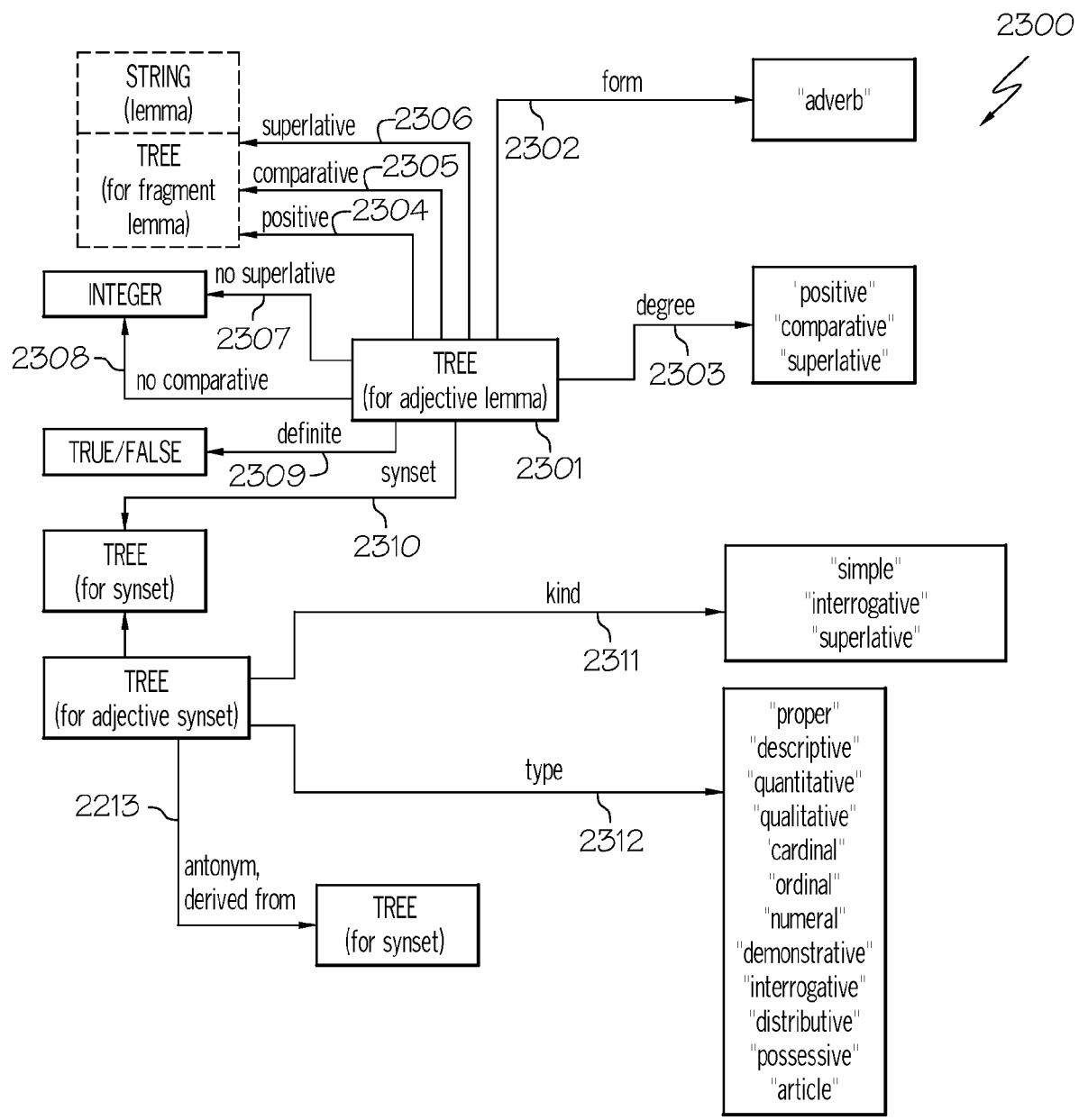
FIG. 23 is a schematic diagram based on a known high level data structure for representation of adverbs in a dictionary (Princeton University's WordNet structure) with extensions to support text parsing.
Figure 24A:
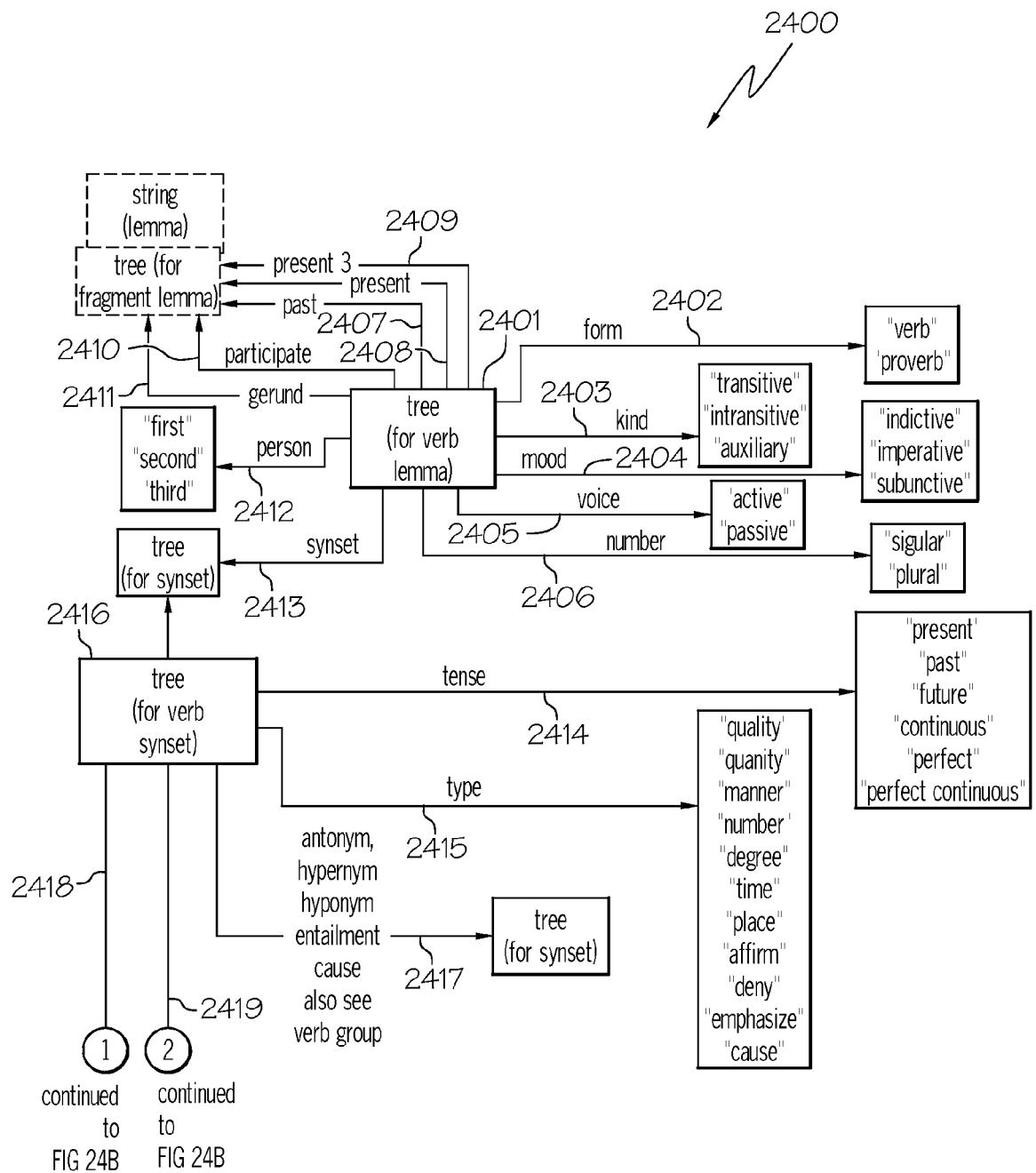
FIG. 24 is a schematic diagram based on a known high level data structure for representation of verbs in a dictionary (Princeton University's WordNet structure) with extensions to support text parsing.
Figure 24B:
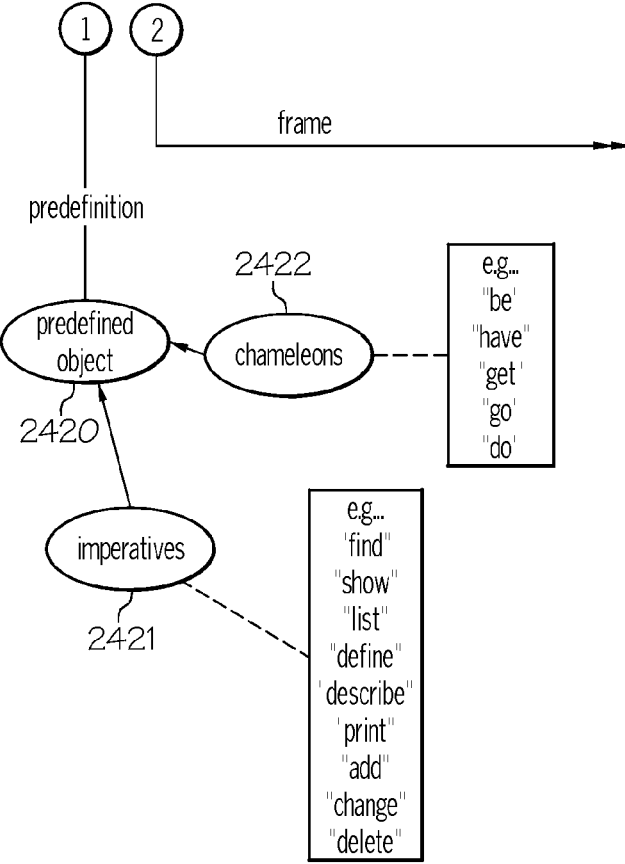

FIGS. 23 and 24 describe the recommended structures for representation of adverbs and verbs respectively. Both have extensions to the Princeton WordNet model similar in nature to the extensions to adjectives.

Figure 25:
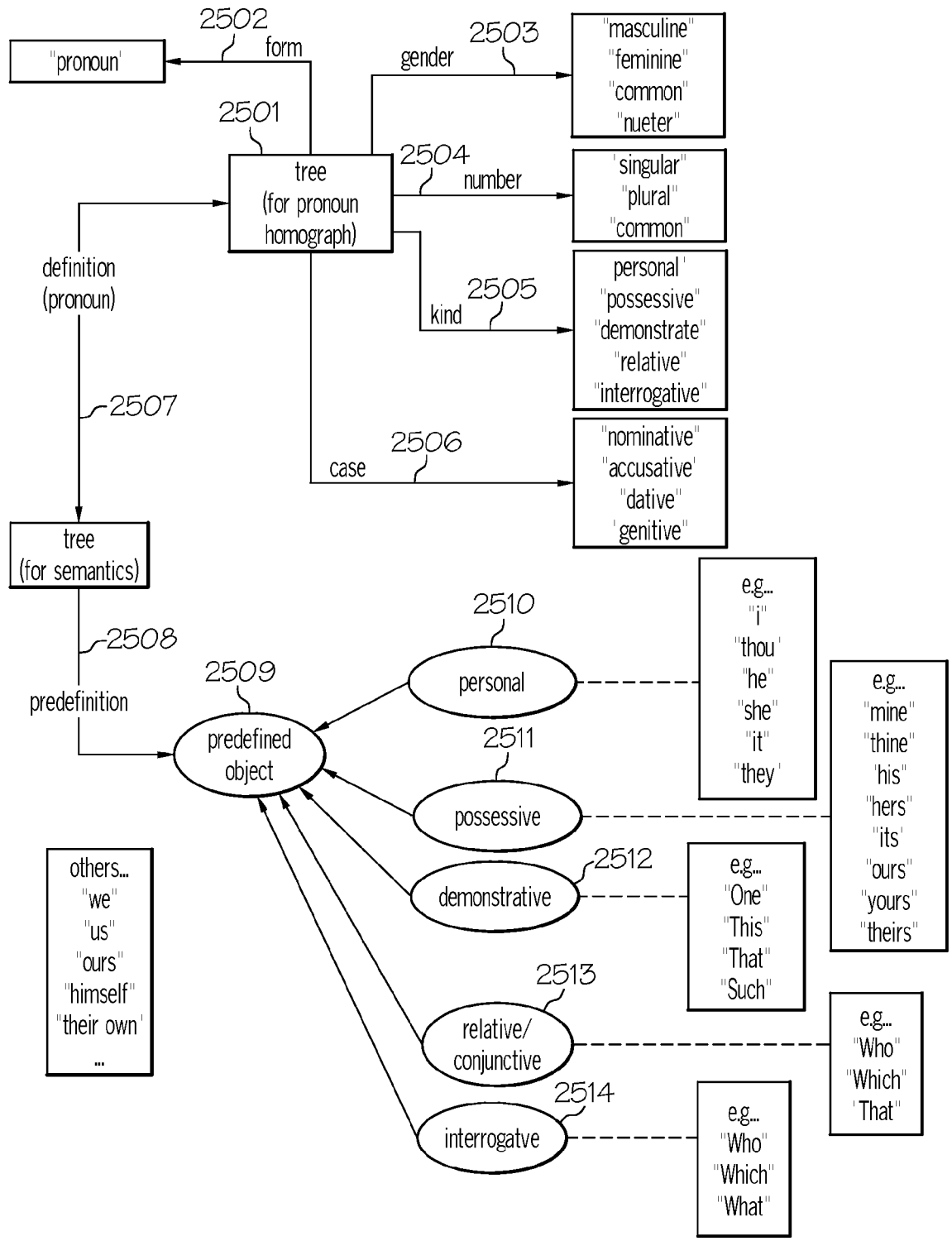
FIG. 25 is a schematic diagram based on a known high level data structure for representation of pronouns in a dictionary (Princeton University's WordNet structure) with extensions to support text parsing.

FIG. 25 describes the recommended structure for representation of pronouns, which are not defined in Princeton's WordNet, but the structure used is again consistent with the overall structure of WordNet.

The Dynamic Information System Tool

FIG. 26 illustrates the logical components of the DIS tool 2600, including a DIS engine 2610, which interacts with the user in the integration metasystem 100 and the deployed metasystem 104. The user interface renderer 2611 is designed to support a mode of operation based on a standard computer workstation with a Windows, Icons, Menus and Pointer (WIMP) interface to the user. The behavior of the DIS engine 2610 is driven by data contained in the dynamic repository 2620, which is instantiated in different forms in the dynamic integration repository 101 and the dynamic deployed repository 105. Data in the dynamic repository is rendered into views through computer logic in the DIS engine 2610 implementing rules stored in the repository 101, 105, and used to generate artifacts dynamically. The DIS engine 2610 includes a user interface renderer 2611 that communicates with a text parser 2612, a text synthesizer 2613, a forms renderer 2616, a graphics synthesizer 2614 and a graphics interpreter 2615.

Construction of a graphics-based user interface, driven by metasystem data, is common in the relevant art. The tool in FIG. 26 extends the model by linking visual elements and structures 2612, 2613, 2614, 2615, 2616 via a graphics model 2623 and a dictionary model 2621 to an ontology engine 2617.

The ontology engine 2617 communicates with the text parser 2612, text synthesizer 2613, forms renderer 2616, graphics synthesizer 2614, and graphics interpreter 2615. The graphics model 2623 is in communication with the ontology engine 2617, the graphics synthesizer 2614 the graphics interpreter 2615, and an asymmetric navigational database 2624. The dictionary model 2623 is in communication with the ontology engine 2617, the text synthesizer 2613 the text parser 2612, and an asymmetric navigational database 2624.

The ontology engine 2617 is at the heart of the DIS tool 2600, and carries the logic for manipulation of the ontology model 2622.

Construction of a forms-based interface driven by metadata and data is also well understood by practitioners in the relevant art. The tool outlined in FIG. 26 extends this model by linking the forms renderer 2616 to the ontology engine 2617 and hence to the ontology model 2622.

Construction of a text parser 2612 and text synthesizer 2613 is known to practitioners in the field of computational linguistics. In a recommended embodiment, the described dictionary model 2621 includes a limited domain subset of natural language, initially in English, with parsing syntax and generation rules for assertions, questions and commands and assembly of these into documents. The text parser 2612 and text synthesizer 2613 are in communication with a dictionary model 2621, which inter-communicates with the ontology engine 2617 and the asymmetric navigational database 2624. In a recommended embodiment, the dictionary model 2621 adopts the known Princeton University WordNet Dictionary, but extended to include conjunctions, prepositions and pronouns. There are but few words that are conjunctions, prepositions or pronouns.

The primary interface to the asymmetric navigational data base 2624 is the ontology model 2622 used by the ontology engine 2617 to provide the logic to support creation, use and maintenance of ontological and semantic structures. The key structures are to do with generic relationships, including inheritance structures (e.g. subtyping of unnamed concepts, or hypernymy/hyponymy structures for lemmas), attribution, meronymy and antonymy. Whilst terms such as hypernymy and meronymy are usually associated with the linguistic domain, they refer equally well to lexical object types based on non-textual symbols, such as icons representing a computer environment, a person, or a logical, or a physical or conceptual technology component.

To use the ontology engine 2617, the ontology model 2622 is required for the domain of discourse. The ontology model 2622 draws upon integration system concepts 2631 and deployed information system concepts 2632. In turn, the integration system concepts 2631 and deployed information systems concepts 2632 draw upon knowledge and information commonly used by practitioners in the information systems domain, including examples such as models, frameworks and patterns. In a recommended embodiment, the ontology model 2622 is populated with a base framework and models 2633.

The ontology model 2622 is linked to textual symbols from the dictionary model 2621 that persist in the asymmetric navigational database 2624. Similarly, it is linked to graphical symbols from the graphics model 2623 that also persist in the asymmetric navigational database 2624. Forms are handled differently, through definitions of views within the ontology model 2622. The ontology model 2622 also includes shared information describing models, patterns, frameworks and standards (collectively shown as shared information 2633).

The ontology model 2622 includes rules, similar in structure to the production rules in known language compiler technology, which identify functional processes including human processes (e.g. a workflow) or machine processes (e.g. programmed logic) or a combination of both. Users of the integration metasystem 100 will continuously extend the rules by defining new relationships with textual or graphical assertions. A recommended embodiment of the DIS tool 2600 includes the following components:

Scanning software and rules to identify tokens in the language (e.g. words and punctuation symbols), in the text parser 2612;

Syntactic rules and parsers to interpret the tokens in combination, in the text parser 2612;

Rules and software, in the ontology model 2622, and supported by the ontology engine 2617, to handle scanning and parsing of graphical elements and structures, in the graphics interpreter 2615;

Rules and software, in the ontology model 2622, and supported by the ontology engine 2617, to detect and respond to events where the event is triggered by changes to data in the dynamic repository 2620;

A base set of structural relationships such as union, intersection and inclusion, in the ontology model 2622, and supported by the ontology engine 2617;

An implementation of a set of generic semantic relationships that give effect to the linguistic and graphical relationships, and also standard mathematical and logical operations, in the ontology model 2622 and supported by the ontology engine 2617;

Rule constructors to permit definition of new relationships from textual or graphical assertions, in the ontology model 2622 and supported by the ontology engine 2617;

A dynamic repository interface 2620 through which the computer software code instantiated in the DIS tool 2600 interact with dynamic integration repositories 101 and dynamic deployed repositories 105.

The DIS Tool User Interface

Figure 27:
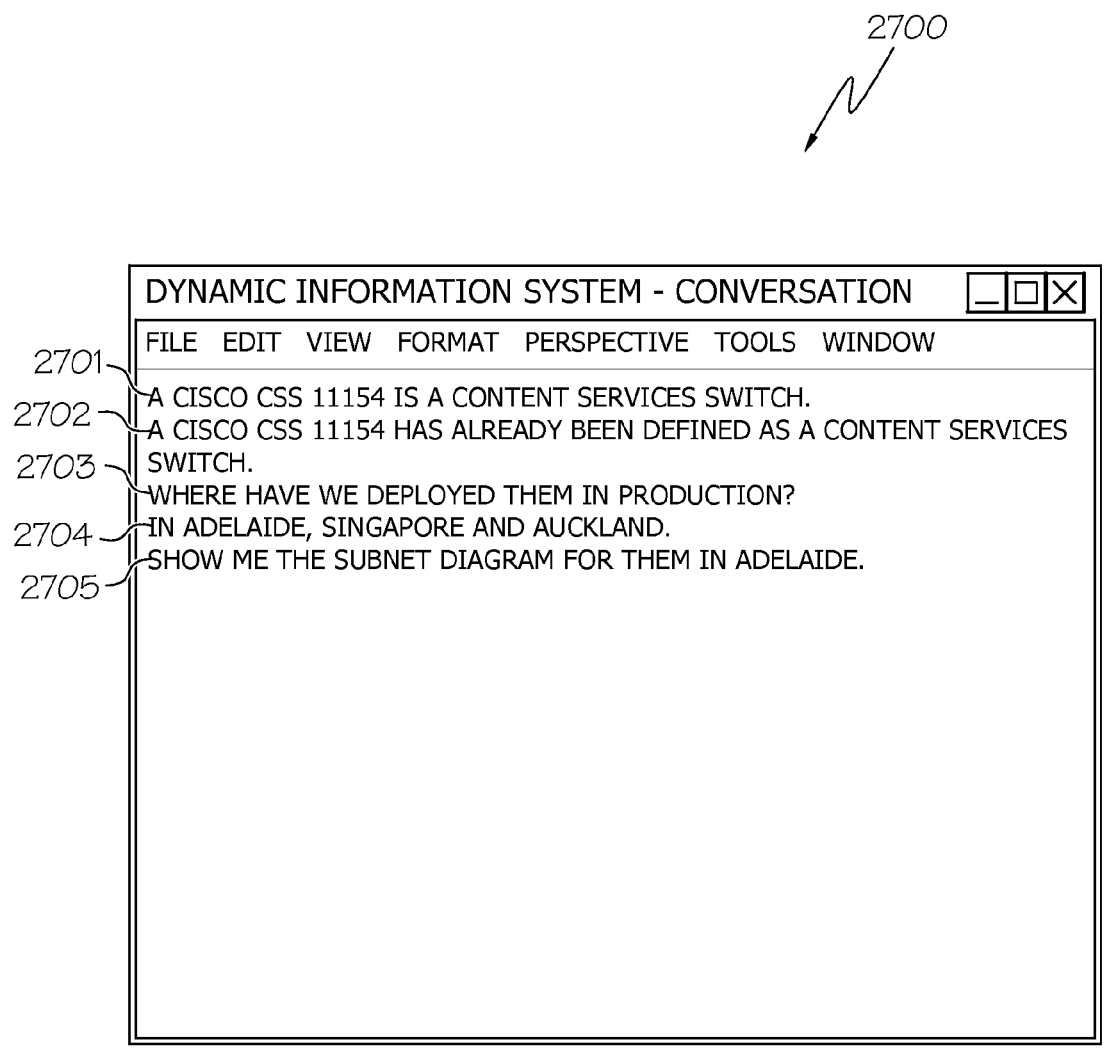
FIG. 27 is a schematic illustration of an example one option for a DIS tool computer screen layout.

FIG. 27 shows an example of a computer software window as it may be delivered in an embodiment of the DIS tool 2600. It depicts the user interacting with the DIS tool 2600 in an interactive conversational mode.

The first line of the conversation 2701 is in the form of an assertion of fact made by the user. The response to this assertion by the DIS tool is at 2702.

The third line of the conversation 2703 is in the form of a question. This includes the pronoun "we" which in this case is interpreted in the enterprise context, meaning "the enterprise". It also includes the pronoun "them" which in this case is interpreted in the conversation context, meaning "Cisco CSS 11154 context sensitive switches". The response is at 2704. Given the use of "we" in 2703, the response elides unnecessary facts that the sites named were sites of "XYZ Corporation".

The final line 2705 is in the form of a command, and requests display of a diagram. The response does not appear in the conversation, but instead the DIS tool opens a graphical window 2800 to display the requested diagram 2802. A status bar 2803 displays additional information about the diagram.

Figure 28:
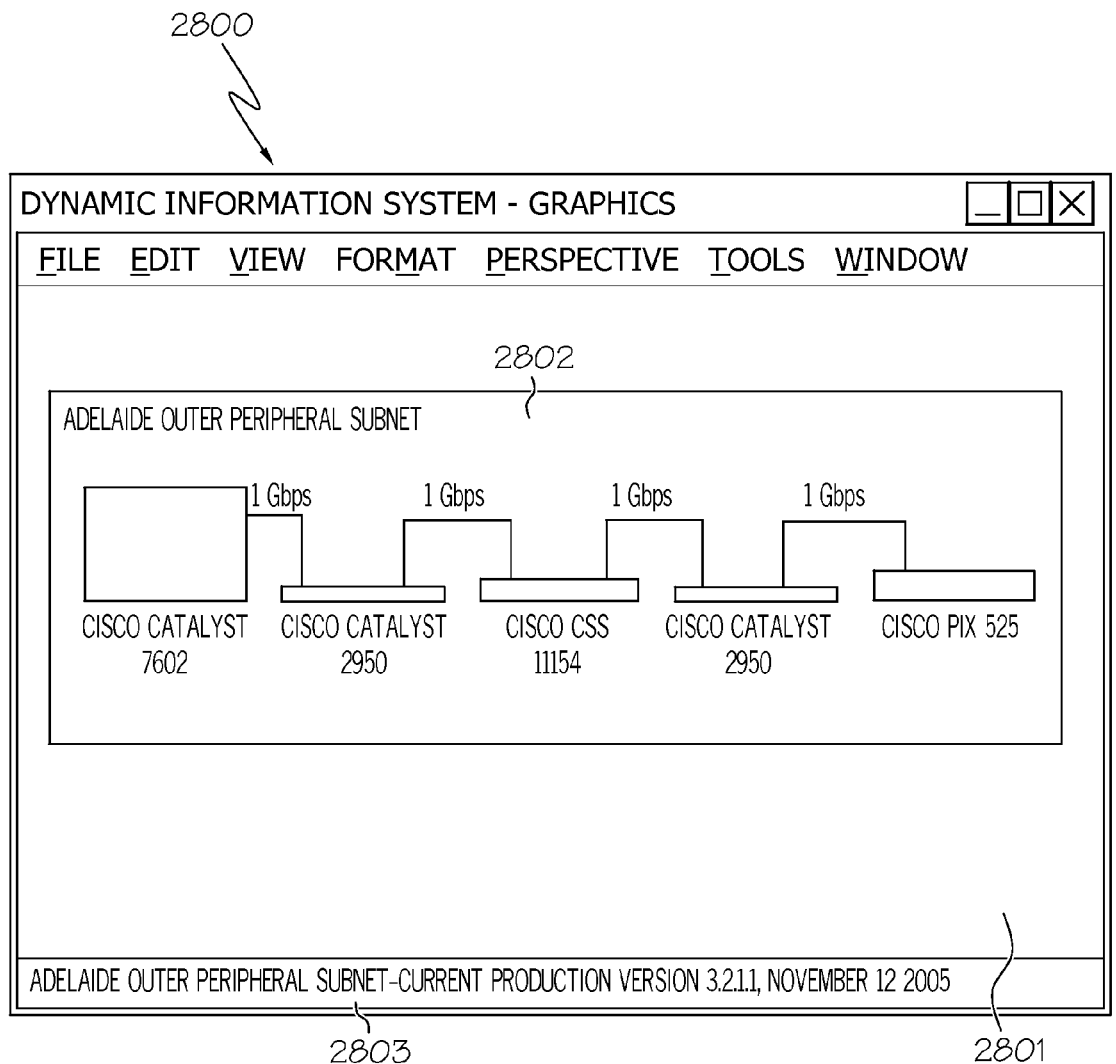
FIG. 28 is a schematic illustration of an example one option for a DIS tool computer screen layout.
Figure 29:
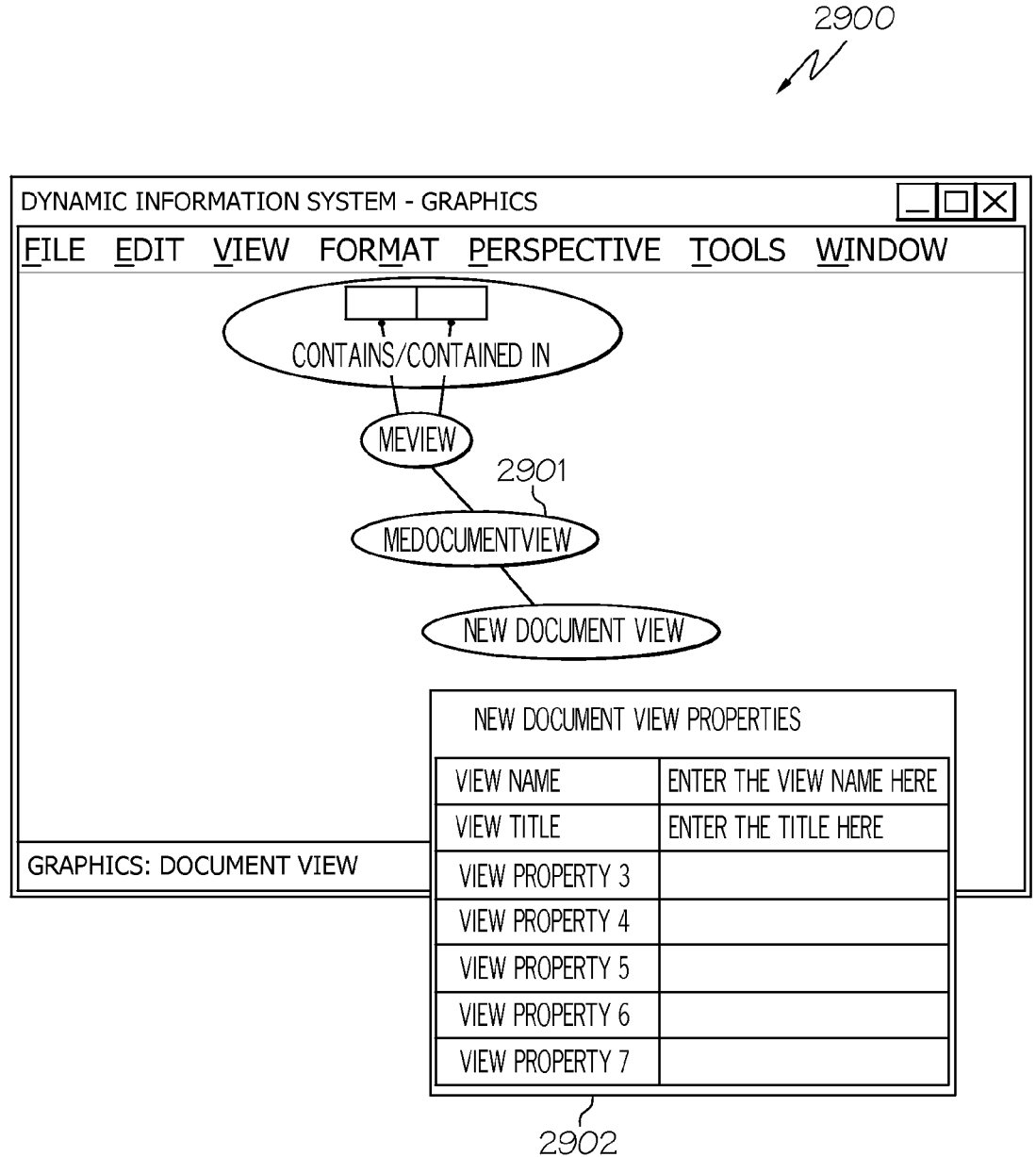
FIG. 29 is a schematic illustration of an example one option for a DIS tool computer screen layout.

In FIG. 28, the user has opened a graphical view of a concept diagram (FIG. 18) and requested the DIS tool 2600 to extend the MeDocumentView concept 1809. This may be done by various means, such as by selecting a concept extension tool from a palette, and using a mouse action to drag down from the MeDocumentView concept representation on the screen. The result is that a new subtype of an MeDocumentView is created, and the user may now be invited to add properties for the new view, using a dynamically generated form in a dialog box 2902 that is constructed by the DIS tool 2600 using any known property types inherited from an MeDocumentView concept.

Figure 30:
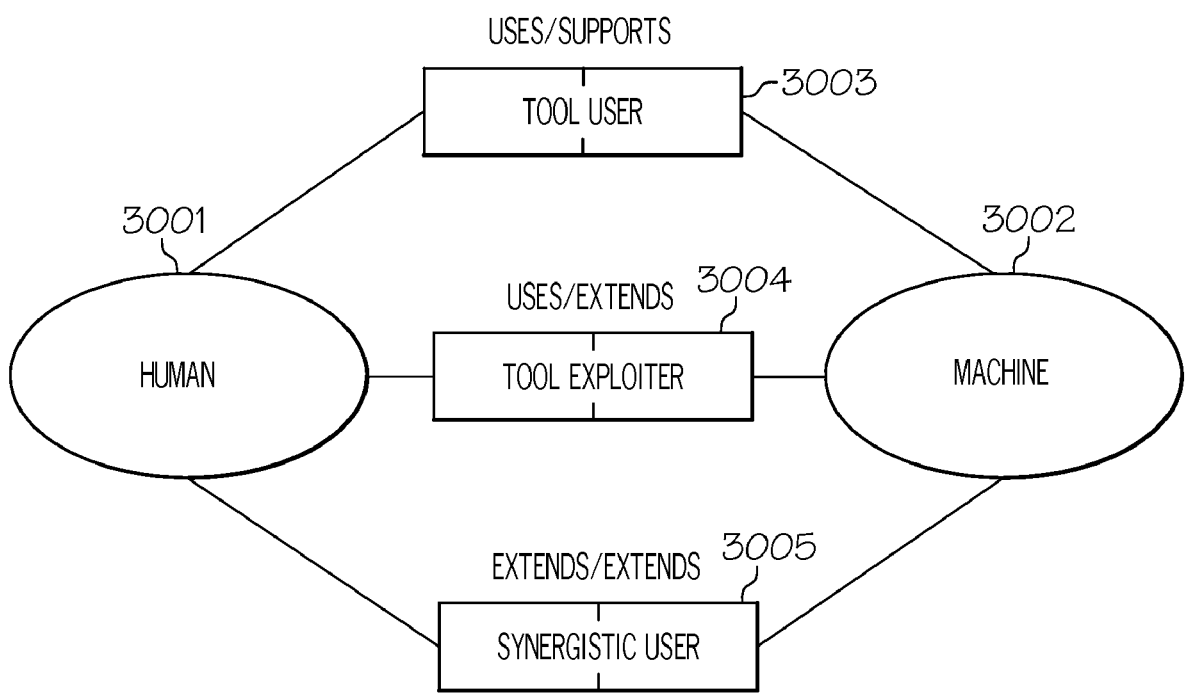
FIG. 30 is a block diagram that illustrates three different modes of use of computer systems.

As illustrated in FIG. 30, existing static tools can interact with users in two ways, namely as tool users 3003 or tool exploiters 3004. A tool user is a person who uses the capabilities of a tool for its primary design purpose, such as using word processing computer software for typing, with support from basic editing and formatting. A tool exploiter does this, but also extends their capabilities by learning deeper and more complex capabilities in the tool, such as a wider range of key combinations, use of macros, and combination of one tool with another.

The foregoing explanations of the dynamic repository 2622 and the DIS tool 2600 describe a tool that can interact with human users in a new way, where the user can extend their own capabilities, and the tool can also extend its capabilities. This happens because the DIS tool is interacting with a plurality of users, at the deployed and the integration levels, and each interaction adds to the information available to the DIS tool about the domain in which the users are working. The information available includes conceptual, logical and physical contexts, and it is stored within an ontology that behaves in an inferential way. The result is that the DIS tool is constantly "learning" about the domain, in a structured way, and so it interacts with the user from an increasingly deeper base of information. The result of that is that individual users will also learn more about the domain as they use the system. This is a synergistic user mode of operation 3005.

The DIS Tool as a Deployed System

Figure 31:
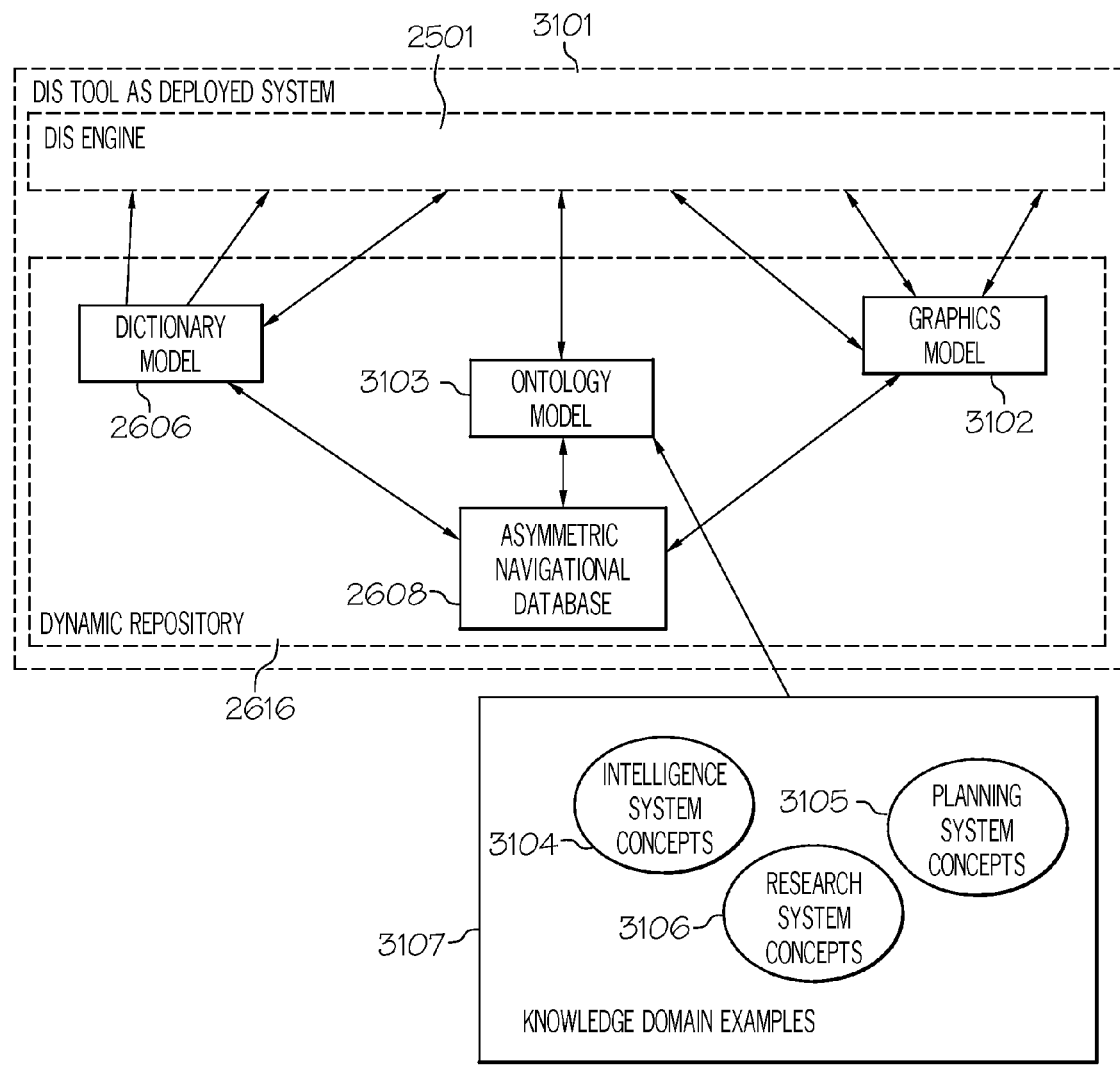
FIG. 31 is a schematic illustration showing the logical components of a Dynamic Information System tool, acting as a deployed system.

In another embodiment, an instance of the DIS tool can be used as a deployed system, as illustrated in FIG. 31. This is constructed from components that are identical to those of the DIS tool 2600, but with a different set of data in the graphics 3102 and especially ontology 3103 models.

Use of the DIS tool in this way can exploit its basic capabilities to support business needs for the aggregation and analysis of asymmetric and multi-dimensional information. These include, but are not limited to, intelligence systems for military, law enforcement, social security, and insurance enterprises; research systems for academic, scientific, economic, or business enterprises; and planning systems for any large enterprise, military or civil, including large projects.

The Dynamic Integration System 3201

Figure 32:
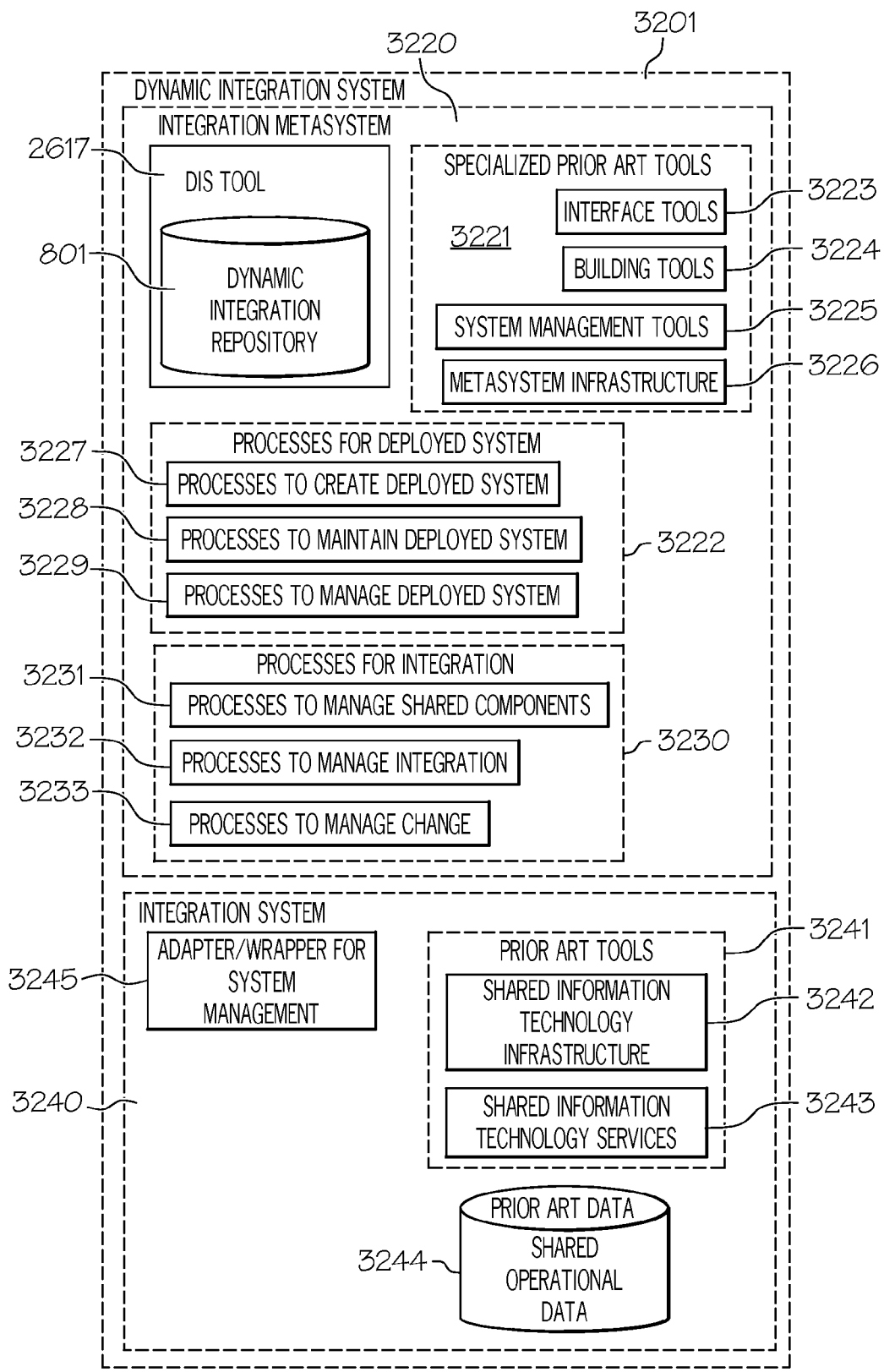
FIG. 32 is a schematic block diagram of the dynamic integration metasystem of FIG. 2.

The dynamic integration system 113 of FIG. 2 is presented in greater detail in FIG. 32, at 3201. It contains an integration metasystem 3220, and an integration system 3240.

The integration metasystem 3200 includes the capability to find and use system metadata and generated dynamic artifacts in the dynamic integration repository 801 by means of the DIS tool 2600. The system metadata and artifacts include but are not limited to models, frameworks, patterns, processes, standards and configurations. These data and artifacts are selected and used in the production of the integration system 3240, and the deployed metasystem 3320.

As seen in FIG. 32, the integration metasystem 3200 includes a dynamic integration repository 801 that contains system metadata for the integration system 3100. The integration metasystem 3220 also includes an instance of the DIS tool 2600 for managing the integration system 3240.

The integration metasystem 3200 also includes specialized known tools 3221, including interface tools 3223; building tools 3224; system management tools 3225; and metasystem infrastructure 3226.

The known tools 3221 may include examples such as the IBM Rational™ and WebSphere™ suites. The system management tools 3224 may include examples such as IBM's Tivoli™ suite and database tools. Other known components may be used in the specialized known tools 3221 including communication tools such as IBM's Lotus™ suite. The integration metasystem 3200 may use enterprise level standards, policies and procedures. In the dynamic information repository 801, information and knowledge domain examples of components that may be used include IBM's GS Method and IBM's Architecture Description Standard (ADS).

The integration metasystem 3200 includes processes 3222 for the deployed information system 3340, including processes 3227 to create a deployed information system 3340, processes 3228 to maintain a deployed information system 3340 and processes 3229 to manage a deployed information system 3340.

The integration metasystem 3200 includes processes 3230 for the integration system 3240, including processes 3231 to manage the shared components of an integration system 3240; processes 3232 to manage the integration system 3340 and processes 3233 to manage change in an integration system 3240.

In a recommended embodiment, the definition of specific processes is based on known standards such as those in the Information Technology Infrastructure Library (ITIL www.itil.co.uk).

The DIS tool 2600 provides a mechanism for creation of system metadata as a by-product of the use of artifact views. For example there is a facility to draw a diagram on a screen and have the diagram elements automatically translated into canonical representations in a dynamic integration repository 801. The described tool also provides a mechanism to support inheritance, i.e. a lower level metasystem such as a deployed metasystem 3320 can use or extend higher-level system metadata, for example that in the integration metasystem 3220. Propagation is also supported, i.e. lower-level metadata such as effort, availability or performance data can be pushed up by a lower level metasystem, or pulled up by a higher level system. The integration metasystem 3220 includes the known infrastructure 3226 necessary to support operation of the integration metasystem itself. This infrastructure includes but is not limited to computer hardware, software, and communications equipment, and may include one or more replicas of the infrastructure required for the integration system 3240.

The integration metasystem 3220 may be interfaced with other systems, including deployed information systems 3340 and deployed metasystems 3320, e.g. for collection and analysis of, and response to, quality-of-service measurements.

The integration metasystem 3220 provides a mechanism that can ensure consistency between conceptual, logical and physical components.

As seen in FIG. 32, the integration system 3240 includes a set of known tools 3241; shared operational data 3244; and adapters and/or wrappers 3245 for interfacing with the integration metasystem 3220.

The tools 3241 include shared information technology infrastructure 3242 and shared information technology services 3243. Shared information technology infrastructure includes, but is not limited to, server systems, such as security gateways, database servers and communications systems that are not exclusively a component of an individual deployed information system. Shared services are electronic services exposed by the shared infrastructure for use by other integration or deployed systems.

The foregoing capabilities enable the creation and deployment of systems that are dynamic (which implies that they are agile and resilient to change) and integrated (which implies that these systems and their interfaces are synchronized to be consistent over time).

Dynamic Deployed System

Figure 33:
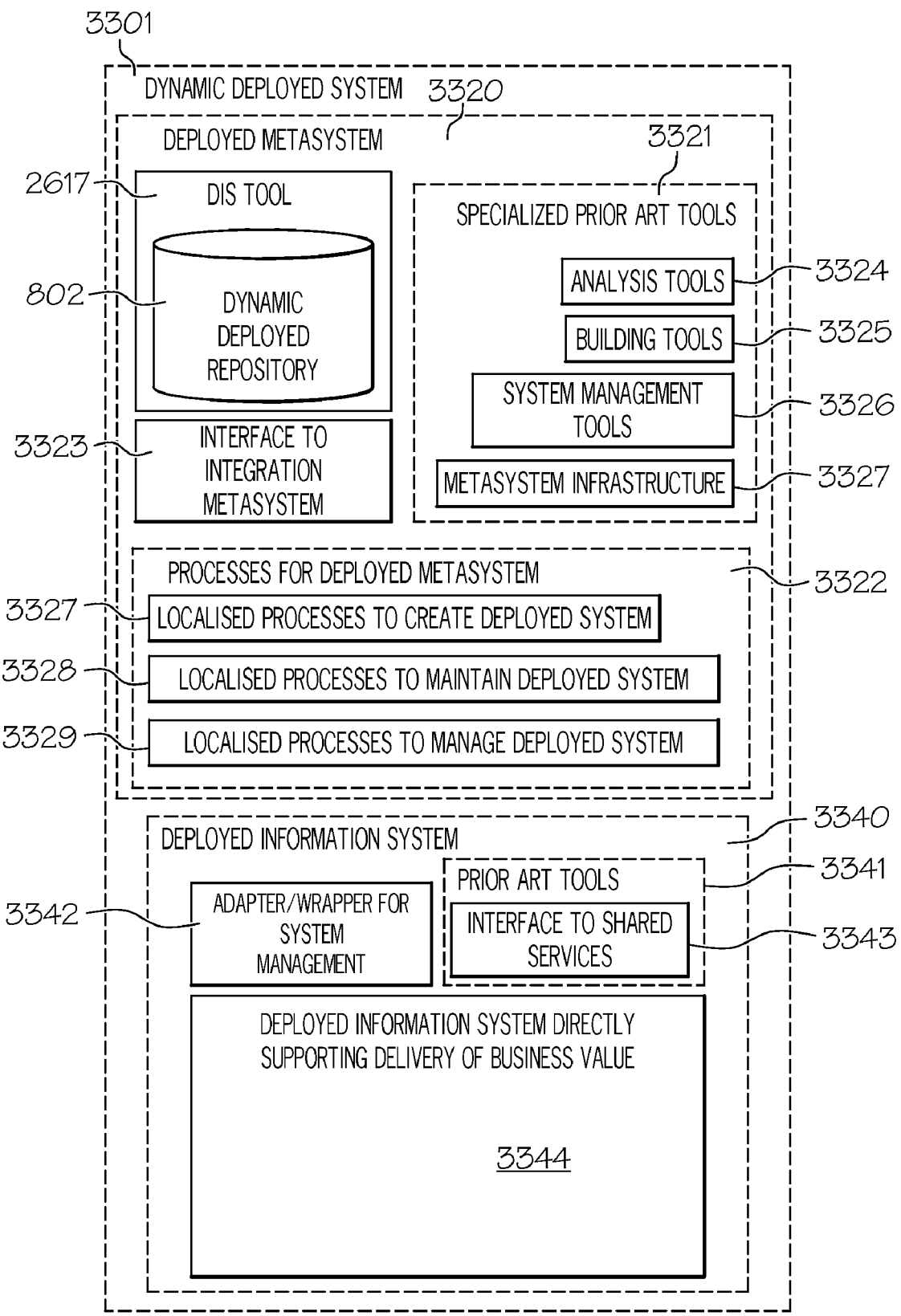
FIG. 33 is a schematic block diagram of the dynamic deployed system of FIG. 2.

The dynamic deployed system 114 of FIG. 2 is shown in more detail in FIG. 33 at 3301. It comprises a deployed metasystem 3320, and a deployed information system 3340.

The deployed metasystem 3320 serves to manage the deployed information system 3340. The deployed metasystem 3320 is generated by the integration metasystem 3220 when the need for a new deployed information system 3340 is identified.

The deployed metasystem 3320 comprises an instance of the DIS tool 2600 with a dynamic deployed repository 802; a set of specialized known tools 3321; an interface 3323 to the integration metasystem 3220; and processes 3322 used within the deployed metasystem 3320.

The recommended embodiment of the dynamic deployed repository 802 is populated with system metadata selected from the integration metasystem 3220, such as selected models, frameworks, patterns, processes, standards and configurations as required.

The interface 3323 to the integration metasystem 3220, allows the metasystem users of the deployed information system 3320 to select or use the shared or integration components they require, and to create versions local to the deployed information metasystem 3320. The interface 3323 also permits localized versions to be submitted to the integration metasystem 3220 for consideration as new shared components.

The specialized known static tools 3321 include, but are not limited to, localized analysis tools 3324, localized building tools 3325, and localized system management tools 3326. The specialized known tools 3321 also include the known infrastructure 3327 necessary to support operation of the deployed metasystem itself. This infrastructure includes but is not limited to computer hardware, software, and communications equipment, and is likely to include one or more replicas of the infrastructure required for the deployed information system 3340.

The deployed metasystem 3320 also contains a set of processes 3322, which include, but are not limited to, localized processes 3327 to create the deployed information system 3340; localized processes 3328 to maintain the deployed information system 3340; and localized processes 3329 to manage the deployed information system 3340.

The existence of the deployed metasystem 3320 is mandated by the requirement for the metasystem users to have a localized view of the deployed information system 3340. This enables the metasystem users to be able to work in detached environments (when not connected to a shared environment) to employ specialized tools, processes and techniques, and for conformance with security requirements.

As seen in FIG. 33, the deployed information system 3340 is a business system 3344 that includes a technology solution made up both of applications and infrastructure. An example is a financial management information system. The development of either the applications or the infrastructure, or both, may be outsourced. The business system 3344 also includes the processes, skills and procedures that are supported by the technology solution. The human or business dimensions are typically not outsourced, but may be so in specific contexts such as an outsourced human resources system. The business system 3344 also includes the data, information and knowledge that are resources for or products of the business system 3344.

The business system 3344 is augmented by known tools 3341, including, but not limited to, interfaces to shared services 3343 that support the use of shared services 3243. These shared services may include elements such as shared messaging structures (as in service-oriented architecture) and common system interfaces.

The deployed information system 3340 also includes adapters/wrappers 3342 that permit system management interaction with the deployed metasystem 3320, and the integration metasystem 3220.

The deployed information system 3340 includes a technology solution, namely system components in all tiers of enterprise architecture, including infrastructure, platforms, network, network services, middleware, data integration, application components and applications. The deployed information system 3340 also includes specific components related to a business solution, such as human processes.

Figure 34A:
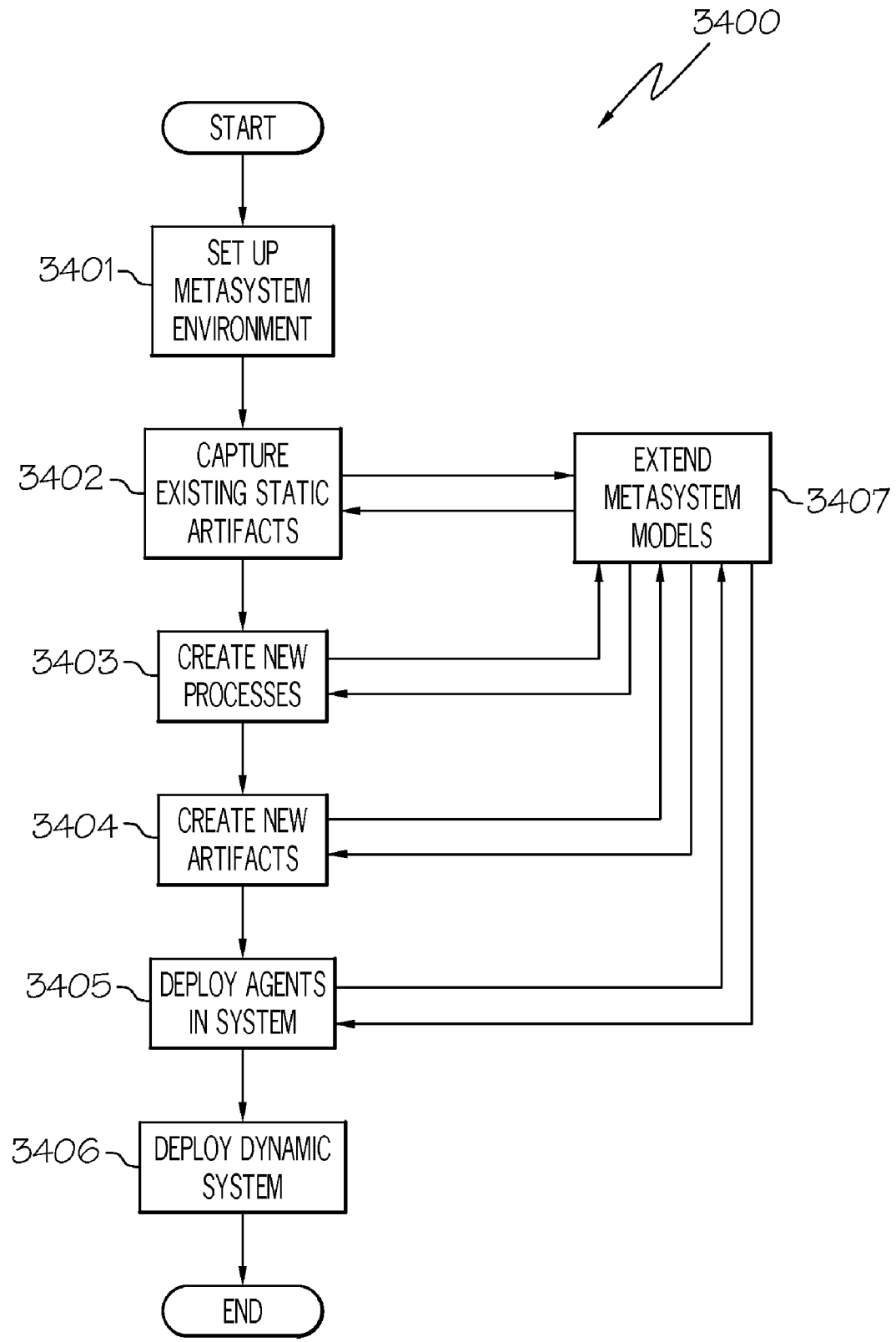
FIG. 34A is a flowchart illustrating a method of building a dynamic integration system from an existing static integration system, and the artifacts that comprise the existing static integration metasystem.

Method for Creating a Dynamic Integration System for an Existing Static Integration System FIG. 34A shows a flow chart of a method 3400 for building a dynamic integration system 113 from an existing static integration system 706 and the artifacts that comprise the existing static integration metasystem 702. Broadly, this is accomplished by undertaking two transformations:

creating an integration metasystem 100, 3220 and a dynamic integration repository 101, thereby producing the integration metasystem 100, 3220 component of a dynamic integration system 113, 3201 and adding metasystem agents 117 to the existing static integration system 702, thereby producing the integration system component 108, 3240 of a dynamic integration system 113, 3201.

Figure 34B:
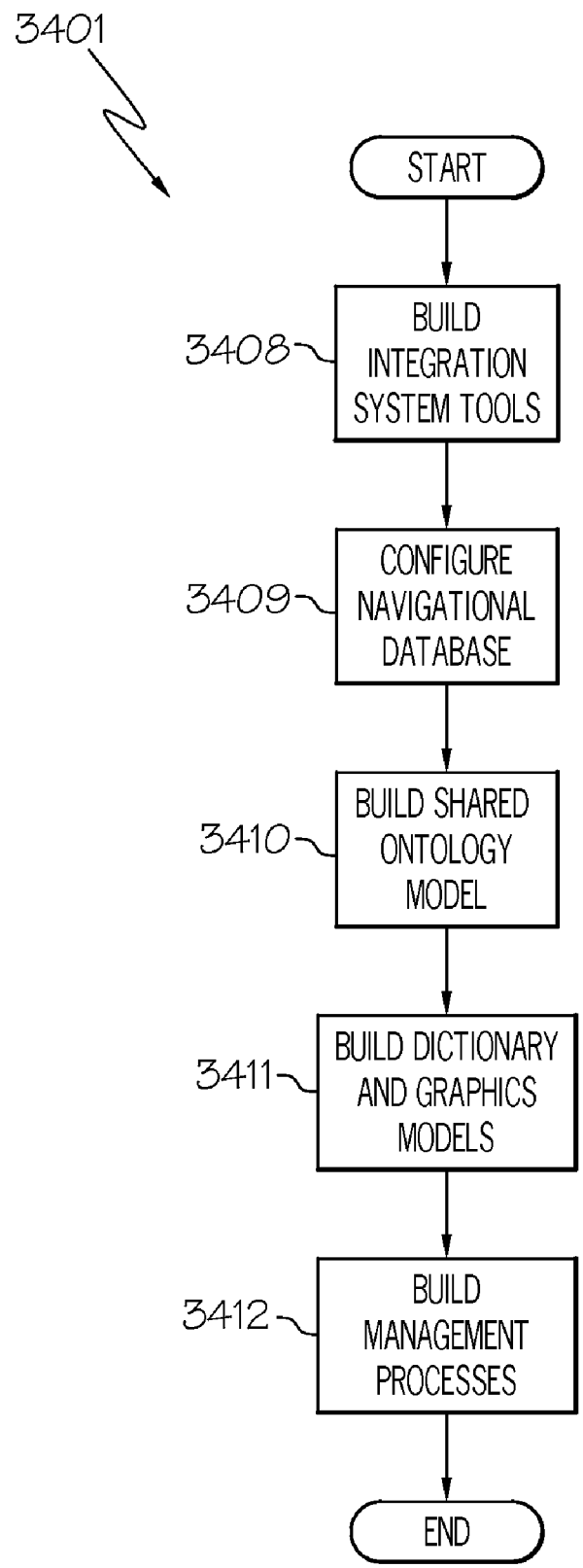
FIG. 34B is a flowchart that shows more detail of a Set Up Metasystem Environment process.
Figure 34C:
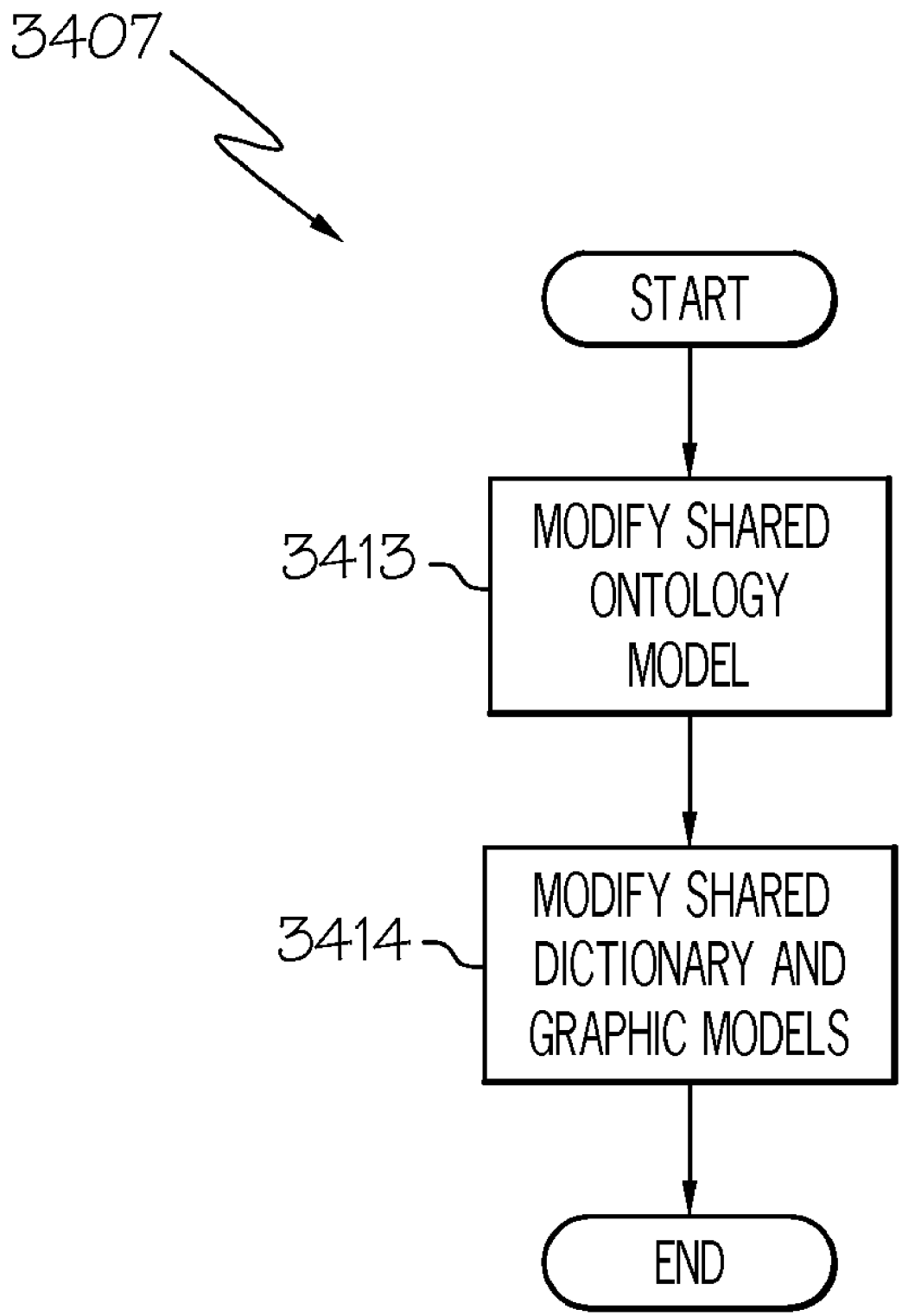
FIG. 34C is a flowchart that shows more detail of a Extend Metasystem Models process.

Further details of the method 3400 are shown in FIGS. 34B and 34C.

In a first step 3401, the integration metasystem 100, 3220 environment is set up. Setting up the environment involves defining and installing the necessary computer infrastructure, and installing and configuring the DIS tool. This step is further described in FIG. 34B.

Next, the existing static artifacts in the existing static integration repository 701 are captured into the dynamic integration repository 101 in the step Capture Existing Static Artifacts 3402, using the integration instance of the DIS tool 102, 2600. This can be a daunting task for any enterprise, depending upon the state of the existing static integration repository 701. It would not be unusual for existing static artifacts to exist in a plurality of forms, including inaccurate, incomplete and inconsistent text documents, spreadsheets, email messages and diagrams constructed using numerous different tools, methods, and standards. Many elements are likely to be tacit, or maintained on whiteboards.

Because of the intrinsically unreliable nature of static artifacts, this step does not merely copy these artifacts into the dynamic repository, but also validates them for correctness and completeness, and as a consequence also edits and extends the information they contain.

Enterprises may choose to undertake this step 3402 as a single large focused project or they may use an evolutionary approach, where static artifacts are captured on an as-needed basis, parallel with the construction of new dynamic systems. The difficulty of this step 3402 is a reflection of the need for a dynamic systems approach, in that the static approach presents the underlying problem of finding, interpreting and validating these static artifacts to every project that creates a new system, or changes an existing system.

The difficulty of step 3402 can be alleviated by use of metasystem adapters 116 that, in a recommended embodiment, can work with the DIS tool 2600 to read some well-structured electronic documents and translate them into dynamic artifacts.

The preferred embodiment of the DIS tool 2600 includes a base set of dictionary, graphic, and ontology models, some of which are illustrated in FIGS. 10, 11, 12, 13, 14, 15, 16, 17, 17, 19, 20, 21, 22, 23, 24, and 25. However, these are not comprehensive, and enterprises are likely to have different views as to the appropriateness of these specific basic models. Therefore, step 3402 will need to invoke instances of step 3407 to extend or amend the basic models so as to best meet the needs of the enterprise.

The extend metasystem models step 3407 is part of the normal operation of the dynamic metasystem. It is performed using the DIS tool 2600, where the DIS engine 2610 provides the client or metasystem user with forms, graphical symbols, and textual capabilities to extend existing models or create new models. Known related technologies for this concept are seen in "screen painters" in many computer programming tools, such as Borland's JBuilder™ (www.borland.com), or in internet portal technology. The ability to manipulate models that are then incorporated into the logic of the DIS tool 2600 and its repositories 101, 105 is a key underlying concept for a dynamic system.

Next, in step 3403, new processes are defined in the dynamic integration repository 101, to govern the ongoing management of the dynamic integration system 113. These new processes would normally be based on known processes in the information technology industry, as in the recommended embodiment of the DIS tool 2600 using processes identified in the Information Technology Infrastructure Library (ITIL www.itil.co.uk). They are also commonly defined in enterprises as part of their quality management framework. However, the new processes will differ in that they will take advantage of the underlying integration of data within the dynamic integration repository 101. In particular, they will have a much reduced focus on manual aspects of versioning, configuration management and document cross-referencing processes, all of which will become a by-product of using the DIS tool and the dynamic repositories. In a recommended embodiment, a base set of such processes would be included in the ontology model 2622, and the creation of new processes would extend these base processes. The recommended base processes include:

Incident Management;
Problem Management;
Change Management;
Configuration Management;
Release Management;
Service Level Management;
Availability Management;
Capacity Management;
Financial Management for Services;
Service Continuity Management; and
Security Management.

As with the capture of existing static artifacts 3402, the creation of new processes 3403 is likely to lead to extension of the base models in the recommended embodiment of the DIS tool 2600, to cope with specific needs of the individual enterprise. Thus, the creation of new processes 3403 will need to invoke instances of step 3407 to extend or amend these models.

Next, new artifacts are created in step 3404. The need for new artifacts will be identified as steps 3402 and 3403 are completed, and the DIS tool analyses the dynamic integration repository 101 for completeness and consistency against higher level conceptual models. This analysis is performed by comparing the metadata created or extended by the metasystem user with the metadata at the higher conceptual levels. Again, step 3407 may be invoked to extend or amend the high level models.

Next, in step 3405, metasystem agents 118 are deployed into the integration system 108, to support management of the integration system 108 by the integration metasystem 100. Metasystem agents are computer software tools that monitor events in the integration system 108. Numerous known metasystem agents exist, such as a suite of IBM Tivoli Agents. These agents gather information about the behavior of an information system, including the technology infrastructure that is used by the information system. There is also a standard, the Application Response Measurement (ARM) standard (http://www.opengroup.org/tech/management/arm/) that can be used to add instrumentation to the computer code within information systems and to generate events for capture by metasystem agents such as IBM Tivoli Composite Application Manager for Response Time. The DIS tool 2600 is not designed to replace such agents or such functions, but to ensure that the architecture and design of dynamic information systems considers the appropriateness of monitoring and alerting in the management of these systems.

The final step, 3406, is to deploy the dynamic integration system 113 into production. At this point, the tools, processes and metadata of the integration metasystem 100 may be used for the construction, maintenance and management of deployed metasystems 104 and deployed information systems 112.

FIG. 34B extends the description of the process of building the integration system environment 3401.

The first step is building the integration system tools 3408. This involves the basic architectural and project management steps normally involved in defining development, test, training and production environments, but also including installation of the DIS tool 2600 onto the project team's client computers 4001, and onto a server machine 4003. In this step 3401, there is no pre-existing integration metasystem, and so known tools and processes must be used.

Following installation of the DIS tool 2600, the step 3409 is executed to configure the asymmetric navigational database 2624. Installation of the DIS tool 2600 in step 3408 creates the base instances of models 2621, 2622, 2623 in an asymmetric navigational database 2624. Step 3409 configures the DIS tool 2600 instances on client machines to be able to interact with the DIS tool instance on the server machine. It may also configure the DIS Server Machine 4003 to use a database server 4004 attached to the network. Finally, step 3409 may configure tools and processes to backup asymmetric navigational databases 2624 from the DIS client machines to the networked database server 4004, and from the database server 4004 to backup storage, either on-line or off-line and off-site.

Next, step 3410 is executed to build the shared ontology model 2622. This requires metasystem users to review the ontology model included with the recommended embodiment of the DIS tool 2600, and to extend this model to reflect any customization required by the enterprise. The review and modification are both performed using the DIS tool 2600.

In a recommended embodiment, much of steps 3408 and 3409 can be performed as part of the DIS tool installation process, using forms presented by a computer software program that installs the DIS tool to capture the necessary data. The use of known computer software installer tools is common in the computer software industry.

Next, step 3411 is executed to build the dictionary and graphics models. The recommended base dictionary model 2621 includes a large lexicon, so review of the vocabulary at this point is likely to be confined to the language of art for the enterprise, including definition of enterprise-specific acronyms. Similarly, the recommended base graphics model 2623 is broad in scope, and it is likely that this task will initially focus on symbols specific to the enterprise, or to the industry of the enterprise.

Finally, step 3412 is executed to build management processes. The recommended embodiment of an ontology model 2622 includes a set of base processes, so this step would involve review and extension of the processes in the recommended base ontology model 2622, and extension of the base processes to include enterprise-specific procedures and forms. Extension of the base processes would take place using the DIS tool 2600.

FIG. 34C provides more detail on the process for extension of metasystem models 3407. This process is invoked at several points in the process for creation of an integration metasystem 100 for an existing static integration system 706.

Step 3413 is executed to modify the shared ontology model. This step employs the DIS tool 2600 to review concepts in the ontology model 2622, using textual or graphical views of the data, and to extend these concepts using interactive textual or graphical views.

Step 3414 is executed to modify the dictionary 2621 and graphics 2623 models. In a recommended embodiment, the ontology model 2622 includes definition of forms views for use by the forms renderer 2616, which can be used to display forms that aid the definition of new lemmas, and the associated properties of words. The properties defined in a preferred embodiment are illustrated in FIGS. 20, 21, 22, 23, 24, and 25. An experienced user may choose to modify the dictionary using a conversational textual interface, similar to that illustrated in FIG. 27, at 2701. In a recommended embodiment, modification of graphics models 2623 is enabled by use of a graphical editor view for drawing a new or modified graphical element, and either textual or forms-based views for defining or modifying the properties of the graphical element.

Figure 35A:
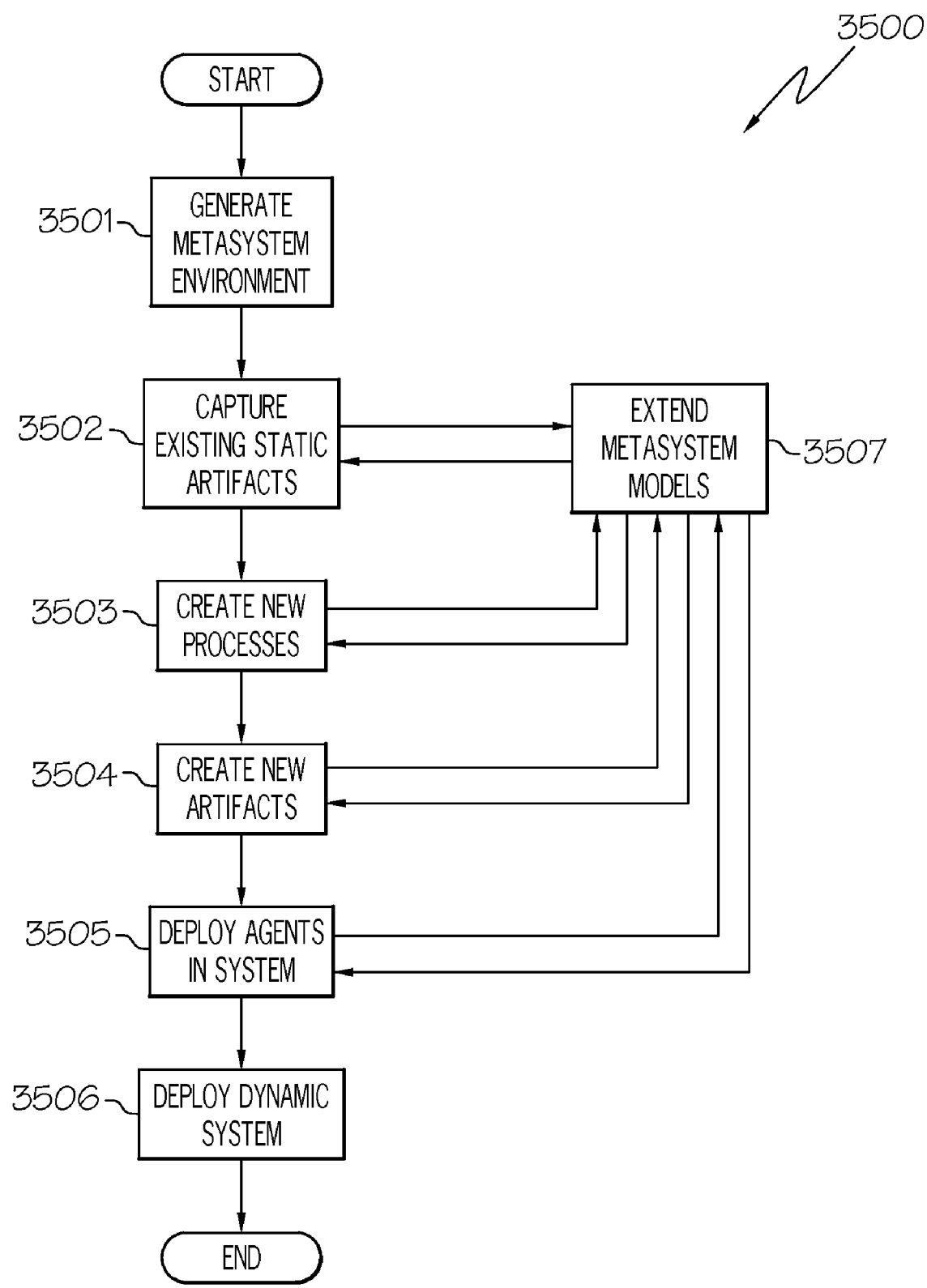
FIG. 35A is a flowchart illustrating a method of building a dynamic deployed system from an existing static deployed metasystem, and using a dynamic integration system.

Method of Creating a Dynamic Deployed System for an Existing Static Deployed System FIG. 35A shows a flow chart of a method 3500 for building a dynamic deployed system 112 from an existing static deployed system 705 and the artifacts that comprise the existing static integration metasystem 701. This method 3500 assumes the existence of a dynamic integration system 113.

Broadly, this is accomplished by undertaking two transformations:

creating a deployed metasystem 104, 3200 and a dynamic deployed repository 105, thereby producing the deployed metasystem 104, 3320 component of a dynamic deployed system 114, 3301 and adding metasystem agents 111 to the existing deployed system 705, thereby producing the deployed information system component 112, 3340 of a dynamic deployed system 114, 3301.

Figure 35B:
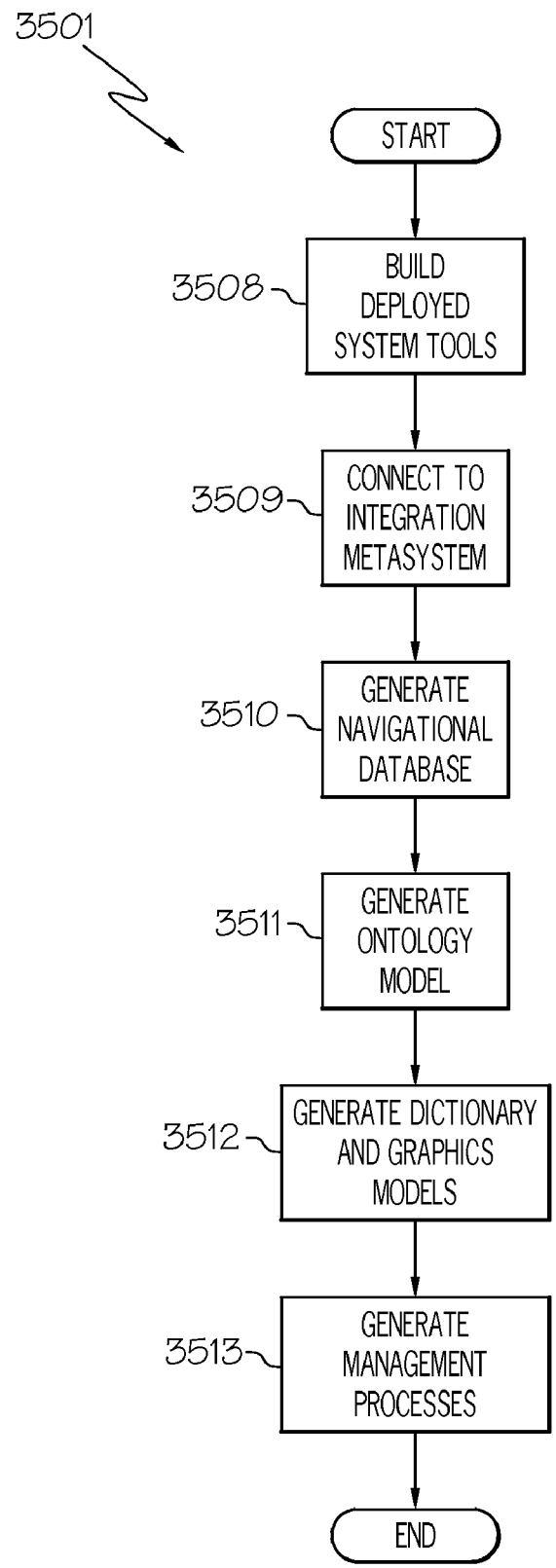
FIG. 35B is a flowchart that shows more detail of a Generate Metasystem Environment process.

Further details of the method 3500 are shown in FIG. 35B.

In a first step 3501, the deployed metasystem 104, 3320 environment is generated. Generating the environment involves defining and installing the necessary computer infrastructure, and installing and configuring the DIS tool. This step is further described in FIG. 35B.

Next, the existing static artifacts in the existing static deployed repository 702 are captured into the dynamic deployed repository 105 in the step Capture Existing Static Artifacts 3502, using the deployed instance of the DIS tool 104, 2600. As with the transformation of a dynamic integration system into a dynamic integration system, this step requires that existing static metasystem artifacts be found, validated, and edited.

Given an existing dynamic integration system 113, elements of the static deployed repository 702 relating to integration may be generated from the dynamic integration system. This does not require that the dynamic integration repository 101 be replicated, as that the information in repository is available to the deployed metasystem 104 through the deployed instance of the DIS tool 106, 2600. Part of the advantage gained from use of the dynamic approach is that each dynamic deployed system 114 can work from a consistent and accurate view of the dynamic integration system 113.

The preferred embodiment of the DIS tool 2600 includes a base set of dictionary, graphic, and ontology models, some of which are illustrated in FIGS. 10, 11, 12, 13, 14, 15, 16, 17, 17, 19, 20, 21, 22, 23, 24 and 25. However, these are not comprehensive, and enterprises are likely to have different views as to the appropriateness of these specific basic models. Therefore, step 3502 will need to invoke instances of step 3507 to extend or amend the basic models so as to best meet the needs of the enterprise.

The extend metasystem models step 3507 is part of the normal operation of the dynamic metasystem. It is performed using the DIS tool 2600, where the DIS engine 2610 provides the client or metasystem user with forms, graphical symbols, and textual capabilities to extend existing models or create new models. For the dynamic deployed system 104, the new or extended models should incorporate only elements specific to the deployed system. The deployed instance of the DIS tool 106 does not have the capability to modify models in the dynamic integration system 113. Should modification to the dynamic integration system 113 be required, these must be performed within the dynamic information system 113, by metasystem users authorized to do so, and using an integration instance of the DIS tool 102, 2600.

Next, in step 3503, new processes are defined in the dynamic deployed repository 105, to govern the ongoing management of the dynamic deployed system 114. These new processes would normally be extensions of the processes defined in the dynamic integration system 113.

Next, new dynamic artifacts are defined in step 3504. The need for new artifacts will be identified as steps 3502 and 3503 are completed, and the DIS tool analyses the dynamic deployed repository 105 for completeness and consistency against higher level conceptual models, including models in the dynamic integration repository 101. Step 3507 may be invoked to extend the high level models.

Next, in step 3505, metasystem agents 117 are deployed into the deployed information system 112, to support management of the deployed information system 112 by the deployed metasystem 104 and the integration metasystem 100.

The final step is to deploy the deployed information system into production 3506. At this point, the tools, processes and metadata of the deployed metasystem 104 may be used for the maintenance and management of the deployed information system 112.

FIG. 35B extends the description of the process of building the integration system environment 3501. All steps in 3501 are undertaken in the dynamic integration system 113, using an integration instance of the DIS tool 102, 2600. The process 3501 delivers to the deployed system's project team a fully configured deployed metasystem 104.

The first step is building the deployed system tools 3508. This involves the basic architectural and project management steps normally involved in defining development, test, training and production environments, but also including delivery of client computers 4001, and one or more server machines 4003.

Next, the step 3509 is executed to connect the deployed metasystem 104 to the integration metasystem 100. This includes configuration of the integration metasystem 100 and the deployed system 104 by creating links in the respective dynamic repositories so that the two systems recognize each other.

Next, step 3510 is executed to generate the navigational database for the dynamic deployed repository 105. In a recommended embodiment, this is an automated function of an integration instance of the DIS tool 2600.

Next, step 3511 is executed to generate the ontology model 2622 for the deployed metasystem 104. This involves replication from the integration metasystem 101 to the deployed metasystem of clones of elements that may be extended in the deployed metasystem 104, using the DIS tool 2600. The elements to be replicated are agreed between the metasystem users of the dynamic integration system 113 and the dynamic deployed system 114. Replicating in this way adds properties to the cloned elements so that both the integration metasystem 100 and the deployed metasystem 104 can manage shared elements without conflict.

Next, step 3512 is executed to generate the dictionary and graphics models. These models are replicated from the dynamic integration repository 101 to the dynamic deployed repositories 105.

Finally, step 3513 is executed to build management processes. This is necessary only if the dynamic deployed system 114 requires processes that extend the processes in the dynamic integration system 113. Where this is required, this involves replication using clones.

Method of Creating a New Dynamic Deployed Information System

Figure 36:
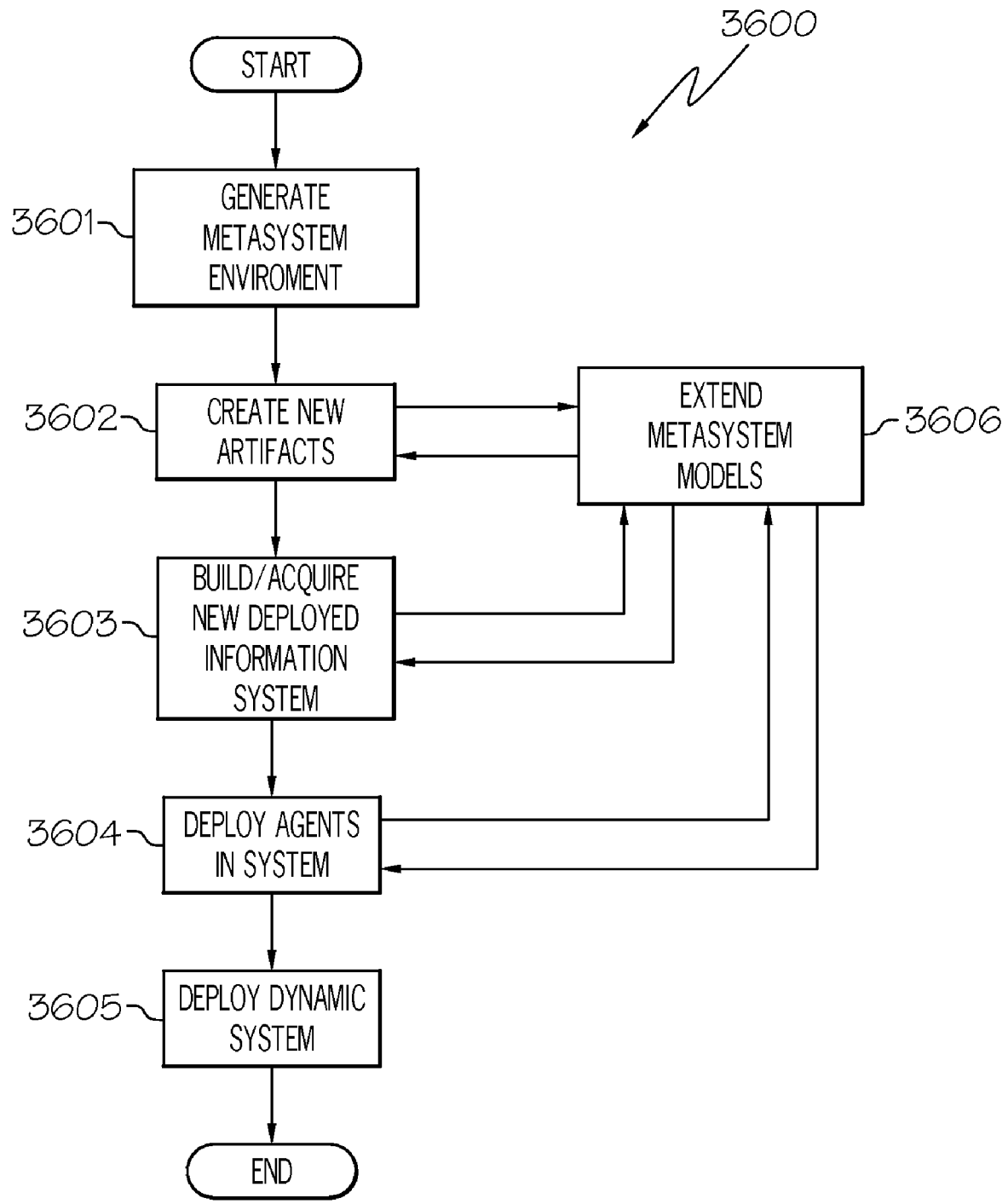
FIG. 36 is a flowchart illustrating a method of building a new deployed information system.

FIG. 36 shows a flow chart of a method 3600 for building a new dynamic deployed system 112. This method 3600 assumes the existence of a dynamic integration system 113. This requires:

creating a deployed metasystem 104, 3200 and a dynamic deployed repository 105, thereby producing the deployed metasystem 104, 3200 component of a dynamic deployed system 114, building or acquiring the new deployed information system 112, using the deployed metasystem 104 to manage the process;

building the new deployed information system metasystem agents 111 to the new deployed information system 112, thereby producing the deployed information system component 112, 3340 of a dynamic deployed system 114.

In a first step 3601, the deployed metasystem 104, 3200 environment is generated. The process is similar to that described in step 3501 of process 3500.

Next, the new dynamic metadata and dynamic artifacts are created in the dynamic deployed repository 105 in the step Create New Artifacts 3602, using the deployed instance of the DIS tool 104, 2600.

Given an existing dynamic integration system 113, elements of the static deployed repository 702 relating to integration may be generated from the dynamic integration system. This does not require that the dynamic integration repository 101 be replicated, as that the information in repository is available to the deployed metasystem 104 through the deployed instance of the DIS tool 106, 2600. Part of the advantage gained from use of the dynamic approach is that each dynamic deployed system 114 can work from a consistent and accurate view of the dynamic integration system 113.

Next, the new deployed information system 112 is built or acquired in step 3603. This will involve creation of many artifacts and their supporting information, which is accomplished using a deployed instance of the DIS tool 106, 2600.

Next, in step 3604, metasystem agents 111 are deployed into the deployed information system 112, to support management of the deployed information system 112 by the deployed metasystem 104 and the integration metasystem 100.

The above three steps invoke a process 3606 to extend models in the dynamic deployed system repository 105. This is accomplished by defining new or changed data using the deployed instance of the DIS tool 106, 2600.

The above three steps invoke a process 3606 to extend models in the dynamic deployed system repository 105. This is accomplished by defining new or changed data using the deployed instance of the DIS tool 106, 2600. The final step is to deploy the dynamic deployed system into production 3605. At this point, the tools, processes and metadata of the deployed metasystem 104 may be used for the maintenance and management of the deployed information system 112.

Support for Changing Components of Dynamic Deployed Information System

This description focuses on the support provided by the deployed metasystem 104 for the performance of tasks needed to change components within the dynamic information system 114. Depending on the process, these tasks may be the responsibility of a number of roles, defined by the enterprise. This description does not focus on any specific process to be followed in changing the components followed. In the recommended embodiment, a set of processes is defined, including change management. These may be known processes, such as those identified in ITIL.

In the recommended embodiment, the DIS tool 2600 supports the definition of processes and roles, and the performance of tasks within these processes by those roles. It also supports definition and execution of the workflow necessary to implement the processes. The dynamic deployed system therefore supports a consistent approach to the management of change.

With the recommended embodiment of the ontology model 2622, the dynamic deployed repository 105 and the dynamic integration repository 101 implement an enterprise-wide configuration management database. In the ontology model 2622, configurable items can be viewed in their conceptual, logical and physical contexts. Through the embedded version management, they may be presented as current state, historical state or future state views. Configurable items are automatically detected and identified.

Through known metasystem agents 111, the deployed metasystem 104 can verify the actual versions of configurable items deployed against the authorized versions, and generate alerts in the case of anomalies. Taken together, the configuration management database and the metasystem agents can ensure that the dynamic information system implemented is consistent with that authorized. For the assessment of a change request, accuracy in the metasystem is crucial, as it affects decisions made in relation to both technical and financial impact of a proposed change.

For any role initiating a request for change, the existence of reliable current models in the dynamic deployed repository 105 and the dynamic integration repository 101 provides support in allowing the context of the request for change to be accurately determined. A request for change in a deployed information system 112 may imply an enabling change in an integration system 106. This would be referred to roles in the dynamic integration system 113, who could then assess the request in the context of all affected dynamic deployed systems 114.

Operating Environment

Figure 40:
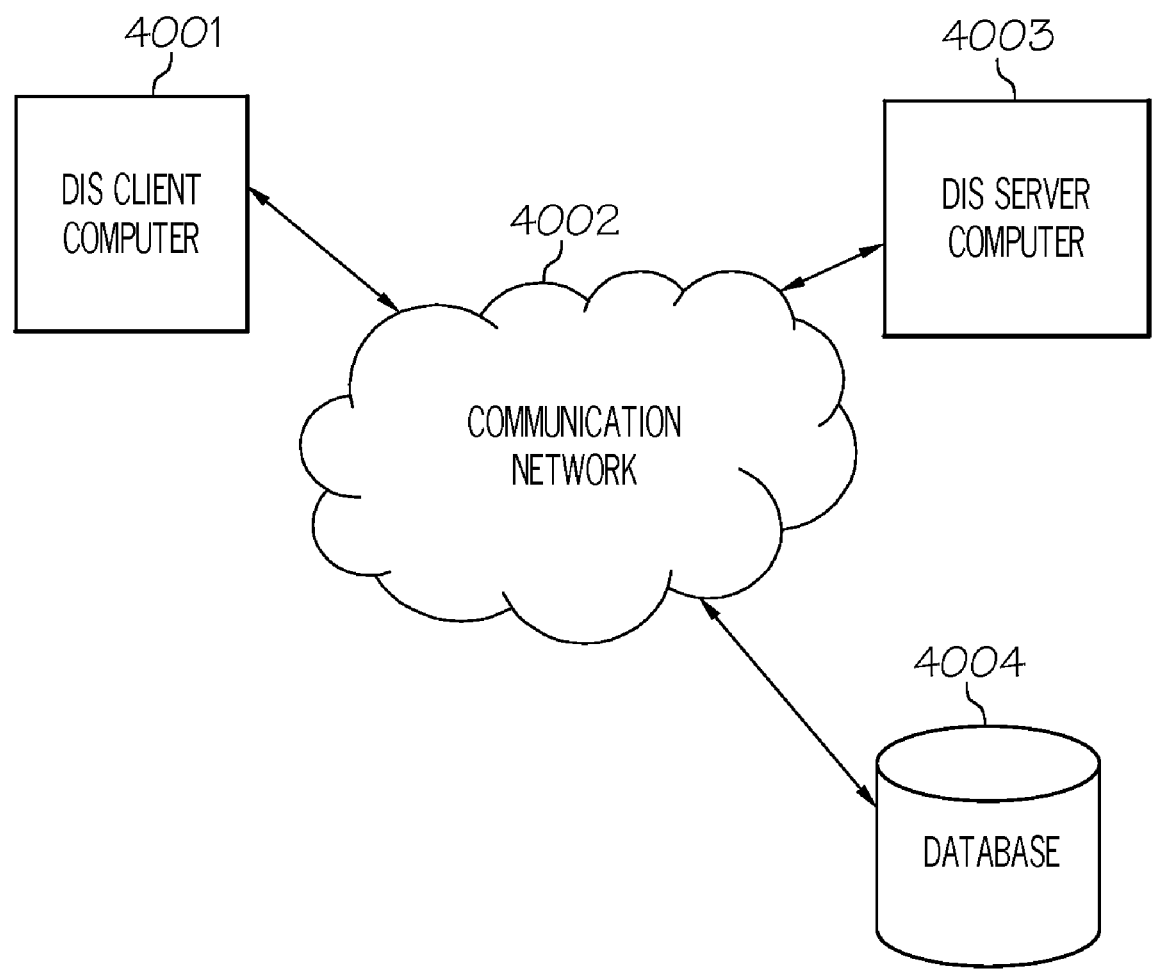
FIG. 40 shows a schematic diagram of an operating environment in which a metasystem of FIG. 2 may be deployed.

FIG. 40 shows a schematic diagram of an operating environment in which the DIS tools described herein may be used. A DIS client computer 4001 communicates with a DIS server computer 4003 and optionally a database server 4004 via a communication network 4002. Although a single computer 4001, server 4003 and database 4004 are shown, this is purely for illustrative convenience and in practice the operating environment may include many computers 4001, servers 4003 and databases 4004. The databases 4004 may correspond to the dynamic integration repository 101 and may also include dynamic deployed repositories 105.

The DIS Metasystem Server 4003 and database 4004 support one or more integration metasystems 3220 and deployed metasystems 3320. Using, for example, a browser client or a thin client running on computer 4001, a user may gain access to the data and functions necessary for the user's role in the creation and use of dynamic information systems.

Figure 41:
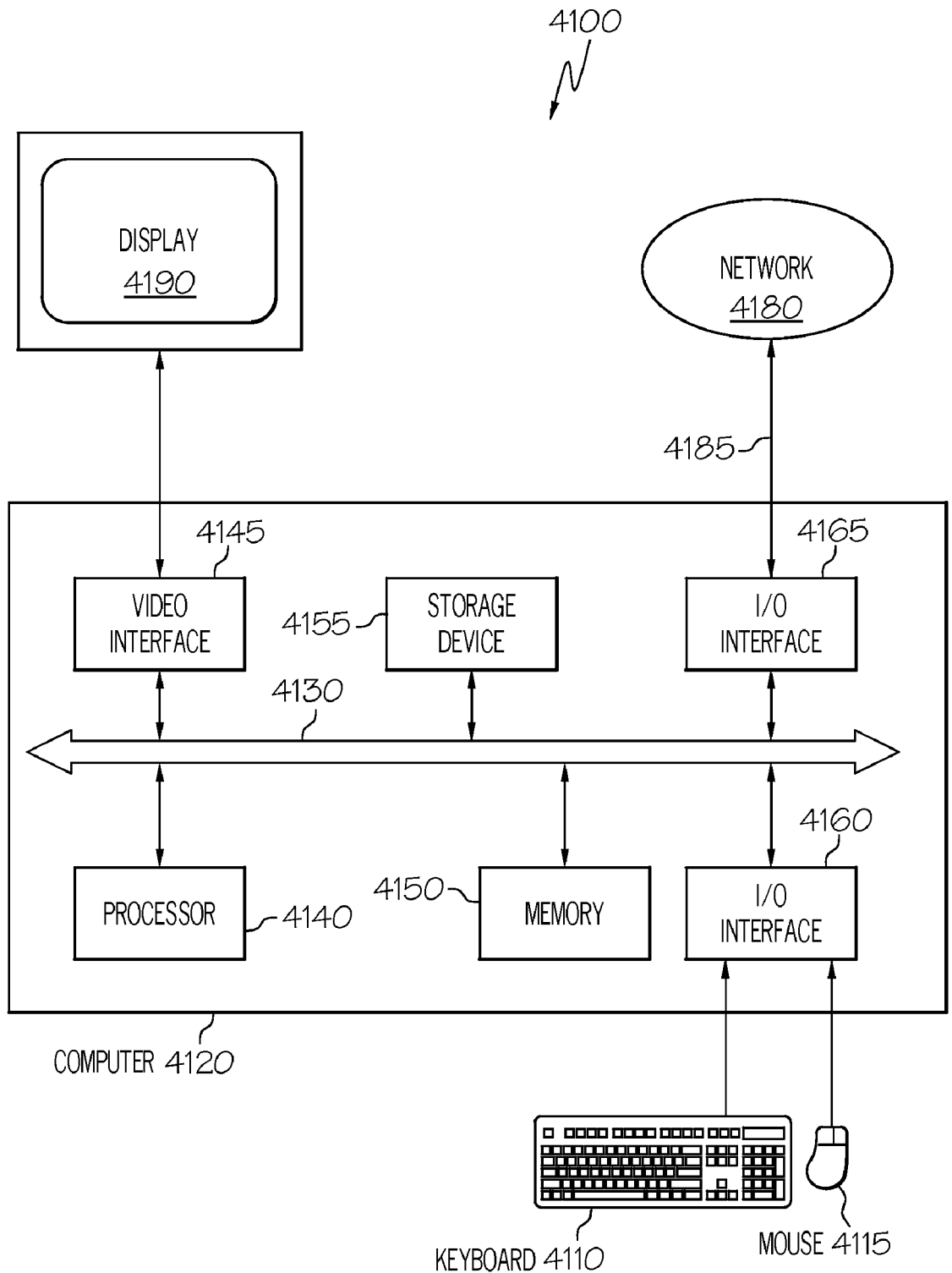
FIG. 41 shows a schematic diagram of a general-purpose computer system that may be used in the environment of FIG. 40.

In an alternative arrangement, a local version of the DIS tool 2600 may be deployed for both on-line and off-line use. In this case replication and synchronization of any changes to metasystem information, and validation of changes against predefined models and rules, are deferred. FIG. 41 is a schematic representation of a computer system 4100 of a type that is suitable for executing software for the provision of the systems described herein. Computer software executes under a suitable operating system installed on the computer system 4100, and may be thought of as comprising various software code means for achieving particular steps. The computer system 4100 may be used, for example, as the DIS client computer 4001 or DIS server computer 4003.

The components of the computer system 4100 include a computer 4120, a keyboard 4110 and mouse 4115, and a display 4190. The computer 4120 includes a processor 4140, a memory 4150, input/output (I/O) interfaces 4160, 4165, a video interface 4145, and a storage device 4155.

The processor 4140 is a central processing unit (CPU) that executes the operating system and the computer software executing under the operating system. The memory 4150 may include random access memory (RAM) and read-only memory (ROM), and is used under direction of the processor 4140.

The video interface 4145 is connected to display 4190 and provides signals for display on the display 4190. User input to operate the computer 4120 is provided, for example, from the keyboard 4110 and mouse 4115. Other types of input, such as a microphone, may also be used. Signals may also be output audibly, using one or more speakers (not shown). The storage device 4155 may include a disk drive or any other suitable storage medium.

Each of the components of the computer 4120 is connected to an internal bus 4130 that includes data, address, and control buses, to allow components of the computer 4120 to communicate with each other via the bus 4130.

The computer system 4100 may be connected to one or more similar computers via an input/output (I/O) interface 4165 using a communication channel 4175 to a network, represented in FIG. 41 as the Internet 4170.

The computer software may be recorded on a portable storage medium, in which case the computer software program is accessed by the computer system 4100 from the storage device 4155. Alternatively, the computer software can be accessed directly from a communications network 4170, such as the Internet) by the computer 4120. In either case, a user can interact with the computer system 4100 using, for example, the keyboard 4110 and mouse 4115 to operate the programmed computer software executing on the computer 4120.

Other configurations or types of computer systems can be equally well used to execute computer software that assists in implementing the techniques described herein.

What is claimed is:

1. A deployed dynamic information system comprising:
    a) a dynamic integration system including:
        (i) a persistent dynamic repository of data forming an asymmetric navigational database, and said database including an ontology model, said ontology model having an abstract model framework that supports creation and use of multi-dimensional and asymmetric abstract models of data, and views which define the content and form of presentation of that data using a computer; and
        (ii) an integration system having components of shared infrastructure and services of an enterprise architecture that are exposed for use by one or more deployed information systems;
        (iii) an integration metasystem including:
            (A) components that describe components of shared infrastructure and services of an enterprise architecture, and
            (B) a dynamic information system software tool generating artifacts representing information and views that define the presentation of data, said artifacts being provided to said ontology model, and having interfaces to said abstract model framework that permit creation, reading and modification of the contents of said asymmetric navigational database; and b) a dynamic deployed system including:
   (i) a persistent dynamic data repository storing dynamic artifacts for system deployment, said dynamic artifacts representing information and views that define the presentation of data;
   (ii) a deployed metasystem having one or more components that describe components of infrastructure and services of a deployed information system architecture; and
   (iii) a deployed information system.

2. The system of claim 1, wherein, in said dynamic deployed system:
   said persistent repository forms an asymmetric navigational database, and said database includes an ontology model, said ontology model having an abstract model framework that supports creation and use of multi-dimensional and asymmetric abstract models of data, views which define the content and form of presentation of that data using a computer, descriptions of common sharable and inheritable components related to an enterprise, that exist in said dynamic integration system, and definitions of the form and content of common artifacts for use in the enterprise; and
   said deployed metasystem further includes a dynamic information system tool generating artifacts representing information and views that define the presentation of data, common components related to a deployed information system, definitions of the form and content of common artifacts for use in said deployed information system, dynamically updated information describing said deployed information system; and processes for the creation, maintenance and management of said deployed information system generated by said deployed metasystem.

3. The system of claim 1, wherein said abstract model framework of said dynamic deployed system further includes a dictionary model, a graphics model and a forms model.

4. The system of claim 1, wherein said dynamic integration system software tool further includes:
   an ontology engine that creates, reads and modifies the content an ontology model;
   a component to separate data representing information from views of that data;
   a component to define and use multiple views of data; and
   a component to create and modify data through use of multiple views.

5. A system for generating a dynamic information system comprising:
   a) a persistent dynamic repository of data forming an asymmetric navigational database, and said database including an ontology model, said ontology model having an abstract model framework that supports creation and use of multi-dimensional and asymmetric abstract models of data, and views which define the content and form of presentation of that data using a computer; and
   b) an integration metasystem including
      (i) components that describe components of shared infrastructure and services of an enterprise architecture, and
      (ii) a dynamic information system software tool generating artifacts representing information and views that define the presentation of data, said artifacts being provided to said ontology model, and having interfaces to said abstract model framework that permit creation, reading and modification of the contents of said asymmetric navigational database.

6. The system of claim 5, wherein said software tool further includes:
   an ontology engine that creates, reads and modifies the content an ontology model;
   a component to separate data representing information from views of that data;
   a component to define and use multiple views of data; and
   a component to create and modify data through use of multiple views.

7. The system of claim 5, wherein said integration metasystem further includes
   descriptions of common sharable and inheritable components related to an enterprise, that exist in an integration system; and
   definitions of the form and content of common artifacts for use in the enterprise; and
   wherein said descriptions and said definitions are linked to said descriptive components of said integration metasystem.

8. The system of claim 7, wherein said abstract model framework further includes a dictionary model, a graphics model and a forms model.

* * * * *